US011598710B2

(12) United States Patent
Kuznetcov et al.

(10) Patent No.: US 11,598,710 B2
(45) Date of Patent: Mar. 7, 2023

(54) METHODS AND APPARATUS FOR DETERMINING THE SPATIAL DISTRIBUTION OF MATERIALS USING ELECTROMAGNETIC RADIATION

(71) Applicant: PERM Inc., Calgary (CA)

(72) Inventors: Ilia Kuznetcov, Calgary (CA); Steven I. Bryant, Calgary (CA); Apostolos Kantzas, Calgary (CA)

(73) Assignee: PERM Inc., Calgary (CA)

( * ) Notice: Subject to any disclaimer, the term of this patent is extended or adjusted under 35 U.S.C. 154(b) by 167 days.

(21) Appl. No.: 17/130,184

(22) Filed: Dec. 22, 2020

(65) Prior Publication Data

US 2021/0208052 A1 Jul. 8, 2021

Related U.S. Application Data

(60) Provisional application No. 63/067,725, filed on Aug. 19, 2020, provisional application No. 62/958,091, filed on Jan. 7, 2020.

(51) Int. Cl.
*G01N 15/06* (2006.01)
*G01N 15/08* (2006.01)

(52) U.S. Cl.
CPC ... *G01N 15/082* (2013.01); *G01N 2015/0846* (2013.01)

(58) Field of Classification Search
CPC .. G01N 15/00; G01N 15/04; G01N 15/06–08; G01N 15/082; G01N 2015/0846
See application file for complete search history.

(56) References Cited

U.S. PATENT DOCUMENTS

| 5,341,101 A * | 8/1994 | Maerefat | G01V 3/12 73/152.09 |
| 11,327,000 B2 * | 5/2022 | Karimi | G01N 15/082 |
| 2016/0160642 A1 * | 6/2016 | Hall | E21B 49/008 166/305.1 |
| 2017/0115200 A1 * | 4/2017 | Chen | G01N 33/24 |
| 2019/0265173 A1 * | 8/2019 | Ayub | G01N 33/24 |

FOREIGN PATENT DOCUMENTS

CA 2839604 C * 10/2019 ............ E21B 49/00

OTHER PUBLICATIONS

Keysight Technologies, "Basics of Measuring the Dielectric Properties of Materials". Published in USA, Mar. 7, 2017; 5989-2589EN; www.keysight.com.

Abubakar A. Habashy T.M., et al. A Fast and Rigorous 2.5D Inversion Algorithm for Cross-Well Electromagnetic Data [Conference] // SEG Houston 2005 Annual Meeting.—Houston : SEG, 2005.

(Continued)

*Primary Examiner* — Nguyen Q. Ha
(74) *Attorney, Agent, or Firm* — Forge IP, PLLC

(57) ABSTRACT

An apparatus for determining the spatial distribution of materials within a sample using electromagnetic waves. The apparatus probes a sample with electromagnetic waves, measures the response, and determines the spatial configuration based on the measured response.

18 Claims, 27 Drawing Sheets

(56) References Cited

OTHER PUBLICATIONS

Arroyo F. et. al. Dielectric dispersion of colloidal suspensions in the presense of stern layer conductance: particle size effects [Journal] // Journal of Colloid and Interface Science.—1999—vol. 210.—pp. 194-199.
Asami K. Characterization of heterogeneous systems by dielectric spectroscopy [Journal] // Prog. Polym. Sci..—2002.—vol. 27.—pp. 1617-1659.
Augustin A.M. Kennedy W.D., Morrison H.F., Lee K.H. A Thoretical Study of Surface-to-Borehole Electromagnemtic-Logging in Cased Holes [Journal] // Geophysics.—[s.l.] : SEG, 1989.—1 : vol. 54.—pp. 90-99.
Axelrod N. et. al. Dielectric spectroscopy data treatment: I. Frequency domain [Journal] // Meas. Sci. Technol..—2004.—vol. 15.—pp. 755-764.
Baker-Jarvis J. et al. Transmission/reflection and short-circuit line methods for measuring permittivity and permeability [Report].—Boulder : NIST Technical Note 1355-R, NIST, 1993.
Baker-Jarvis J. et. al. Measuring the permittivity and permeability of lossy materials: solids, liquids, metals, building materials, and negative-index materials [Book].—Boulder, CO : NIST Technical Note 1536, 2005.—1st : p. 150.
Bottreau A. et. al. A method analyzing the dielectric relaxation spectra of mixtures by decomposition into Debye elementary domains. Application to the study of the water spectrum [Journal] // J. Chem. Phys .. —1975.—vol. 62.—pp. 360-365.
Bridges J., Stresty G. et. al. Radio-Frequency Heating to Recover Oil from Utah Tar Sands [Conference] // First Intl.Conference on the Future of Heavy Crude and Tar Sands.—New York : McGraw-Hill Book Co. Inc., 1979.—pp. 39X 409.
Bruggeman V. Calculation of Various Physics Constants in Heterogenous Substances I Dielectric Constants and Conductivity of Mixed Bodies from Isotropic Substances [Journal] // Ann. Phys..—1935.—7 : vol. 24.—pp. 63X 664.
Brumbi D. Van Zyl I. Modern Technologies for Level Measurement [Book].—München : Sensor+Test Conference, 2009.
Buckley F., Maryot A. Tables of dielectric dispersion data for pure liquids and dilute solutions [Book].—[s.l.] : National Bureau of Standards Circular, 1958.
CG TEC injection Dielectric properties of PEEKTM polymer, Application Note [Report].—[s.l.] : CG TEC injection, 2015.
Chalapat K. Wideband reference-plane invariant method for measuring electromagnetic parameters of materials [Journal] // Microwave Theory and Techniques, IEEE Transactions.—2009.—9 : vol. 57.—pp. 2-12.
Chelidze T., Gueguen Y. Electrical Spectroscopy of Porous Rocks: A revieb I. Theoretical Models [Journal] // Geophys. J. Int..—1999.—1 : vol. 137.—pp. 1-15.
Chute F., Vermeulen F. et. al. Electrical Properties of Athabasca Oil Sands [Journal] // Can. J. Earth Sci..—1979.—10 : vol. 16.—pp. 2009-2021.
Cole, K., Cole R. Dispersion and adsorption in dielectrics, I, Alternating current characteristics [Journal] // J. Chem. Phys...—1941.—vol. 9.—pp. 341-351.
Daily W.D. Ramirez., A.L. Electrical Resistance Tomography Using Steel Cased Boreholes as Electrodes [Report] : Patent / University of California.—Washington DC : DOE Patents, 1999.
Danesh A. PVT and Phase Behaviour of Petroleum Reservoir Fluids [Book].—400 : Developments in Petroleum Science 47, Elsevier, 1998.—1st.
Davidson D., Cole R. Dielectric Relaxation in Glycerol, Propylene Glycol, and n-Propanol [Journal] // J. Chem. Phys..—1951.—12 : vol. 19.—pp. 1484-1490.
Dunsmore J. Handbook of microwave component measurements with advanced VNA techniques [Book].—New Delhi, India : John Wiley & Sons, 2012.—1st : p. 637.

Electronic Research Inc. EIA Flange Adapters for connecting 3-1/8 inch 50 Ohm EIA to 1-5/8 inch 50 Ohm EIA, Type RLA350-150 Reducer [Report]—USA : Electronic Research Inc., 2006.
Feldman Y., Raicu V. Dielectric relaxation in biological systems: physical principles, methods, and applications [Book].—[s.l.] : Oxford University Press, 2015.
Fixman M. Charged macromolecules in external fields. I. The sphere [Journal] // J. Chem. Phys..—1980.—vol. 13.—pp. 711-716.
D. A. Freckey Using the Inverse Chirp-Z Transform for Time-Domain Analysis of Simulated Radar Signals [Conference] // Conference: ICSPAT 94: Signal Procession Applications and Technology.—1994.
Fusco V. Foundations of Antenna Theory and Techniques [Book].—Belfast : The Queens University of Belfast, Person Education, 2005.—1st : p. 246.
Gao G. Alumbaugh D., Zhang P. et al. Practical Implications of Nonlinear Inversion for Cross-Well Electromagnetic Data Collected in Cross-Wells [Conference] // SEG Las Vegas 2008 Annual Meeting.—Las Vegas : SEG, 2008.
Gustavsen B. Semlyen A. Rational approximation of frequency domain responses by vector fitting [Journal] // IEEE Trans. Power Delivery.—1999.—3 : vol. 14.—pp. 1052-1061.
Hanai T. et. al. Dielectric Constant of Emulsions [Article] // Bulletin of the Institute for Chemical Research.—1962.—pp. 240-271.
Hansen P. Regulization tools: A Matlab package for analysis and solution of discrete ill-posed problems [Journal] // Numerical Algorithms.—1994.—vol. 6.—pp. 1-35.
Havriliak S., Negami S. A complex plane analysis of a-dispersion in some polymer systems [Journal] // J. Polymer Sci. C..—1966.—vol. 14.—pp. 99-117.
Heimovaara T. Frequency domain analysis of time domain reflectometry waveforms, 1, measurements of complex dielectric permittivity of soils [Journal] // Water Resour. Res..—1994.—vol. 30.—pp. 189-199.
B.A. Herrold Complete Vector Network Analyzer Approach to Ice Penetrating Radar System [Report] : MSc. Thesis / Electrical Engineering.—Pensylvannia : [s.n.], 2013.
IEC CEI IEC 60339-1 International Standard [Report].—[s.l.] : International Electrotechnical Commission, 1971.
IEC CEI IEC 60339-2 International Standard [Report].—[s.l.] : International Electrotechnical Commission, 1996.
James R., Parks G. Characterization of aqueous colloids by their electrical double layer and intrinsic surface chemical properties [Journal] // Surf Colloid Sci..—1982.—vol. 12.—pp. 119-216.
C. E. Jones Radar Remote Sensing for Identifying and Characterizing Oil Slicks in Coastal and Open Waters [Book].—Tampa, FL: 10th National Monitoring Conference, National Water Quality Management, 2016.
Jonscher A. Dielectric Relaxation in Solids [Journal] // J. Phys. D. Appl. Phys..—1999.—14 : vol. 32.—pp. R57-R70.
Jonscher A. The Univeral Dielectric Response [Journal] // Nature.—1977.—vol. 267.—pp. 67✓ 679.
Keysight Measuring Radar Signals with Vector Signal Analizers and Wideband Instruments [Book].—[s.l.] : Keysight Technologies, 2019.
Keysight Radar Measurements [Book].—[s.l.] : Keysight Technologies, 2014.
Keysight Technologies Basic of Measuring the Dielectric Properties of Materials [Report].—USA : Keysight Technologies, 2017.
Knight R., Endres A. A new concept in modeling the dielectric response of sandstones: Defining a wetted rock and bulk water system [Journal] // Geophysics.—1990.—vol. 55.—pp. 586-594.
Knight R., Nur A. The dielectric constant of sandstone, 60 kHz to 4 MHz [Journal] // Geophysics.—1987.—vol. 52.—pp. 644-654.
E. Y. Kra The Design, Construction and Tests of an In Situ Capacitance Moisture Sensor and a Portable Capacitance Moisture Meter for Organic Soil and Sawdust [Report] : MSc. Thesis / Bio-Resource Engineering ; University of British Colombia.—Vancouver : University of British Colombia, 1992.—p. 102.
Kremer F. Dielectric Spectroscopy—Yesterday, Today and Tomorrow [Journal] // Journal of Non-Crystalline Solids.—2002.—vol. 305.—pp. 1-9.

(56) References Cited

OTHER PUBLICATIONS

Kremer F., Schönhals A. Analysis of Dielectric Spectra. In Broadband Dielectric Spectroscopy [Book].—New York : Springer-Verlag Berlin Heidelberg, 2003.
Landau D., Lifshitz E. Fluid mechanics [Book].—Moscow : Pergamon Press, 1987.—2nd : p. 551.
Lesmes D. Electrical impedance spectroscopy of sedimentary rocks [Report].—Texas, USA : Texas A&M University, 1993.—p. 180.
Lesmes D., Friedman S. Relationships between the Electrical and Hydrogeological Properties of Rocks and Soils [Book Section] // Hydrogeophysics.—[s.l.] : Springer, 2005.

* cited by examiner

METHODS AND APPARATUS FOR DETERMINING THE SPATIAL DISTRIBUTION OF MATERIALS USING ELECTROMAGNETIC RADIATION

RELATED APPLICATIONS

This application claims priority from U.S. provisional application No. 62/958,091 and U.S. provisional application No. 63/067,725, both of which are hereby incorporated by reference in their entirety.

FIELD OF THE INVENTION

The invention relates to determining the spatial distribution of materials by detecting the electromagnetic properties of the materials. In particular, the invention relates to probing a sample with electromagnetic waves, measuring the response, and determining the spatial configuration based on the measured response.

BACKGROUND

As discussed in "Basics of Measuring the Dielectric Properties of Materials" (url: http://literature.cdn.keysight.com/litweb/pdf/5989-2589EN.pdf, Keysight Technologies, 2013-2018), the dielectric constant ($\kappa$) is equivalent to relative permittivity ($\varepsilon_r$) or to the ratio of the absolute permittivity ($\varepsilon$) relative to the permittivity of free space ($\varepsilon_0$). The real part of permittivity ($\varepsilon'_r$) is a measure of how much energy from an external electric field is stored in a material. The imaginary part of permittivity ($\varepsilon''_r$) is called the loss factor and is a measure of how dissipative or lossy a material is to an external electric field. The imaginary part of permittivity ($\varepsilon''_r$) is always greater than zero and is usually much smaller than ($\varepsilon'_r$). The loss factor includes the effects of both dielectric loss and conductivity.

A measurement of the reflection from and/or transmission through a material along with knowledge of its physical dimensions provides the information to characterize the permittivity of the material.

A typical measurement system for measuring electromagnetic properties of materials use a coaxial probe method consisting of a network analyzer or impedance analyzer, software to calculate permittivity, and a coaxial probe, probe stand and cable. $\varepsilon_r$ and $\mu_r$ may be computed from the measurement of the reflected signal ($S_{11}$) and transmitted signal ($S_{21}$). In the past, samples in this configuration are typically between 2-4 cm.

SUMMARY

In accordance with the invention, there is provided an apparatus for determining the spatial distribution of materials, the apparatus comprising:

a source of electromagnetic waves across a range of frequencies, wherein the source is configured to emit electromagnetic waves into a sample along an axis;

a detector configured to detect the electromagnetic waves across the range of frequencies emitted by the source, wherein the detector is positioned to receive electromagnetic waves after the electromagnetic waves have interacted with the sample by at least one of: reflection and transmission, and wherein the detector is configured to detect a frequency response of the received electromagnetic waves; and a controller configured to process the frequency response of the received electromagnetic waves to determine an axial spatial distribution of material within the sample.

The source may be configured to emit electromagnetic waves through the sample along the axis.

The source and detector may form part of a vector network analyzer.

The apparatus may comprise a transceiver configured to act both as a source and as a detector.

The detector may be configured to receive electromagnetic waves which have interacted with the sample at least 10 cm away from the source. The sample may be greater than 10 cm along the axial direction. The sample may be less than 100 cm along the axial direction.

The detector may comprise a reflection sensor and a transmission sensor.

The range of frequencies may span frequencies between 2 MHz and 3 GHz.

A ratio of the highest frequency to the lowest frequency in the range of frequencies may be greater than 1000.

The electromagnetic waves may be radio waves.

The apparatus may comprise a waveguide comprising two aligned conductors configured to support Transverse Electro-Magnetic modes within the waveguide.

The apparatus may comprise an elongate tubular conducting channel, and a central elongate conducting electrode aligned within the channel such that the channel and the electrode comprises a waveguide for transverse electromagnetic modes. The tubular channel may have a circular cross-section.

The source may be configured to successively emit pulses of different frequencies within the range of frequencies.

The controller may be configured to:

determine a time-dependent amplitude of the received electromagnetic waves from the measured frequency response;

determine, based on the time-dependent amplitude of the received electromagnetic waves, an axial speed of the electromagnetic waves as a function of axial distance from the source; and determine an axial spatial distribution of material within the sample based on the determined axial speed.

The controller may be configured to: determine the position of interfaces between different materials within the sample based on discontinuities in the time-dependent amplitude of the received electromagnetic waves across the range of frequencies.

The apparatus may comprise plugs for closing the ends of the channel, the plugs having ports to allow liquid to be exchanged with the channel.

The apparatus may comprise a resilient sheath within the channel, and a pump configured to introduce fluid between the sheath and the channel to apply a lateral pressure on the sample within the sheath.

The apparatus may comprise a vacuum pump for evacuating the sample holder of fluid (gas and/or liquid).

The apparatus may comprise blocks for closing the ends of the channel, the blocks being moveable to apply an axial pressure on the sample.

The channel may be impermeable and form a container for the sample.

The channel may be porous and be configured to allow fluid communication through the channel. A porous channel may be positionable within a larger container (e.g. a tank or other vessel). The channel may comprise holes to allow fluid communication through the channel. The holes may span across more than 50% of the channel length.

According to a further aspect, there is provided a tank comprising the apparatus described herein, wherein the apparatus is arranged to determine the spatial distribution of material within the tank along an upright or vertical axis.

According to a further aspect, there is provided a method of determining the spatial distribution of materials, the method comprising:

emitting electromagnetic waves across a range of frequencies into a sample along an axis;

detecting electromagnetic waves across the range of frequencies emitted by the source, wherein the detected electromagnetic waves have interacted with the sample by at least one of: reflection and transmission, and wherein the detector is configured to detect a frequency response of the received electromagnetic waves;

processing the frequency response of the received electromagnetic waves to determine an axial spatial distribution of material within the sample.

The sample may comprise a liquid permeable solid matrix, and wherein the method comprises:

fully saturating the matrix with a first fluid and recording a first-fluid frequency response of the received electromagnetic waves;

introducing a second fluid into the matrix and recording an intermediate frequency response of the received electromagnetic waves;

determining the axial spatial saturation of the second fluid within the matrix based on a comparison between the first-fluid frequency response and the intermediate frequency response.

The method may comprise pumping fluid through the sample.

The sample may comprise a core sample.

The method may comprise pumping fluid comprising nanoparticles through the sample.

The nanoparticles may be magnetic. The nanoparticles may be ferromagnetic, superparamagnetic and/or paramagnetic. The nanoparticles may be electrically insulating (non-conductive). The nanoparticle fluid may have a frequency-dependent dielectric constant. The nanoparticle fluid may have a frequency-dependent conductivity. A frequency dependent property may be one which changes by at least 20% across the range of frequencies emitted by the source. E.g. the largest response may be at least 20% greater than the smallest response within the frequency range.

Nanoparticles may have a maximum dimension of between 1 and 100 nanometres.

The frequency range may comprise ultra high frequency radio waves (e.g. between 300 MHz and 3 GHz). The frequency range may be within the ultra high frequency radio wave range. The frequency range may comprise super high frequency radio waves (e.g. between 3 GHz and 300 GHz). The frequency range may be within the super high frequency radio wave range.

Wave frequency is a reciprocal quantity of its wavelength. The relationship is for a lossless case is given by $$\lambda = \frac{c}{f\sqrt{\epsilon}},$$

where c is the speed of light ($3 \times 10^8$ m/s), f the electromagnetic wave frequency (e.g. measured in Hz), E is the relative dielectric constant of the media, through which the wave travels. This relationship shows that waves of higher oscillating frequency have smaller wavelengths and wise versa.

Higher frequencies typically have smaller penetration depths due to smaller wave lengths but help provide information about the smaller features of the media (material) under examination. Longer wavelengths are more useful whenever the depth of penetration is important (e.g. through lossy porous media and/or emulsion), however the smaller details may be less well resolved (smaller than a quarter of a wavelength). The present technology may use frequencies from 2 MHz to 6 GHz.

In certain cases, such as where emulsion is present, the electromagnetic wave may experience multiple reflections within the emulsion rag layer (emulsion layer), which may introduce undesired noise in the data. Due to the fact that measurements are performed by sweeping through multiple frequencies almost instantaneously by VNA (e.g. quickly with respect to changes in the sample), the method may comprise using a windowing technique (Kaiser window) to attenuate or ignore higher frequencies which can help reduce noise in the final measurements. This windowing technique may comprise using a low-pass filter. This filtering may help in locating interfaces. By reducing noise, the oil-water, emulsion-water, emulsion-oil interfaces may become pronounced and so more easily tracible by a peaking algorithm in time domain.

The present technology may allow the real-time determination of fluid saturation profiles in porous media as well as the recovery of the dielectric properties of porous media of different fluid saturation compositions as a function of electromagnetic (EM) frequency.

Fluids may comprise one or more of: pure liquids, gases, foams, emulsions and brine solutions. Dispersion concentrations may also be traced, as demonstrated by the experimental results, where nanoparticle (e.g. of $Fe_2O_3$ and $Fe_3O_4$ and $BaTiO_3$) concentrations are measured in deionized water. Porous media structure material (e.g. sand, carbonate etc.), gases, water, hydrocarbons, emulsions and foams have all different dielectric properties. In case of brine being present in the porous media the electrical conductivity is different from that of sand.

The radius of the channel electrode may be greater than 3 cm. The radius of the channel may be less than 15 cm.

The spacing between the electrodes in the waveguide may be greater than 3 cm. The spacing between the electrodes in the waveguide may be less than 15 cm.

An important aspect is the ratio of the outer diameter of the wave guide to the diameter of the central electrode. The ratio may be between 3 and 10. In one embodiment of the sample holder the ratio of D/d=3.125 [in]/0.687 [in]=79.375 [mm]/17.45 [mm]=4.549. This ratio is selected in a way that $Z_o$ (characteristic impedance of the coaxial cell at both ends) is equal to the input impedance of the VNA (in our case that is 50 Ohm). The diameter of the sample holder, D, may be between 5 and 20 cm.

All parts of our coaxial probe have been designed to keep its characteristic impedance at 50 Ohm. The characteristic impedance is a measure of the contrasts in the media. Cables and the VNA are configured to operate connected to the fixtures (waveguides) with characteristic impedance of 50 Ohm. The ratio of the electrode to the wall's diameter of the coaxial cable has been selected as per the following formula:

$$Z_o = \frac{1}{2\pi \sqrt{\frac{\mu_0}{\epsilon \epsilon_o}}} \log\left(\frac{D}{d}\right),$$

where $Z_o$ is a characteristic impedance of the transmission line (our coaxial probe), $\mu_o$ is the magnetic susceptibility of the free space (vacuum), $\in_o$ is the permittivity of the free space (vacuum), $\in$ is the dielectric permittivity of the coaxial line, D is the diameter of the coaxial waveguide's wall, d—is the diameter of the electrode. The ratio of D/d is chosen to match the characteristic impedance of the cable and VNA, so to minimize any unwanted losses and reflections, and measure only the device under test (our sample in the middle between the PEEK plugs). Relative dielectric constant ($\in_r = \in \in_o$) in the formula is equal to the dielectric constant of PEEK and is 3.3.

It is also important to note that TRL (Thru Reflect Line—described below) calibration procedure may also be performed on the measured signal as a part of the post processing workflow to be able to shift the measurement planes to match the extent of the sample (e.g. from where VNA is physically connected to the coaxial waveguide to planes to where actual material under test is placed).

For the Line calibration standard, the waveguide may be fully filled with canola oil (or another liquid with a dielectric constant is the same as, or within ±15%, of the material of the end plugs). Since the canola oil relative dielectric constant is the same as PEEK, there is no reflection in of the signal and therefore qualified that measurement to be used in this calibration procedure.

For the Reflect standard, the Section 1 and Section 3 with PEEK plugs inside of them and covered with reflective foil (e.g. of aluminum) connected to the VNA have been used to achieve full reflection of the wave. For the "Through" standard a shorted electrode is used and measured the signal through our empty coaxial waveguide without Section 2. These measurements are important when the measured transmission and reflection data are transformed to the dielectric constant and conductivity of the materials. The system may use multiple frequency sweeps (pulses) and multiple frequency network parameters (S-parameters) to recover fluid saturation profiles in porous media.

A Chirp Z-Transform (CZT) may be considered to be a generalization of the discrete Fourier transform (DFT). While the DFT samples the Z plane at uniformly spaced points along the unit circle, the chirp Z-transform samples along spiral arcs in the Z-plane, corresponding to straight lines in the S plane. The ICZT is the inverse of the CZT. The inverse chirp-z transformation (ICZT) inversely transforms any spectrum input signal on a frequency domain into a signal on a time domain.

The Inverse Chirp Z-Transform (ICZT) may use a window smoothening procedure for the frequency to time domain measured signal conversion. The Inverse Chirp Z-Transform may use a rational polynomial function to achieve higher temporal resolution of the obtained signal.

The method may comprise iteratively comparing the detected response with a model spatial distribution of dielectric properties until a predetermined error threshold condition is satisfied. The method may comprise refining the model spatial distribution of dielectric properties when the predetermined error threshold condition is not satisfied.

The system may be configured to transform the signal from impulse to step response; and then normalize the step response to obtain fluid saturation profiles in porous media. An impulse response is the time-dependent response in which interfaces appear as peaks or impulses. A step response is a time-integrated response in which interfaces appear as steps.

The assembly may be used in the lab for real-time monitoring fluid saturations and salinity levels in porous media at ambient and elevated (e.g. up to 200° C. or above) temperature and pressure (e.g. up to 2500 psi or above).

The system may be configured to optimise the recovered dielectric properties (dielectric constant and conductivity) as a function of electromagnetic frequency from measured complex reflection and transmission coefficients ($S_{11}$ and $S_{21}$).

The system may be configured to perform multiple frequency sweeps (pulses) and multiple frequency network parameters (S-parameters) to recover emulsion/suspension/foam layer information on their levels in tanks and vessels as well as their use in determination of fluid composition.

The system may use an Inverse Chirp Z-Transform (ICZT) with window smoothening procedure for the frequency to time domain measured signal conversion as well as the use of the rational polynomial function to achieve higher temporal resolution of the obtained signal. The transformation procedure of the signal from impulse to step response followed by normalization to obtain fluid composition along tanks/vessels.

The system may comprise a 2-Port Coaxial Waveguide/Probe with openings. These openings may allow the resident fluids in tanks and vessels to freely enter and leave the coaxial probe. The probe may be is inserted into in tanks for measuring liquid levels in tanks and vessels.

The system may comprise a 2-Port Parallel Plate Waveguide Probe. This may be more useful for more viscous fluids.

The system may comprise a 2-Port 2 Port Parallel Rod Waveguide Probe. This may be more useful for even more viscous fluids.

The system may comprise a 2-Port Parallel Stilling Well that is attachable to (or within) the main body of tanks with a Rod-like probe in the center.

The system may comprise a fluid purging elbow to provide a cleaning mechanism of the 2-port waveguide/probe that is placed before and after the VNA adapters.

The system may comprise High Pressure Fluid Isolation O-ring System that is part of the adapters and connectors to prevent any fluid from leaking and entering electrical components of VNA.

The system may use both transmission and reflection measurements. This may allow the method to characterise complex systems better (e.g. with multiple phases). That is, with only one port measurement, the system may struggle to resolve ambiguities in the solution.

The present system may use data associated with multiple frequencies. The system may be agnostic to dielectric property data or any arbitrary "mixing model" to obtain saturation profiles. That is, it may not be necessary to know the dielectric constants of the components to determine a spatial profile (e.g. a water saturation profile).

The present apparatus may be configured to generate results in real time. The present apparatus and method may be configured to deliver measurements every second and it may be fully automated.

The present system may comprise an overburden system configured to squeeze the sample. This may be used to seal the outside of a core sample. Without the overburden system, the injected fluid may by-pass the core sample.

The apparatus may comprise a thermometer within the core holder. The thermometer may comprise fiber optic thread. The fiber optic tread sensor such that its dielectric constant is similar to the one of PEEK and, therefore, will not cause any unwanted reflections. This may be important to replicate reservoir temperatures (e.g. which could reach 50-80° C.) and to correct for the dielectric constant.

The present apparatus is configured to withstand elevated temperatures and/or high pressures. The assembly housing may be formed from aluminium. The apparatus may comprise chemical grade aircraft type aluminium alloy 7050-T7451.

The present system may be configured to determine spatial configurations of conductive materials (e.g. brine).

A rag layer may be considered to be the material that accumulates and persists at the oil/water interface and it typically consists of emulsified water and/or oil, clays, and solids. Sometimes, under poor processing conditions, rag layers grow large enough to cause a process upset. Therefore, it is important that the formation and characteristics of a rag layer can be determined.

The refractive index of a material, n, is defined as the ratio of the speed of light in a vacuum, $c_o$, to the speed of light in that material, $c_m$, or in terms of the square root of the ratio between the the permittivity of the material, $\varepsilon_m$, and the permittivity of free space, $\varepsilon_o$:

$$n = \frac{c_o}{c_m} = \sqrt{\frac{\varepsilon_m}{\varepsilon_o}}$$

The dielectric constant, $\in_r$, may be given in as the ratio between the permittivity of the material, $\varepsilon_m$, and the permittivity of free space, $\varepsilon_0$:

$$\epsilon_r = \frac{\epsilon_m}{\epsilon_o}$$

Therefore:

$$\in_r = n^2.$$

This means that the speed of the electromagnetic waves through a medium is related to the dielectric constant.

The speed, v, of any periodic wave is the product of its wavelength and frequency. For electromagnetic waves, the velocity, $c_m$, can be calculated in terms of the speed of light in a vacuum, $c_0$, and either the refractive index, n, or the dielectric constant, $\in_r$:

$$v = \lambda f = c_m = c_o / n = c_o / \sqrt{\epsilon_r}$$

Therefore, knowledge of the dielectric constant can be used to determine the speed of the electromagnetic waves in the sample medium.

The permittivity of a material, $\in_m$, is a complex number with a real part $\in'_m$, and an imaginary part, $\in''_m$. The imaginary part may be expressed in terms of the conductivity, $\sigma$, and the frequency, f:

$$\epsilon_m = \epsilon'_m + \epsilon''_m = \epsilon'_m + i(\sigma/2\pi f)$$

Conductivity and dielectric constant responses are part of the complex dielectric constant response of a material under test as shown in the formula above.

The controller may comprise a processor and memory. The memory may store computer program code. The processor may comprise, for example, a central processing unit, a microprocessor, an application-specific integrated circuit or ASIC or a multicore processor. The memory may comprise, for example, flash memory, a hard-drive, volatile memory. The computer program may be stored on a non-transitory medium such as a CD. The computer program may be configured, when run on a computer, to implement methods and processes disclosed herein. Also, the controller may be implemented, for example, using a WiFi module of the Raspberry Pi™ (or other alternative of the microcomputer) and the running server client on this computer. The output may be displayed on the online page of the browser and be accessed from anywhere via internet.

BRIEF DESCRIPTION OF THE DRAWINGS

Various objects, features and advantages of the invention will be apparent from the following description of particular embodiments of the invention, as illustrated in the accompanying drawings. The drawings are not necessarily to scale, emphasis instead being placed upon illustrating the principles of various embodiments of the invention. Similar reference numerals indicate similar components.

FIG. 1b is an exploded view of the sample assembly for the embodiment of FIG. 1a.

FIG. 40b-d are various closeups of the graph of FIG. 40a.

DETAILED DESCRIPTION

Introduction

Figure 1A:
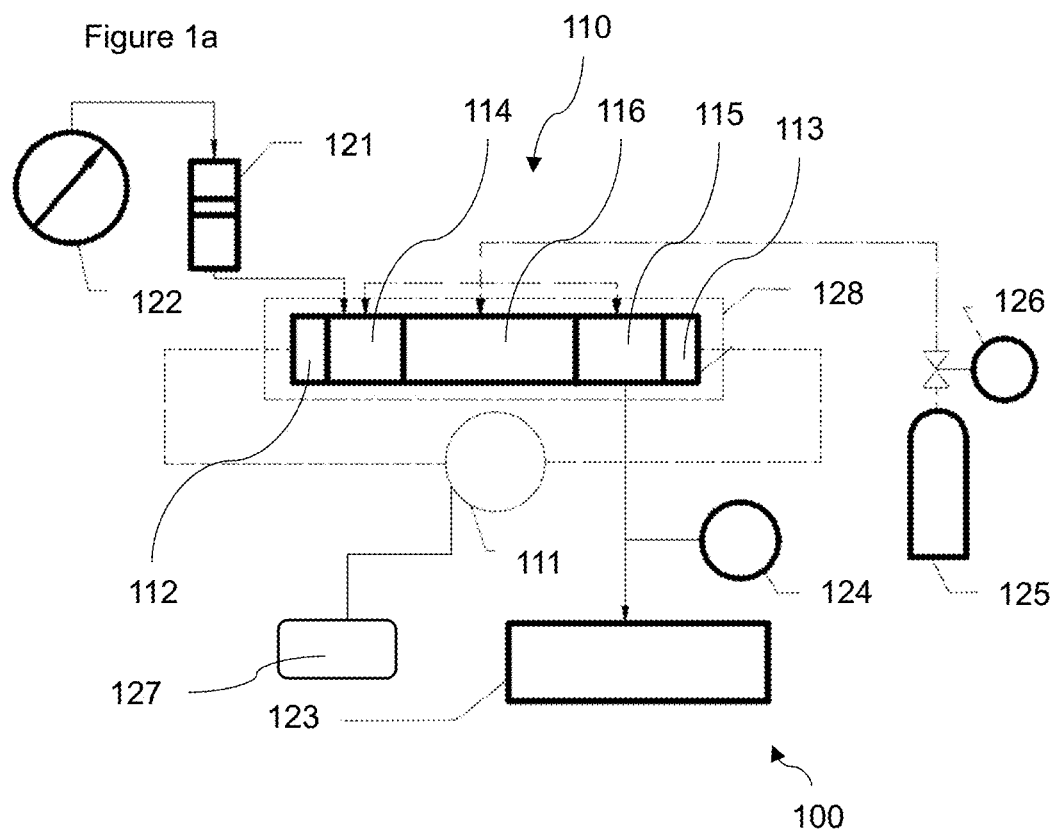
FIG. 1a is a schematic of one embodiment of the apparatus.

The present technology relates to the real-time determination of the spatial distribution of materials within a sample using electromagnetic sweeps of varying frequency. For example, one embodiment may be configured to determine the fluid distribution and composition in porous media. Other embodiments may determine the arrangement and thicknesses of various layers within a stratified sample (e.g. within a tank or other container). Determining the specific properties, such as dielectric properties, from the measured frequency responses is also disclosed.

Various aspects of the invention will now be described with reference to the figures. For the purposes of illustration, components depicted in the figures are not necessarily drawn to scale. Instead, emphasis is placed on highlighting the various contributions of the components to the functionality of various aspects of the invention. A number of possible alternative features are introduced during the course of this description. It is to be understood that, according to the knowledge and judgment of persons skilled in the art, such alternative features may be substituted in various combinations to arrive at different embodiments of the present invention.

Apparatus

FIGS. 1a-1d show an embodiment of an apparatus 100 for determining the spatial distribution of materials, the apparatus comprising:

a source of electromagnetic waves 111 across a range of frequencies, wherein the source is configured to emit electromagnetic waves into a sample along an axis;

a detector configured to detect electromagnetic waves across the range of frequencies emitted by the source, wherein the detector is positioned to receive electromagnetic waves after the electromagnetic waves have interacted with the sample by at least one of: reflection and transmission, and wherein the detector is configured to detect a frequency response of the received electromagnetic waves; and a controller 127 configured to process the frequency response of the received electromagnetic waves to determine an axial spatial distribution of material within the sample.

The response in this context may be considered to refer to the change in amplitude of the detected electromagnetic waves. That is, the frequency response may be considered to be a representation of the change in amplitude of the electromagnetic radiation in the frequency domain (e.g. regardless of the electromagnetic radiation's inherent frequency). The change in amplitude (response) is measured at every frequency that the VNA sends through the material from both ports. The time step to go from one particular frequency to another within one sweep is in order of pico-seconds. The response is then recorded by the VNA.

The apparatus 100 in this case is built around a sample assembly 110. The sample assembly (shown in FIGS. 1b and 1c) is configured to contain the sample and to connect with various systems which allow the sample to be controlled (e.g. by changing components of the sample itself or by applying different conditions to the sample) and which allow the sample to be probed with the electromagnetic signals.

The sample assembly may be considered to consist of three sections located between the reflection connector 112 and the transmission connector: Section 1 which conveys the electromagnetic radiation between the reflection connector 112 and the sample; Section 2 which contains the sample; and Section 3 which conveys the electromagnetic radiation from the sample to the transmission connector 113.

In this case, the apparatus comprises three simultaneously working systems which interact with a sample contained in a sample holder within a sample assembly. The three systems, in this case, are:
- an electromagnetic signal delivery/reception system;
- a fluid delivery system; and
- a conditioning system configured to control the conditions experienced by the sample (e.g. temperature and pressure).

It will be appreciated that other embodiments may or may not have a fluid delivery system and/or a conditioning system.

In this case, as shown in FIG. 1*a*, the electromagnetic signal delivery/reception system comprises a 2-port VNA-powered system that is capable of the real-time monitoring of fluid saturations and fluid compositions in the porous media as well as the recovering dielectric frequency responses of porous media. In this case, the porous media could be a core sample or could comprise sand.

A VNA 111 is a source of electromagnetic waves. The VNA is an instrument that is typically used to measure the network parameters of electrical networks. In this case, the VNA has two connectors which are connected at either end of a longitudinal sample holder 116.

A reflection connector 112 acts: as a source configured to emit electromagnetic waves into a sample along an axis (in this case aligned with the longitudinal axis of the sample holder); and as a sensor configured to detect the electromagnetic waves after the electromagnetic waves have interacted with the sample by reflection. A transmission connector 113 acts as a sensor configured to detect the electromagnetic waves after the electromagnetic waves have interacted with the sample by transmission.

The VNA in this case is configured to emit and detect radio waves from 2 MHz to 3 GHz. The upper and lower limits can be shifted depending on the VNA used (e.g. from 2 MHz to 6 GHz). However, as noted above, higher frequencies can introduce undesired noise and therefore can be attenuated using low-pass filtering procedure performed on the raw signal in frequency domain.

In this case, the axial extent of the sample holder 116 is 30 cm. The VNA is capable of detecting interactions with the sample across this length in both transmission and reflection.

Figure 1B:
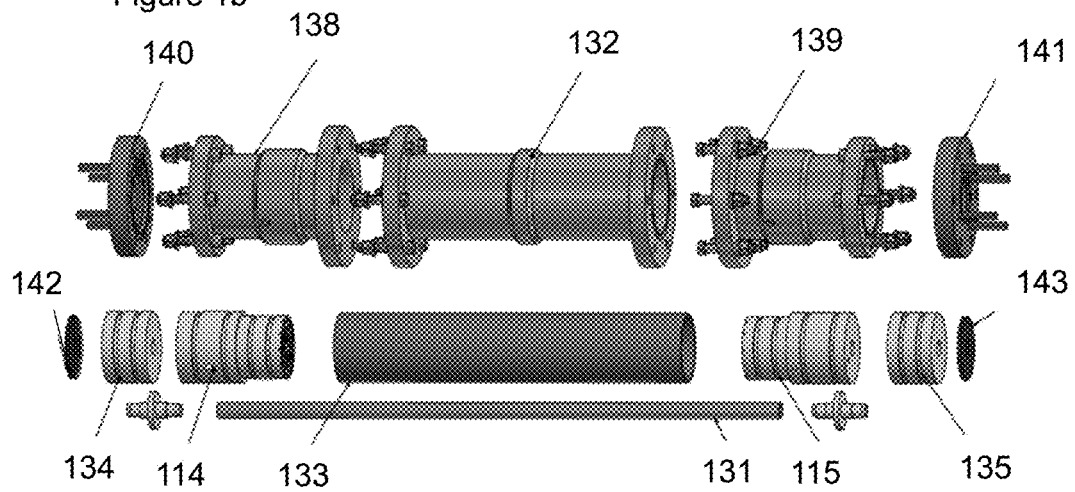
Figure 1C:
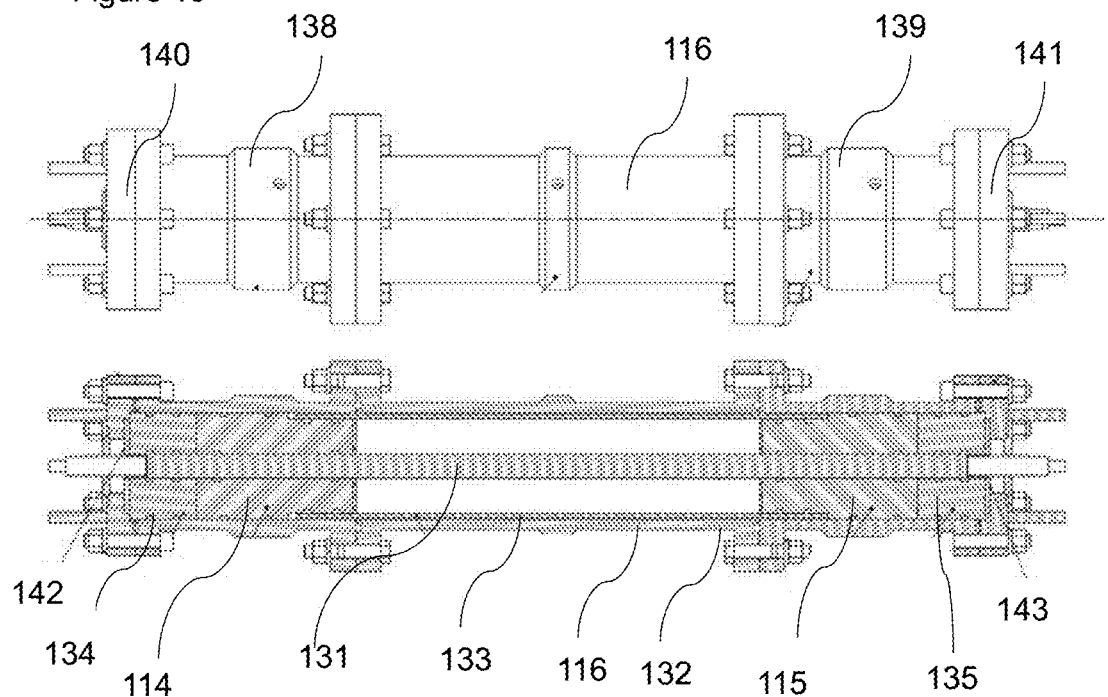
FIG. 1c is side view and a corresponding cross-section view of the sample assembly of FIG. 1b.

As shown in FIGS. 1*b* and 1*c*, the sample assembly in this case comprises a waveguide comprising two aligned conductors 131, 132. This allows TEM mode to be propagated throughout the waveguide. Transverse electromagnetic (TEM) is a mode of propagation where the electric and magnetic field lines are all restricted to directions normal (transverse) to the direction of propagation. To transmit TEM mode, the waveguide (or transmission lines) should have two or more conductors (e.g. coaxial conductors, two-wire lines, parallel-plate line, strip line, microstrip line, coplanar waveguide).

It is not necessary to use only TEM mode to detect saturation changes, fluid compositions and their levels in a container. However, if TEM is used, the retrieval of the complex frequency dependent dielectric responses (dielectric constant and conductivity) is easier to determine (e.g. the calculations are more straightforward, and the solution may be unambiguous).

The waveguide in this case comprises an elongate tubular conducting channel 132, and a central elongate conducting electrode 131 aligned within the channel. The tubular conducting channel is configured to support the sample and, in this case, provides a grounded electrode.

At either end of the sample holder, there are two matched plugs 114, 115 (which are formed from PEEK). Matched, in this context, means that the characteristic impedance of the coaxial line and the inserted plugs are matched to the characteristic impedance of the system (50 Ohm impedance in this case). These contain the sample within a portion of the tubular conducting channel 132. The tubular conducting channel 132 and the central electrode 131 extend around and through the plugs. The VNA 111 is configured to transmit electromagnetic waves through the plugs. PEEK is used because it is stable to high temperature and pressure and because it has known dielectric properties.

In this case, the PEEK plugs and end blocks (discussed below) are encased within a metal housing comprising plug channels 138, 139 and connector plates 140, 141. The sample holder 116, the plug channels 138, 139 and the connector plates 140, 141 form a closed cylinder which contains end blocks 134, 135, end plugs 114, 115, the central electrode 131 and space for the sample.

In this case, the VNA source is configured to successively emit pulses of different frequencies within the range of frequencies. By using a range of frequencies, features in the response which are consistent across multiple frequencies can be distinguished from artefacts which may be present in one of the frequency responses.

The VNA may be configured to sweep at between 673 to 782 microsecond per point. The density of the sweep (number of points per one sweep cycle or span of the VNA) can be set to equal any value, e.g. 801. The values 673 and 782 correspond to the time it takes for this particular VNA (FieldFox) to register (measure) one single point (i.e. S11, S12, S21, S22) at a particular frequency in the frequency range (frequency sweep cycle or span) between 2 MHz to 6 GHz (frequency range specification of this particular VNA). In the results described below, the frequency range (frequency sweep cycle or span) is between 2 MHz to 2 GHz.

The response of the material to the frequency sweep is then processed by the controller 127 to determine the spatial distribution of materials along the axis. The spatial distribution may be calculated based on determining various properties of the material as a function of axial position. The properties may include dielectric constant (or axial speed) and/or conductivity. This is described in greater detail below.

Regarding controlling fluid flow within the sample holder, in this case, the fluid delivery system is configured to allow fluid to be injected into the sample holder via ports. The ports are provided through the plugs 114, 115 which seal the ends of the sample holder. This allows fluid to be injected into one end to displace any fluid already in the sample holder from the other end.

Figure 1D:
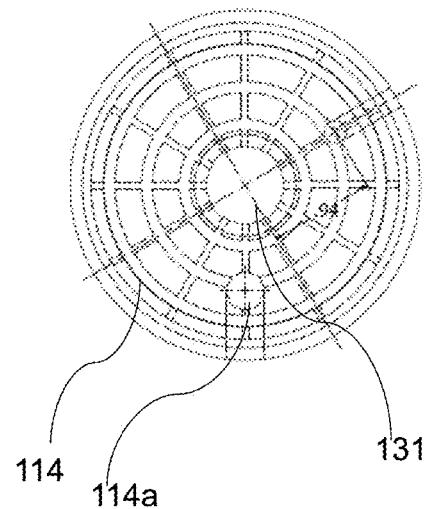
FIG. 1d is an axial view of the endplate of the sample assembly of FIG. 1b which facilitates fluid delivery/exit into the sand pack.

FIG. 1*d* is an axial view of a side of the plug 114 next to the sample, and in this case, which facilitates fluid delivery/exit into the sand pack. A pattern comprising open channels which spread across the plug surface from the port 114*a*, so that the pumped fluid gets distributed more evenly laterally to avoid the saturation end effects. In this case, the port 114*a* is off centre to accommodate the centrally located electrode 131. The injection can be reversed. The sample assembly 110 is substantially symmetrical about a mirror plane which is perpendicular to the sample assembly axis. This may allow the source connector to be switched more easily between the two ends and the results compared.

In this case, the fluid delivery system comprises a pump 122 for generating a pressure. The pressure in this case is applied to a piston cylinder 121 which injects fluid (e.g. water, hydrocarbon or other liquid or gas) into one end of the sample holder via a first port. Fluid is then drained from the sample holder 116 via the second port into a fluid collector reservoir 123. Back pressure is controlled via a back-pressure regulator 124.

The conditioning system in this case comprises an oven 128 for heating the sample. Other embodiments may comprise a cooler for cooling the sample.

The conditioning system also comprises pressure control. The pressure within the sample holder can be controlled in three ways. The overburden system can exert axial and/or radial stresses on the sample; and the fluid delivery system can pressurize the sample by introducing more fluid into the sample holder (and controlling the backpressure).

The axial stress is provided by squeezing the plugs on either side of the sample holder. In this case, the sample apparatus is configured to move the plugs by injecting fluid into an overburden chambers on sides of the plugs 114, 115 which are opposite to the sample holder 116. The chambers lie between the plugs 114, 115 and end blocks 134, 135.

Each plug 114, 115 acts as a hydraulic ram which move in to apply a pressure to the sample. It will be appreciated that one or both plugs may have associated overburden chambers to apply axial pressure. In this case the fluid injected is typically electromagnetically neutral (e.g. canola oil) and/or have similar electromagnetic properties to that of the plugs (e.g. to minimize the presence of electromagnetic interfaces between the overburden fluid and the plug material).

An electromagnetically neutral material may be considered to be a material that has no loss (non-conductive) and has a relative dielectric constant close to the free characteristic permittivity $\in_m$ ($\in_m = \in_r \in_o$). In our case that is PEEK's relative dielectric constant $\in_r$ of 3.3. This is done to keep the influence of the annular space to the minimum in measurements of the material under test. The signal travels as before, but the annular space is filled with oil (or other neutral liquid) to minimize effect of the annulus and be able to measure a cleaner raw response of the material under test itself.

In this case, the fluid is injected through ports in the plug channels 138, 139 as shown in FIG. 1c (see the raised portions with holes in the upper half of the plug channels 138, 139). These are the Section 1 and 3 in the exploded view (138 and 139 here). They have NPT ⅛ ports on the sides to allow fluid to flow in and out as well as have one more port to allow for the fiber optic thread to be inserted to be able to monitor the temperature inside. PEEK plugs 114 and 115 have the drilled channels that allow the fluid to pass through them. These channels are aligned with the NPT ports of the 138 and 139. Also, 138 and 139 have one more NPT ⅛ port each. These are needed to fill up the overburden chamber around the sample with canola oil (or another neutral liquid) to squeeze the sample. These ports are also aligned with channels in plugs 114 and 115 that are drilled to allow oil to enter the space between the plug 114 and block 134 as well as plug 115 and block 135 to squeeze the sample axially. Canola oil is injected through the NPT ⅛ port into middle Section 2 (132) to squeeze the sample radially.

The radial stress is accomplished through the use of a resilient sheath 133 within the channel, and a pump configured to introduce fluid between the sheath and the channel to apply a lateral pressure on the sample within the sheath. In this case, the fluid is introduced into a port located centrally along the channel 116 as shown in FIG. 1c (see the raised portion with a hole shown in the upper half of the channel 116 in FIG. 1c). In this case, the resilient sheath is in the form of a rubber sleeve which, in this case, has been designed to work up to 200° C. (in this case, the material is Viton™ rubber). The material of the sleeve could be changed accordingly to the demands of each test. For higher temperatures the Aflas™ rubber composite could be employed (up to 236° C.) and for more extreme test temperatures (up to 420° C.) Kalrez™ rubber may be used.

It will be appreciated that, where the sample is porous but has a fixed shape (e.g. a core sample), the resilient sheath 133 may be used to seal the outside of a core sample. This may help force any fluid injected into the sample holder to pass through the sample (e.g. rather than around it).

In this case, the axial and radial pressure may be controlled using compressed gas 125 (e.g. from a nitrogen cylinder) and a pressure regulator 126. Other embodiments may use a liquid pump to pump, for example, an electromagnetically neutral liquid such as canola oil.

Processing

In the context of a VNA network, scattering parameters (or S-parameters) describe the electrical behavior of electrical networks when undergoing various electrical stimuli. For example, S-parameters can be measured to characterize the electrical properties or performance of a radio frequency (RF) component. In this case, the radio frequency (RF) component comprises the sample.

In the S-parameter nomenclature, $S_{yx}$, the second number (x) represents the originating connector, while the first number is the destination connector (y). That is:

$S_{11}$ indicates that connector 1 is where the signal originates and where the response is detected and corresponds to reflection;

$S_{21}$ indicates that connector 1 (e.g. the reflection connector 112) is where the signal originates and connector 2 (e.g. the transmission connector 113) where the response is detected and corresponds to transmission;

$S_{22}$ indicates that connector 2 is where the signal originates and where the response is detected and corresponds to reflection (but from the opposite connector to $S_{11}$); and $S_{12}$ indicates that connector 2 is where the signal originates and connector 1 where the response is detected and corresponds to transmission (but in the opposite direction to $S_{21}$).

Figure 2:
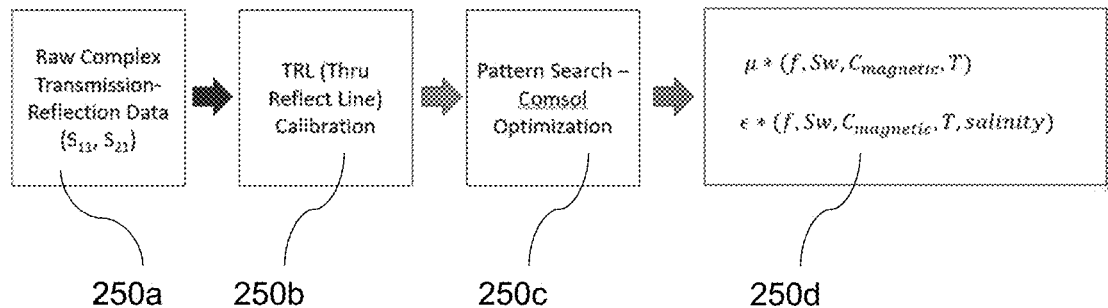
FIG. 2 is a flow diagram of the optimization algorithm to recover dielectric properties of porous media from the raw frequency dependent measured complex reflection ($S_{11}$) and transmission ($S_{21}$) coefficients.

FIG. 2 shows how the dielectric properties of porous media are recovered from the raw frequency dependent measured complex reflection ($S_{11}$) and transmission ($S_{21}$) coefficients.

First, the VNA is configured to apply an electromagnetic frequency sweep across a range of frequencies and record the response 250a. That is, the VNA is configured to continuously (e.g. with a temporal resolution of less than a second) send and receive nearly instantaneous (order of picosecond time interval between various frequency pulses within one sweep) pre-generated low-power signals at multiple frequencies, which will be referred as frequency sweeps thereafter.

Signals that are sent by the VNA at all frequency sweep cycles or spans (or frequency bands) are of low power. In this case, this may mean that the default output power of −1 dBm across all the frequency band (frequency cycle or span) is sent through the material under test. (An absolute-output power measurement displays the power present at the analyzer's input port. This power is absolute when it is not referenced (ratioed) to the incident or source power. In the logarithmic magnitude format, the VNA output power is in units of dBm, which is the power measured in reference to 1 mW). So, the VNA output power, used to carry out all the reported measurements, was around −1 dBm (relative to 1 mW) or 10 µW (10 micro Watt or $10^{-6}$ Watt) in absolute values. This power level is enough to sense the dielectric frequency properties of the materials and their spatial distribution without heating the materials and wasting electromagnetic energy.

The automation of the VNA, in this case, has been performed using SCIPI commands in MATLAB™ via timer. Resulting measurements are on-fly transmission and reflection responses that are fed to the inversion algorithm that employs inverse z-chirp transform (ICZT), rational polynomial fitting procedure to achieve a better frequency sampling resolution.

In this case, each electromagnetic frequency sweep corresponds to a measurement of reflection ($S_{11}$) and transmission ($S_{21}$) coefficient response through not only the sample but also the plugs, the overburden chambers and the end blocks. A disc 142, 143 of Teflon™ is also used between the metal connector plates 140, 141 and the PEEK end blocks 134, 135 to minimise reflections from the interface between the metal connector plates 140, 141 and the PEEK end blocks 134, 135. Teflon™ is used because the Teflon's relative dielectric constant is close to that of PEEK and equal to 2.1 (PEEK dielectric constant $\in_r$=3.3). PEEK could also be used or any other temperature resilient material. The purpose of the end block is to fill the two gaps between the connector plates 140, 141 and plugs 114 and 115, so that the travelling signal does not experience any sharp changes due to the dielectric contrasts all the way until the material under test.

To isolate the response of the sample from that of the sample apparatus, a shift of the reference planes is performed through the use of the Thru, Reflect and Line (TRL) method, 250b:

Foils are placed at either end of the sample to achieve the Reflect connection standard.

The Line connection has been achieved by filling up the sample holder with canola oil to match the characteristic impedance of our coaxial line (sample holder) which is 50 Ohm.

The Thru connection standard has been prepared by measuring the end sections directly connected (with no "sample holder" middle section). Each end section comprises a plug, an overburden chamber (which may be closed) and an end block.

The TRL algorithm was implemented using a Comsol-Livelink-Matlab optimization workflow to derive dielectric frequency dependent properties of porous media samples under examination.

The dielectric constants of the materials can be determined by an optimization method. In this case, the system uses the pattern search method 250c (implemented in MATLAB™), coupled through LiveLink™ with Comsol™ electromagnetic solver to solve for electromagnetic field distribution in porous media. In this case, the pattern search is configured to match both the reflection and transmission responses of the sample.

The output can then be converted to a spatial distribution of electromagnetic material properties along the measurement axis 250d. The electromagnetic material properties can be used to identify materials (e.g. the chemical composition) or other material properties (e.g. salinity or saturation level).

Figure 4:
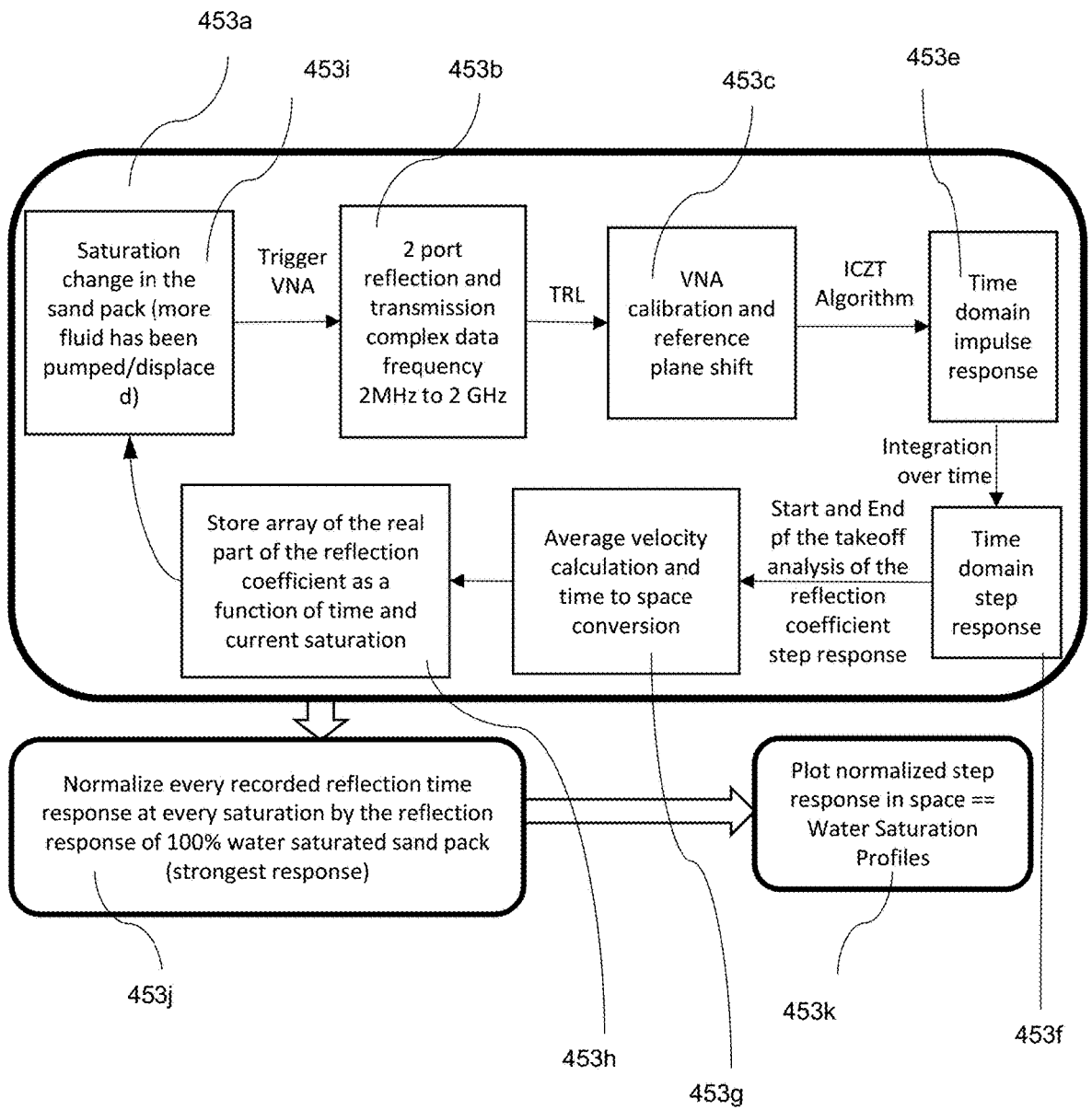
FIG. 4 is a flow diagram of the algorithm to recover time-dependent saturation profiles from the raw frequency dependent measured complex reflection ($S_{11}$) and transmission ($S_{21}$) coefficients.

FIG. 4 is a more detailed flow diagram for the pattern searching method used by the controller. The fitting procedure performed here on the measured data of the complex frequency dependent transmission ($S_{21}$) and reflection ($S_{11}$) coefficients is implemented as a standard function in MATLAB™.

At the beginning of the experiment, the sand is loaded into the sample holder and the overburden pressure is applied to confine the sand pack. The sand pack undergoes a vacuuming stage to remove the air that is present in the pore space. The spontaneous imbibition (water saturation of all the pore space in the sand pack) is performed. Routine permeability and porosity measurements are performed. The algorithm begins to trigger a successive measurement at a specified time interval between the measurements. First measurement is taken on the sand pack 100% water saturated. After that the pump is activated to pump some hydrocarbon liquid (or any other fluid that has some dielectric or conductivity contrast with the resident fluid—water in this case). It is expected that there has been some change 453i in saturation distribution (or not) or in fluid composition, or in salt concentration or gas and solid particle content etc.

Once the VNA is triggered, it sends the frequency domain sweeps through the coaxial transmission line within some specified in the VNA itself frequency range. The complex reflection ($S_{11}$, $S_{22}$) and transmission ($S_{12}$, $S_{21}$) are recorded 453b and parsed back the controller (computer) via LAN cable as bit file. In this case, this file is later read and converted to .s2p Touch Stone file in the MATLAB™ (can be read with any text editor).

Once recorded, these $S_{yx}$ coefficients undergo the TRL calibration procedure using the Thru, Reflect and Line measurements. TRL calibration standards have to be performed only once and do not need to be repeated before every measurement. These standards 453c correct for the phase shift in the signal, since the measurements physically happen at the points, where the VNA is connected (via cables) to the transmission coaxial line. Once the calibration is performed, the corrected $S_{yx}$ signal responses are obtained as if they were measured right at the beginning and the end of the material under test.

The next step is the frequency to time domain conversion 453e using the ICZT algorithm. The inputs here are the corrected (or raw $S_{yx}$ responses). If the raw $S_{yx}$ measurements are used, the interfaces with a little time lag will be observed. This is due to the fact that it takes some constant time (around 3 ns) for the signal to travel from the connection point to the sample's under test first interface. Output of the ICZT transform algorithms is the signal (smoothened with the low-pass filter or not) in time domain (see, for example, FIGS. 5a, 5b). In the FIG. 5a, two distinct interfaces could be identified. Between water saturated sand and one of the PEEK plugs (regardless which one, since they are symmetrical in shape and material) there is the peak to the left. The second peak, that moves from the right to the left every time some more of the mineral oil is injected into the sand pack, corresponds to the interface between the part of the sand pack, where mineral oil has already advanced to displace resident water and the receding water. These locations of the peaks in time domain (see FIG. 5a) are used to calculate an average velocity of the signal through the sand pack for every saturation curve (injection instance). Since it is a round trip that the wave takes to travel from one port to the interface and back to the port, there is the division by two of the resulting time for the signal. The conversion is then performed using the following formula: $V_{average}$(Saturation Curve)=$L/t_{peaks}$, where L=0.3 m (in this case) and is the length of the sand pack, $t_{peaks}$ is the round-trip time that is the signal takes to travel between the interfaces. Once the average velocity is calculated for every saturation curve, the argument of every point of every saturation curve (i.e. time that corresponds to a point on a saturation curve (please note, that it is a trip-time, not a round-trip time, since we have already halved the wave's travelling time)) is multiplied by the calculated average velocity 453g (that corresponds to its saturation curve).

As a result, the impulse responses in space domain for every saturation curve may be determined. These responses are then integrated over time, to obtain the step response in space 453f for every curve. Every step response in space is normalized 453j by the step response of the 100% water saturated case in space to normalize the signals. The resulting curves are the saturation profiles that represent fluid distribution 453k of the fluids within the porous media (e.g. sand pack) at every saturation measured.

Amounts of fluids injected and recovered have been accounted for in every experiment to calculate how much oil and water is present in a sand pack at a time. (see FIG. 16) These total amounts of fluids present at once in the sand pack have been used to cross-validate the resulting saturation curves. The values of the points represented by the markers in FIG. 16 have been calculated by integrating every saturation curve saturation curve obtained by this algorithm. Please also note, that the signal amplitude of the converted signal from frequency to time domain is represented by its real component.

The order in which the time domain step response and time to space conversion steps 453g and 453f are carried out in the algorithm may be reversed with no effect on the final result.

FIG. 4 shows how this system can be used to monitor a porous sample in real time as the sample is changed by replacing the fluid occupying the porous matrix.

For example, the system may be configured to saturate the porous matrix with a particular liquid (e.g. water), saltwater, emulsions etc. Then the system records the response of the saturated sample to the frequency sweep.

Then (possibly after further conditioning by introducing further fluids), the system can perform a series of measurement cycles 453a to determine the response under changing fluid conditions (e.g. as a second fluid is introduced into the saturated matrix, or as water is introduced to displace a second fluid from the saturated matrix).

Each measurement cycle comprises measuring the raw response by the VNA 453b (which includes the response of the sample and components of the sample assembly).

The raw data is then processed in order to isolate 453c the response of the sample alone.

In this case, the time domain impulse response 453e of the sample is calculated in the time domain using an ICZT.

Then the time-domain step response 453f is determined by integrating the impulse response over time.

This is then converted to a spatial response 453g using the speed of the EM waves within the sample.

This array is then saved 453h.

The cycle is then started again when further fluid is introduced into the sample that changes the saturation profile 453i to obtain a series of time depended spatially dependent responses.

In order to determine how the saturation varies with time and axial position, each array is normalized 453j by dividing each spatial array by the array corresponding to the water-saturated sample to provide a time dependent water saturation profile 453k.

Experimental Results

The time domain impulse response of a fluid saturated sand pack undergoing forced imbibition (water (wetting fluid) displacing hydrocarbon-based fluid (non-wetting fluid)) and drainage (hydrocarbon-based fluid (non-wetting phase) displacing water (wetting phase)) are shown in FIGS. 7-14.

In this case, the sample is dynamic because fluids are being pumped through the porous matrix using the fluid delivery system, hence there are multiple curves displayed for each experiment. FIGS. 7-14 show the determined water saturation profiles along the length of the sample holder (sand pack length) at every 5% of the sand pack pore volume of water/mineral oil/heptane injected.

The experiments have been assigned ID numbers and the corresponding physical characteristics of each sand pack are summarized the table 1. The physical characteristics include permeability (the standard Darcy steady state permeability test has been performed to calculate permeability of every sand pack), porosity (has been calculated based on the distilled water volume imbibed into the pore volume of every sand pack).

Table 1: Experimental data for the 8 forced immiscible drainage and imbibition floods (overburden pressure in each case is 3450 kPa).

| Experiment ID | Porosity, % | Permeability, D | Pore Volume, cm³ | Error to material balance, % | Hydrocarbon |
|---|---|---|---|---|---|
| 1 (imb-h) | 32.6 | 5.168 | 350.73 | 3.25 | Heptane |
| 2 (imb-h) | 32.5 | 5.36 | 347.92 | 0.73 | Mineral oil |
| 3 (imb-v) | 33.23 | 5.76 | 361.3 | 2.82 | Heptane |
| 4 (imb-v) | 33.15 | 6.22 | 360 | 1.17 | Mineral oil |
| 5 (drain-h) | 32.6 | 5.168 | 350.73 | — | Heptane |
| 6 (drain-h) | 32.5 | 5.36 | 347.92 | 1.63 | Mineral oil |
| 7 (drain-v) | 33.23 | 5.76 | 361.3 | 2.82 | Heptane |
| 8 (drain-v) | 33.15 | 6.22 | 360 | 1.51 | Mineral oil |

In the Experiment ID:
- imb means that the system is imbibing water. That is, water is being introduced to replace the hydrocarbon listed in the last column.
- drain means that water is being drained from the sample container by being replaced by the hydrocarbon listed in the last column.
- h indicates that the sample holder is oriented with the axis being horizontal.
- v indicates that the sample holder is oriented with the axis being vertical.

Figure 5A:
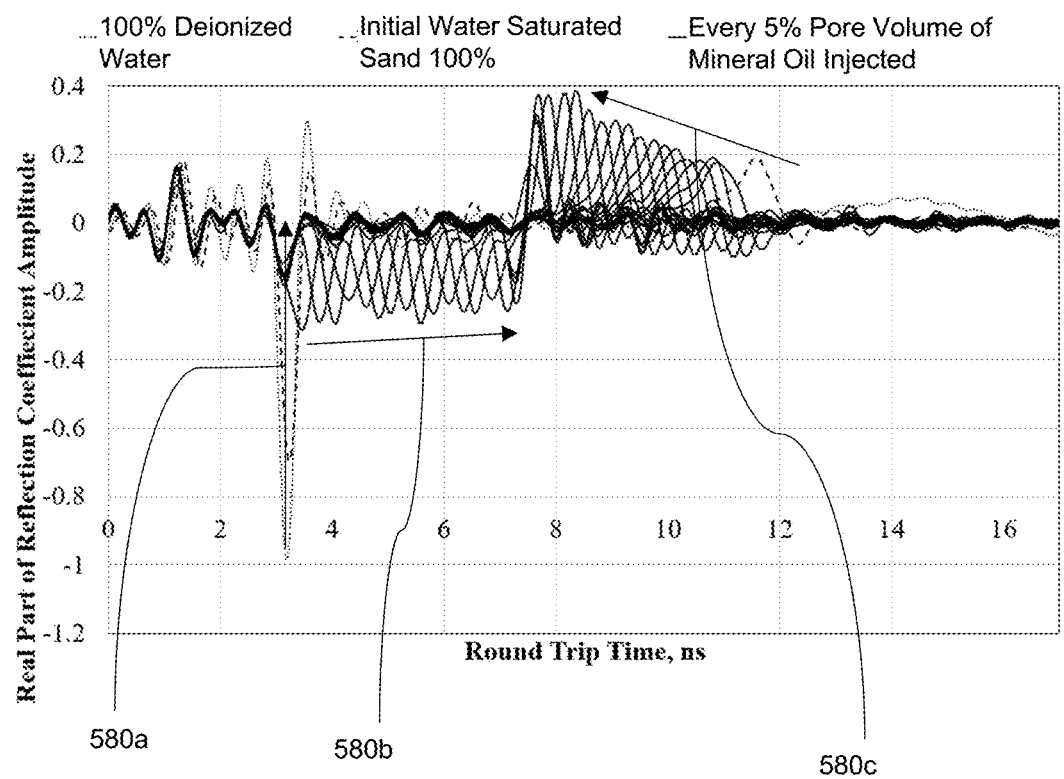
FIGS. 5a and 5b are graphs of the measured reflection and transmission coefficient responses of water and mineral oil in a sand matrix.

FIG. 5a show the determined time-domain reflection response as a function of round-trip time aggregated over the frequency range. The round-trip time is determined by measuring the reflection coefficient in frequency space and inverting this to the temporal space using the ICZT method.

The round-trip time corresponds to the time difference between the pulse being emitted by the reflection port and being received by the reflection port after reflection. The time this takes depends on the distance between the reflecting port and the material which acts as the reflector. That is, increasing time corresponds to material which is further away from the reflection port. In addition, the round-trip time also depends on the refractive index of the material between the reflection port and the reflecting portion. Increasing the refractive index of the material that the waves are travelling through will slow the waves and make the round-trip time longer.

The graph of FIG. 5a corresponds to reflections occurring from material right next to the reflection port all the way to the transmission port. As shown in FIG. 5a, there is a large negative peak 580a at around $0.3 \times 10^{-8}$ s. This corresponds to the first interface between the plug and the material in the sample holder. The magnitude of the peak is dependent on the refractive index difference between the material of the plug (PEEK in this case) and the material in the region next to the plug. Therefore, the plug-sample interface is most pronounced when the porous matrix is saturated with tap water. It is less pronounced when the porous matrix is saturated with deionized water. The region before the first main material corresponds reflections within the plug.

At the other end, there is a positive peak 580c shown in the dotted line at around $1.15 \times 10^{-8}$ s. This corresponds to a sample-plug interface between the sample and the plug at the opposite end of the sample holder. Unlike the plug-sample interface, the sample-plug interface reflection round-trip time changes as the material within the sample holder is changed. This is because changing the material in the sample, changes the speed of the electromagnetic radiation, which in turn affects the round-trip time.

In this case, as mineral oil is added, the refractive index goes down, which means that the speed of the electromagnetic radiation does up, which means that the peak corresponding to the sample-plug interface moves to shorter and shorter round-trip times.

Between the plug-sample and sample-plug interfaces, there is a series of negative peaks 580b between $0.37 \times 10^{-8}$ s and $0.75 \times 10^{-8}$ s. These peaks correspond to an intra-sample interface. In this case, the peaks correspond to the interface between the mineral oil being introduced into the sample holder from the reflection port side, and the water which is being drained.

Figure 5B:
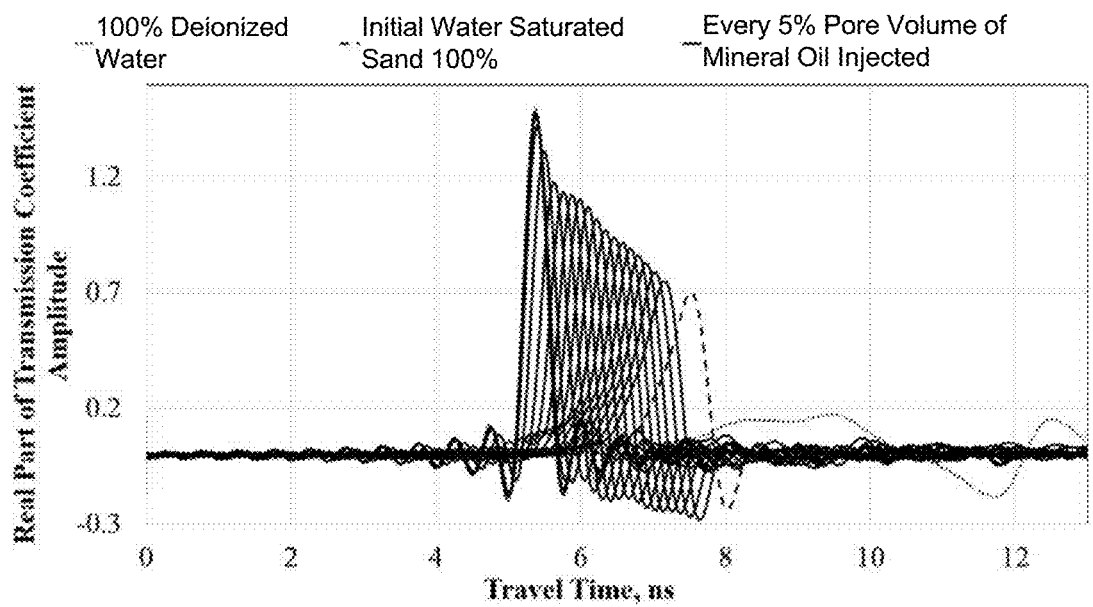

FIG. 5b is the corresponding transmission coefficients for the experiment of FIG. 5a. The peaks in FIG. 5b correspond to electromagnetic radiation passing from the reflection port through the first plug, the sample and the second plug. It will be appreciated that the travel time for the transmission wave is shorter than the round trip time for the sample-plug interface because in the reflection case, the waves must pass through the material twice, whereas in the transmission case, the waves pass through the material once.

Figure 6A:
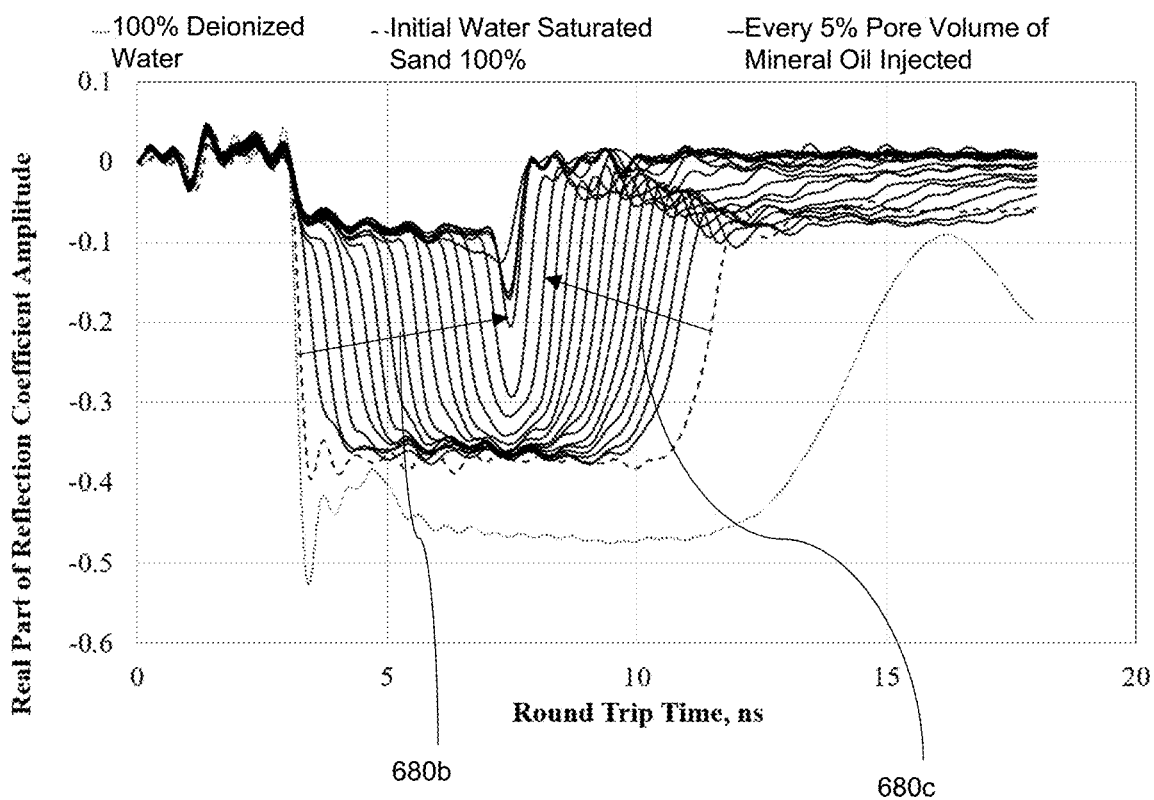
FIGS. 6a and 6b are graphs of the measured integrated reflection and transmission coefficient responses of the graphs of FIGS. 5a and 5b of water and mineral oil in a sand matrix.

FIG. 6a is the integral of FIG. 5a:

$$I_{6a} = \int_0^t I_{5a} dt$$

In this representation, an interface corresponds to a step in the function rather than a peak (or impulse).

Figure 6B:
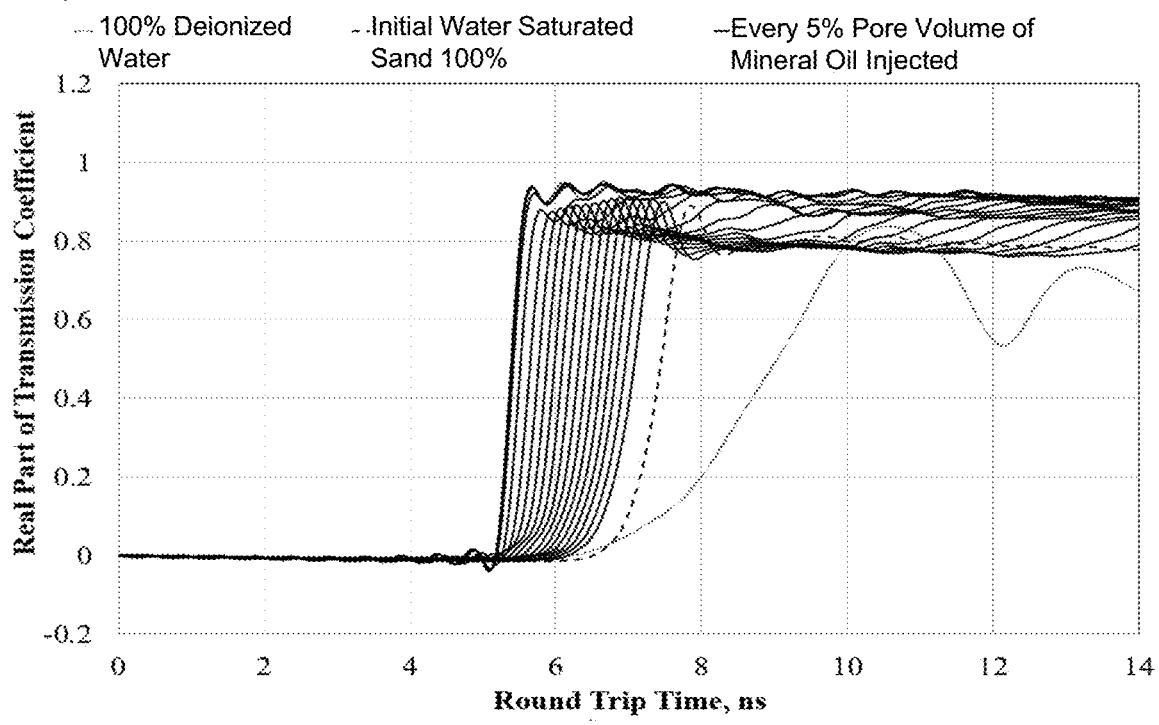

Likewise, FIG. 6b is the integral of FIG. 5b:

$$I_{6b} = \int_0^t I_{5b} dt$$

In this representation, an interface corresponds to a step 680a,b in the function rather than a peak.

In order to convert from a temporal distribution to a spatial distribution, the system is configured to first remove the artefacts of the signal which are the result of the sample assembly itself (e.g. by using the TRL calibration). Then the system is configured to search for patterns of material properties which would match the measured signal (e.g. and which are consisted with the materials known to be in the sample, the length of the sample holder etc.).

The pattern search algorithm looks for the bulk dielectric responses. In this case, measured $S_{yx}$ are the inputs to the MATLAB—Comsol coupled workflow that allows retrieval of the average frequency dielectric responses (conductivity and dielectric permittivity) of the sand pack at every certain saturation level. This algorithm is a stand-alone workflow that does not influence the profile retrieval algorithm.

Figure 3:
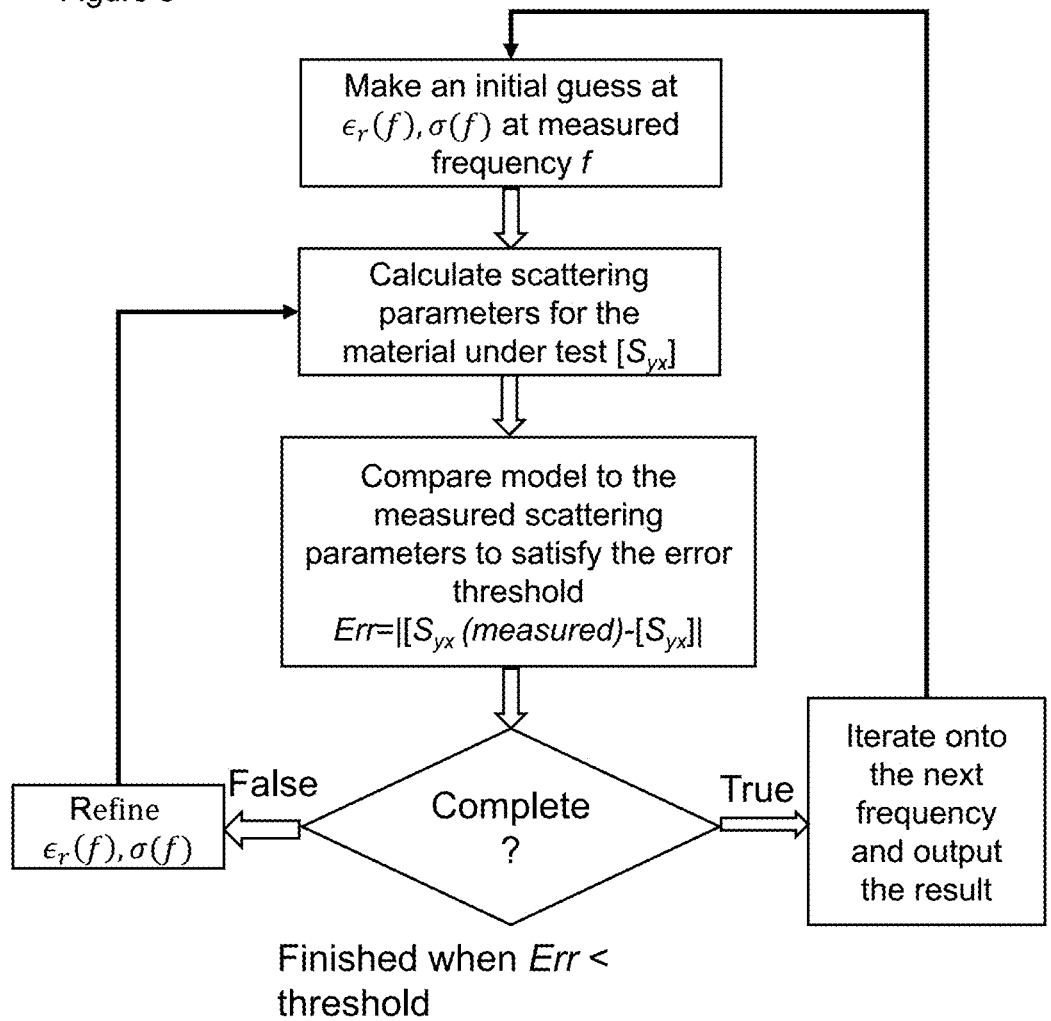
FIG. 3 is a flow diagram of the optimization algorithm to recover dielectric properties of porous media from the calibrated frequency dependent measured complex reflection ($S_{11}$) and transmission ($S_{21}$) coefficients.

The algorithm procedure is outlined schematically in FIG. 3. First dielectric constant and conductivity are proposed or assumed for a first measured frequency (say 2 MHz). Then, Maxwell equations are solved within the coaxial line to obtain the reflection and transmission responses for such proposed case. The error between the measured transmission and reflection responses and the proposed ones are then calculated. If the error is within the specified threshold, then the dielectric constant and conductivity is recorded for this specific frequency and the algorithm marches forward to the next measured frequency. If the error is too large, then the assumed dielectric constant and conductivity are changed via Pattern Search algorithm (e.g. within MATLAB).

The process repeats itself for every frequency. For situation where only TEM modes are present, a simpler version of this algorithm may be implemented by accounting for multiple reflections of the interfaces. This will not be the case, once a sheath (or rubber sleeve) is used, since there will be a radial step from PEEK plug diameter to the material's diameter. Other processes may be used to account for TE and TM modes.

The present technology also uses a "peaking" method that searches for the peaks in the time domain signal to locate the interfaces. It is also used in the emulsion experiment. This may be implemented using the MATLAB callback function "findpeaks" as well as preconditioning of the signals using windowing (Kaiser window).

The saturation water profile curves (FIGS. 7 to 14) are obtained through the normalization procedure from the measured (in frequency domain) step response of the complex reflection coefficient and then converted using the ICZT. The step response in time domain for 100% water saturated sand is used to normalize (divide by) every other step response that correspond to other sand pack saturation levels. The step response curve is obtained through the integration over time of the impulse response curve. The windowing procedure in the frequency domain could be employed to smoothen the impulse signal as a part of the ICZT algorithm.

The time to space conversion is done by calculating average velocity of the electromagnetic signal at every moment during injection. The time axis values are multiplied by this average velocity to obtain space resolution of the step response curves and the corresponding saturation profiles.

Figure 7:
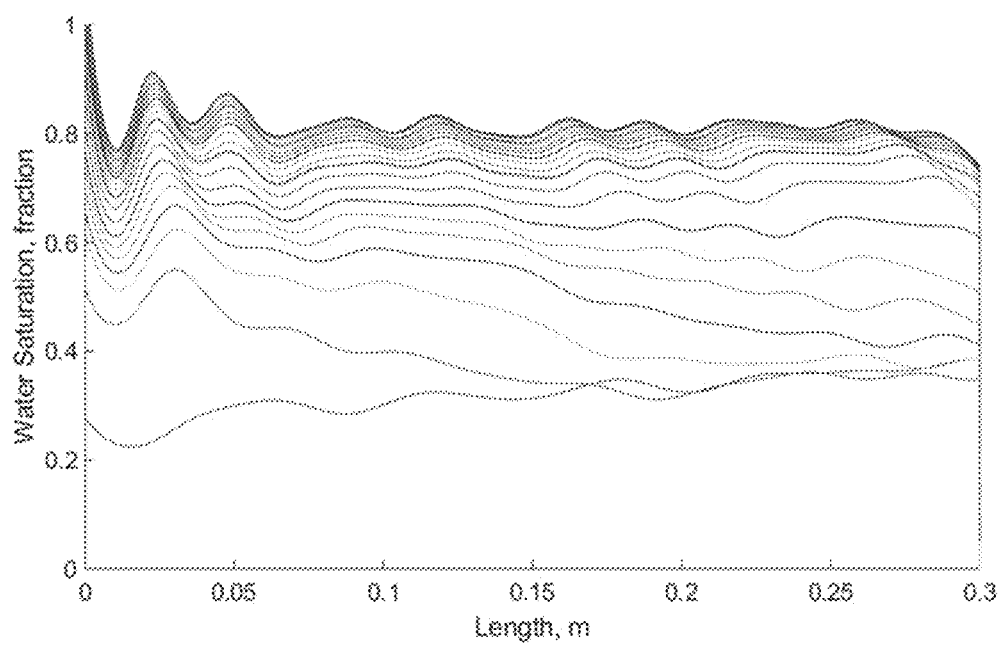
FIG. 7-14 are saturation profiles for the experiments summarized in table 1.
Figure 8:
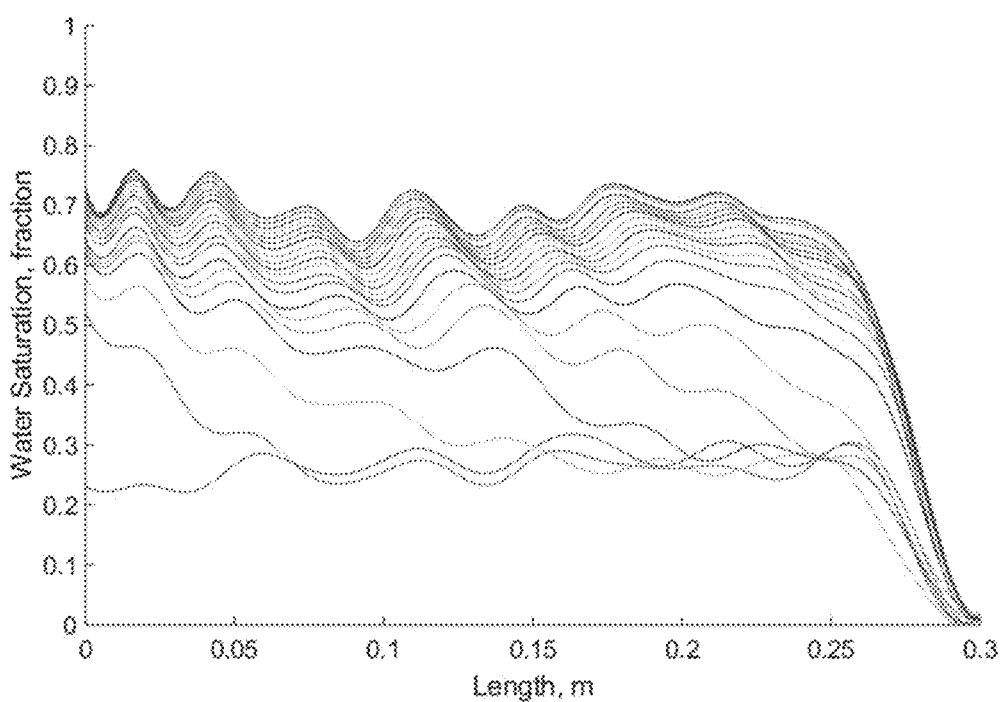
Figure 9:
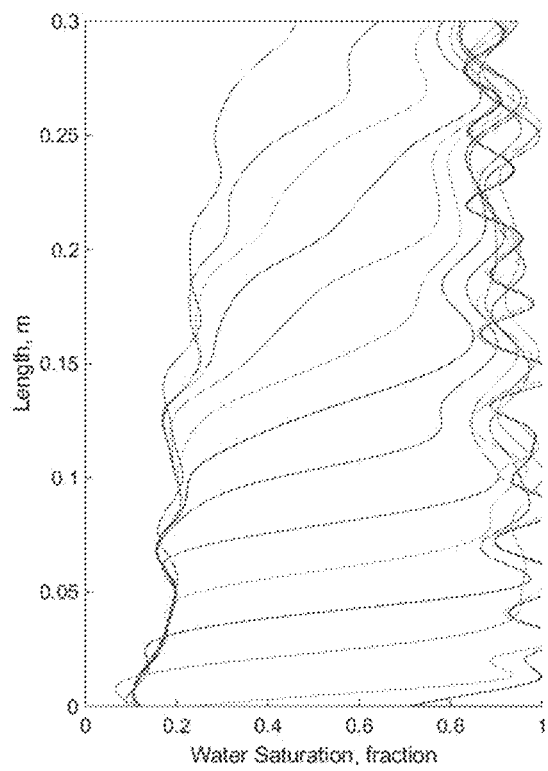
Figure 10:
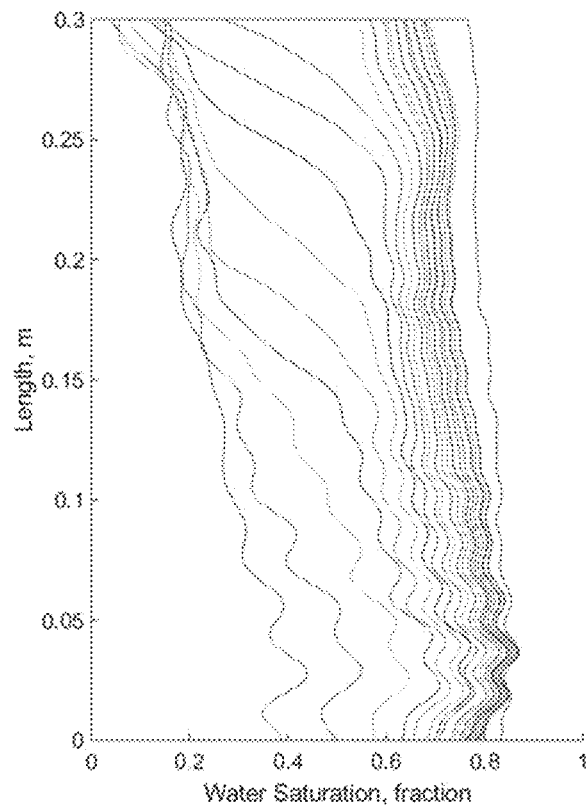
Figure 11:
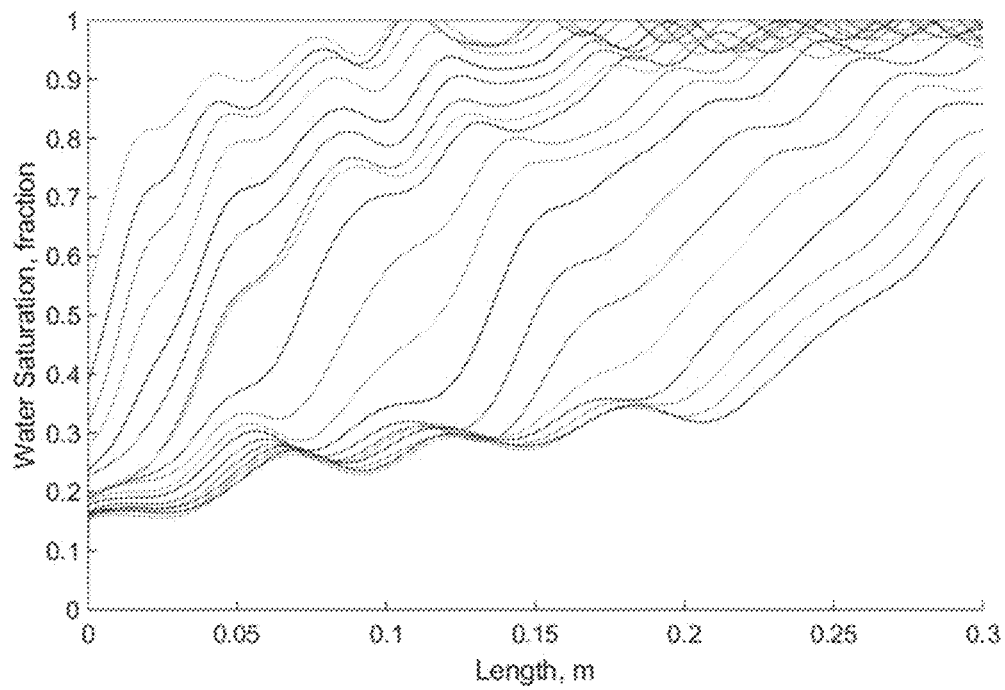
Figure 12:
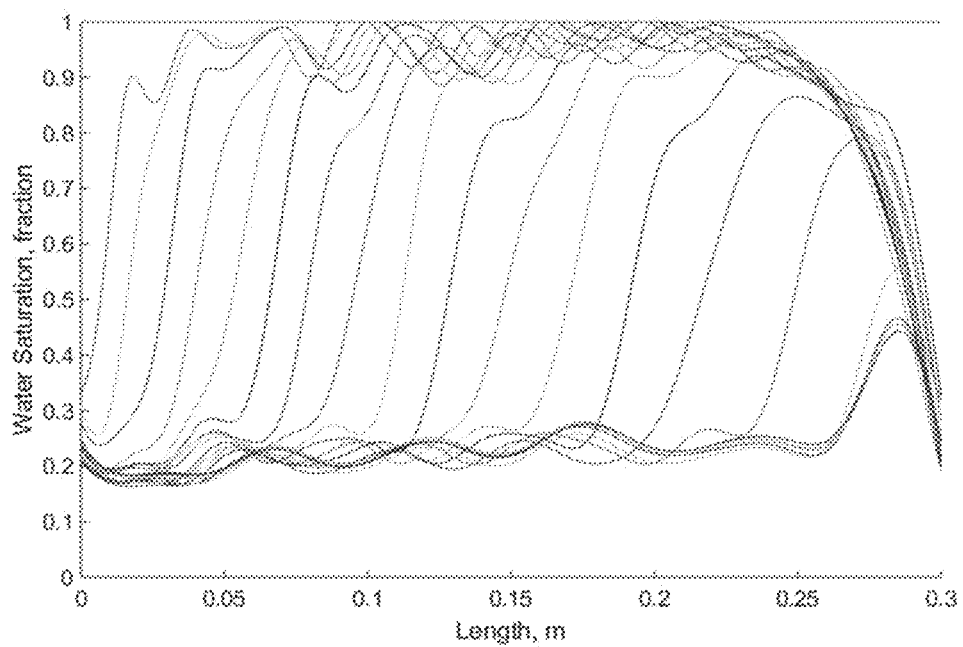
Figure 13:
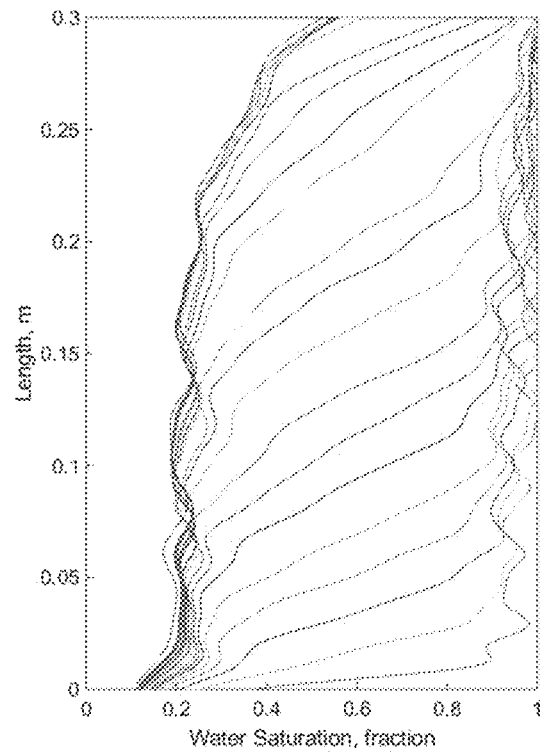
Figure 14:
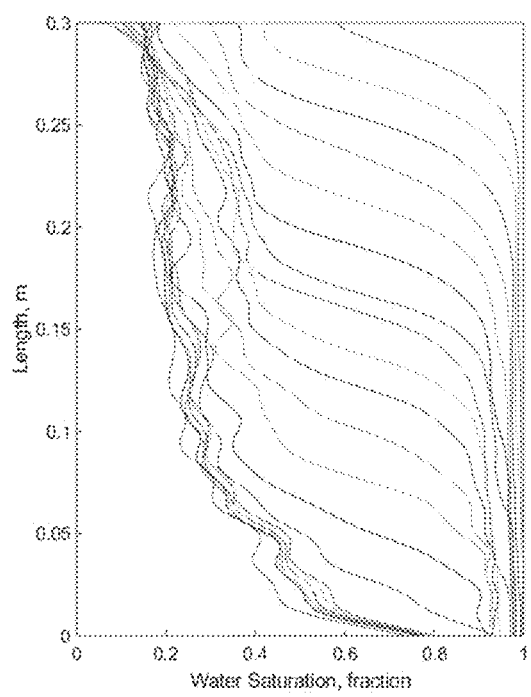

Regarding the experimental results figures:
FIG. 7 corresponds to experiment 1 in table 1.
FIG. 8 corresponds to experiment 2 in table 1.
FIG. 9 corresponds to experiment 3 in table 1.
FIG. 10 corresponds to experiment 4 in table 1.
FIG. 11 corresponds to experiment 5 in table 1.
FIG. 12 corresponds to experiment 6 in table 1.
FIG. 13 corresponds to experiment 7 in table 1.
FIG. 14 corresponds to experiment 8 in table 1.

FIGS. 9, 10, 13 and 14 are rotated 90° because in these experiments, the sample holder was oriented vertically with the fluid being introduced from the bottom.

FIGS. 7-10 correspond to water being injected into the porous matrix to displace a hydrocarbon.

Regarding FIG. 7, the lines correspond to water saturation profiles at every 5% of distilled water injected into the sand pack to displace the heptane already in the sand pack. The sample holder is in the horizontal configuration. As shown in FIG. 7, the first water injection increases the water saturation fraction as more water is injected. It can also be seen that the water saturation increases more quickly towards the injection port, and more gradually away from the injection port. It can also be seen that as more water is added, the rate of increase in water saturation diminishes. This indicates that the water may never fully be able to displace all of the heptane.

Regarding FIG. 8, the lines correspond to water saturation profiles at every 5% of distilled water injected into the sand pack to displace the mineral oil already in the sand pack. The sample holder is in the horizontal configuration. As shown in FIG. 8, the first water injection increases the water saturation fraction as more water is injected. It can also be seen that the water saturation increases more quickly towards the injection port, and more gradually away from the injection port. This is more pronounced that the heptane experiment of FIG. 7 indicating that the mineral oil is more difficult to displace. It can also be seen that as more water is added, the rate of increase in water saturation diminishes. This indicates that the water may never fully be able to displace all of the mineral oil. The upper limit for the mineral oil is lower than for the heptane experiment of FIG. 7.

Regarding FIG. 9, the lines correspond to water saturation profiles at every 5% of distilled water injected into the sand pack to displace the heptane already in the sand pack. Unlike FIG. 7, in this case, the sample holder is in the vertical configuration with the water being pumped into the bottom. In this case, because of the vertical configuration, the denser water fraction (density of around 1.0 g*cm$^{-3}$) pools towards the bottom and the less-dense heptane (density of 0.68 g*cm$^{-3}$) floats towards the top with the horizontal step function indicating a boundary interface between the two layers. It can also be seen that as more water is added, the saturation tends towards 1. This indicates that, in a vertical configuration, the water may be able more fully to displace all of the heptane.

Regarding FIG. 10, the lines correspond to water saturation profiles at every 5% of distilled water injected into the sand pack to displace the mineral oil already in the sand pack. Unlike FIG. 8, in this case, the sample holder is in the vertical configuration with the water being pumped into the bottom. In this case, like the heptane case of FIG. 8, because of the vertical configuration, the denser water fraction tends to pool towards the bottom and the less-dense mineral oil (density of around 0.8-0.87 g*cm$^{-3}$) floats towards the top. However, in this case, this effect is less pronounced because of the viscosity of the mineral oil and because the density difference between mineral oil and water is less than that between heptane and water. It can also be seen that as more water is added, the saturation is higher than the corresponding horizontal case shown in FIG. 8. This indicates that, in a vertical configuration, the water may be able more fully to displace all of the heptane.

FIGS. 11-14 correspond to hydrocarbon being injected into the porous matrix to displace water.

Regarding FIG. 11, the lines correspond to water saturation profiles at every 5% of heptane injected into the sand pack to displace the water already in the sand pack. The sample holder is in the horizontal configuration. As shown in FIG. 11, the first heptane injection reduces the water saturation fraction as more heptane is injected. It can also be seen that the water saturation increases much more quickly towards the injection port, with an interface which migrates from the injection port towards the drain port as more heptane is added. It can also be seen that as more heptane is added, the rate of decrease in water saturation diminishes. This indicates that the heptane may never fully be able to displace all of the water.

Regarding FIG. 12, the lines correspond to water saturation profiles at every 5% of mineral oil injected into the sand pack to displace the water already in the sand pack. The sample holder is in the horizontal configuration. As shown in FIG. 12, the first mineral oil injection reduces the water saturation fraction as more heptane is injected. It can also be seen that the water saturation increases much more quickly towards the injection port, with an interface (even more pronounced than the heptane-water interface of FIG. 11) which migrates from the injection port towards the drain port as more mineral oil is added.

In FIG. 13, heptane is injected from the top here to avoid the gravity effects during the flood experiment. In this case, the reflection measurements is from the port that was connected to the bottom of the sample holder.

FIG. 14 is inverted: the mineral oil for this experiment was also injected from the top. However, in this case, the information is calculated from the second port. That is, unlike for FIG. 12, in this case reflection measurements is from the port that was connected to the top of the sample holder.

Validation

Validation of the water-saturation method has been done through comparing the total water content inside of porous media at every 5% of oil or hydrocarbon injected to the collected effluent sample (i.e. performing the material balance procedure). The fraction sample collector has been used throughout all measurements to assure the accurate volume fractions of oil to water measured at the outlet, so that the total water to oil ratio present in pore space could be calculated. The accuracy is also apparent by looking at the "Error to material balance" values in table 1.

Figure 15:
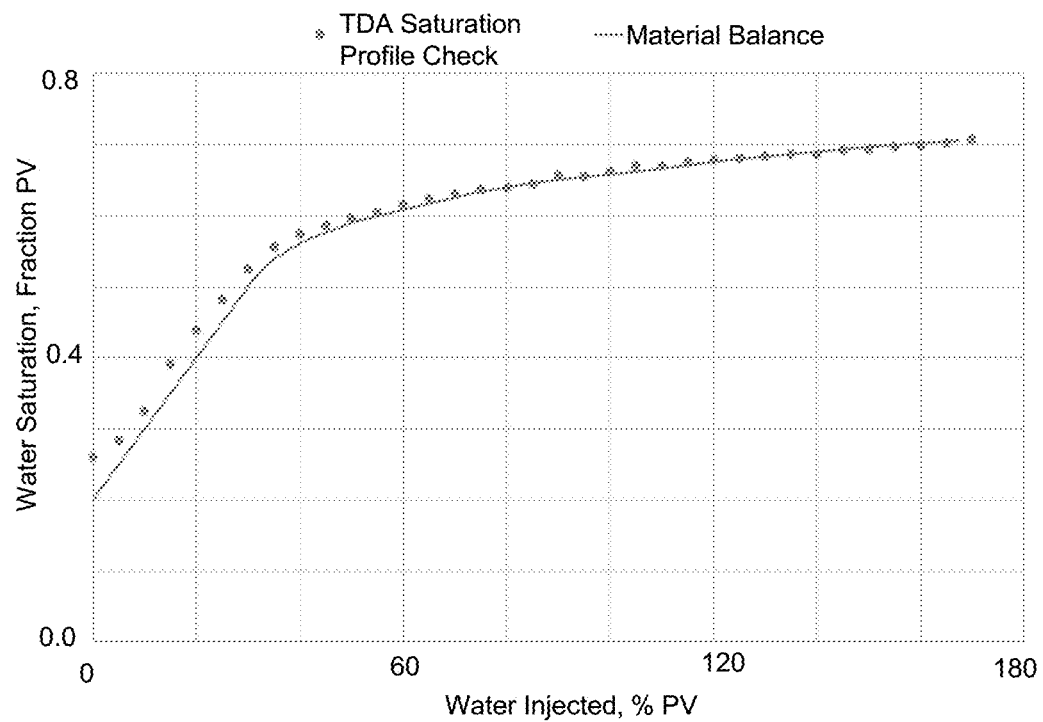
FIG. 15 is a graph showing the comparison of the total saturation calculated from the determined spatial saturation profiles with the total saturation calculated using mass balance.

FIG. 15 shows the comparison between the saturation profile calculated from the electromagnetic wave determination in dots, and the corresponding mass-balance calculation as a line for experiment 2.

Salinity

The miscible flood of 100% distilled water saturated sand pack has been performed using the 10 wt. % NaCl brine flood to test the sensitivity of our apparatus and the method to derive concentration profiles due to change in conductivity. The resulting normalized concentration profiles are given in FIG. 16. The normalization has been performed by dividing every response curve by the response curve of the end of the brine flood. It can be assumed that after 2 pore volumes the salinity of brine in pore space will be even and equal to 10 wt. %. This assumption holds due to the absence of any change in amplitude of the signal after injecting 2 pore volumes of brine.

Figure 16:
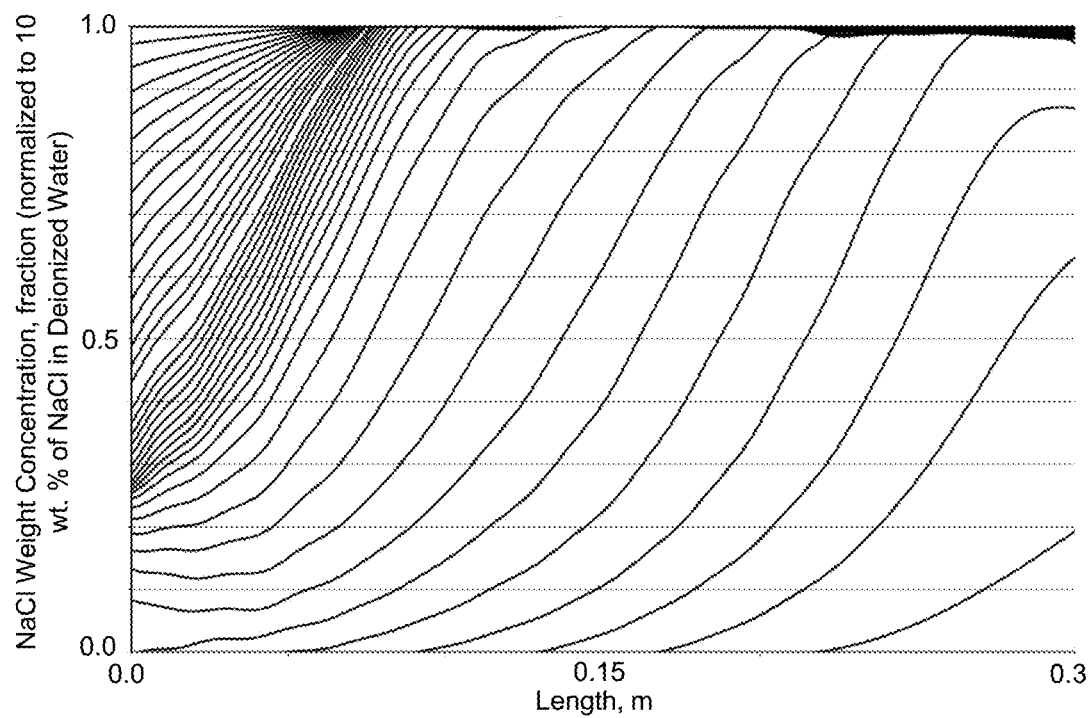
FIG. 16 is a graph showing how the NaCl distribution changes as brine is injected.

FIG. 16 shows normalized NaCl concentration during brine flood (10 wt. % NaCl in distilled water) through deionized-water-saturated sand pack.

FIG. 16 shows the normalized salt concentration during the brine flood at every 5% of the total pore volume of the brine injected. The brine was prepared by diluting in deionized water at 10.36 weight percent. The curves in FIG. 16 show normalized concentrations. The normalization has been performed by dividing every step response in space (we obtained it using the same steps of the workflow described before (see the FIG. 4)) at every 5% of the total pore volume of the brine injected by the step response of the fully saturated with brine sand pack. The signal of the fully saturated with brine sand pack was measured after 2 full pore volumes injected. The experiment lasted 2 pore volumes due to the fact that the effluent stopped changing significantly after that. The effluent sample has been collected as in the experiments with oils (immiscible floods). The total salt concentration at every point during injection has been calculated based on the area underneath every normalized curve.

Figure 17A:
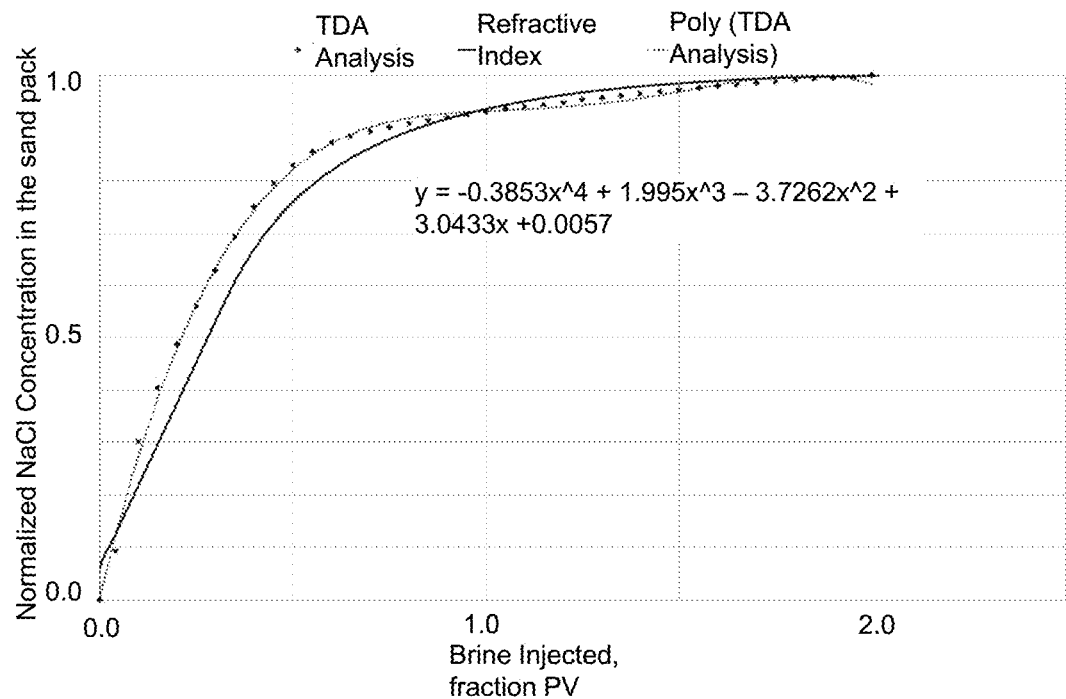
FIG. 17a is a showing the comparison of the total NaCl concentration calculated from the determined spatial saturation profiles of FIG. 16 with the total NaCl concentration calculated using refractive index of material drained from the sample holder.

As shown in FIG. 17a, to validate this method, the effluent samples have been collected via sample collector and weights as well as refractive index values have been analyzed. Validation of our method and apparatus to obtain real-time dynamic salinity profiles has been validated through comparison of the normalized bulk concentration of salt being present at all times (please note that concentrations have been normalized by the NaCl concentration the injected brine slug region/front).

Figure 17B:
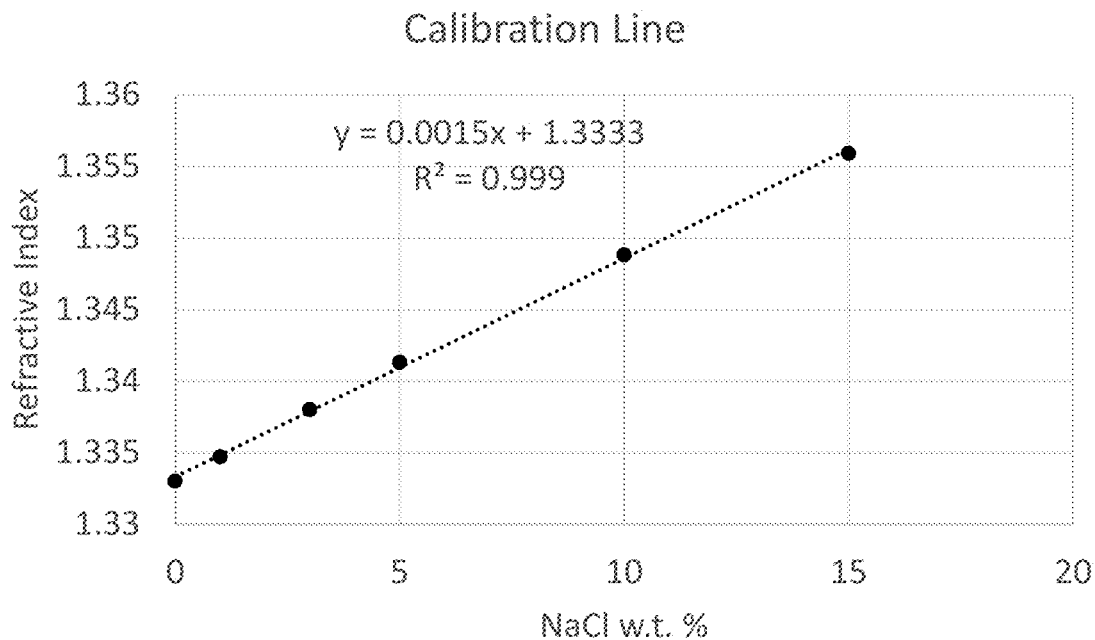
FIG. 17b shows the relationship between refractive index and NaCl concentration.

The points in FIG. 17a represent the normalized total concentration within the injected brine slug. The refractive index experiment has been conducted on the effluent samples to validate the total salt concentration within the injected brine slug during the water flood. As shown in FIG. 17b, correlation between the measured refractive index and the salt concentration in the effluent samples have been built to calculate the total salt concentration in the sand pack at every time during injection. This relationship is linear.

Other Options

Rubber sleeve material as well as the plastic material for the fluid delivery plugs and the isolator plugs may be changed to withstand the desired temperature test requirements. Kalrez and Aflas could be used to replace the material of the O-ring on all plastic inserts to raise the temperature rating of the device all way up to 400° C. The higher-temperature and more expensive composites and PEEK modifications could be used to replace PEEK plugs to achieve even higher temperature ratings for the device.

The electromagnetic signal delivery/reception system may be used to heat the sample. For example, the system may comprise a generator of electromagnetic energy at certain frequency with amplifier connected to heat up the porous media and/or liquids.

The VNA may be configured to provide a wider spectrum range of the reflection and transmission measurements (from 5 Hz to several THz).

The present technology helps allow dynamic real-time acquisition of saturation profiles and fluid compositions within porous media inside and outside of the laboratory. Dielectric properties of porous media at different fluid saturation levels have direct applications in electromagnetic simulators and workflows to allow for optimized electromagnetic heating solutions (radiofrequency, induction heating processes) to be implemented in the field.

Layer Detection

The technology may also be used to detect of fluid levels and/or layers in storage devices such as tanks, wells or other vessels. In particular the technology deals with the determination of mixed fluid interfaces such as emulsion layers. The technology may also allow the determination of the interfaces, as well as the thickness and composition distribution of said layers.

Like the laboratory system described above, the present system is a 2-Port VNA powered system that measures temporal saturation composition of the emulsion/suspension/foam constituents.

Constituents could be in gas-liquid (foam), liquid-liquid (emulsion) and solid-liquid (suspensions) states. The Vector Network Analyzer (VNA) is used to continuously (temporal resolution is less than a second) send and receive nearly instantaneous (order of picosecond time interval between various frequency pulses within one sweep) pre-generated low power signals at multiple frequencies, which will be referred as frequency sweeps.

The resulting measurements are on-fly transmission and reflection responses that are fed to the inversion algorithm that employs inverse chirp z-transform (thereafter is referred as ICZT), rational polynomial fitting procedure to achieve a better frequency sampling resolution. The result of the inversion procedure is the signal response in time domain which is converted to length (distance along the probe placement through tank/vessel) of the dielectric constant of the liquids in place. The last calculation is based on the characteristic impedance calculation of the probe submerged in tank/vessel filled either with top or bottom fluid. Normalization is then applied to the resulting space domain signal to generate fractional composition curves (oil-water ratio in emulsions, solid particle concentration in suspensions and gas-liquid ratios in foams).

Figure 18:
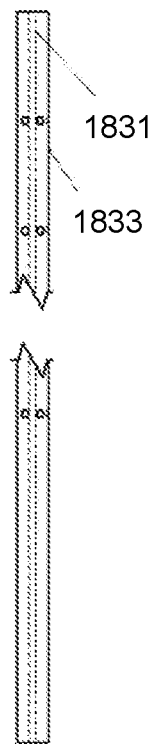
FIG. 18 is a side view of an alternative waveguide configuration.

FIG. 18 shows a coaxial waveguide comprising a central electrode 1831 and a channel electrode 1833. In this case, the channel electrode comprises holes (or is otherwise porous) to allow fluid flow between the inside and outside of the channel through the channel walls. This allows the electrode to act as part of a waveguide, but also allows the waveguide to be used inside a tank.

Figure 19:
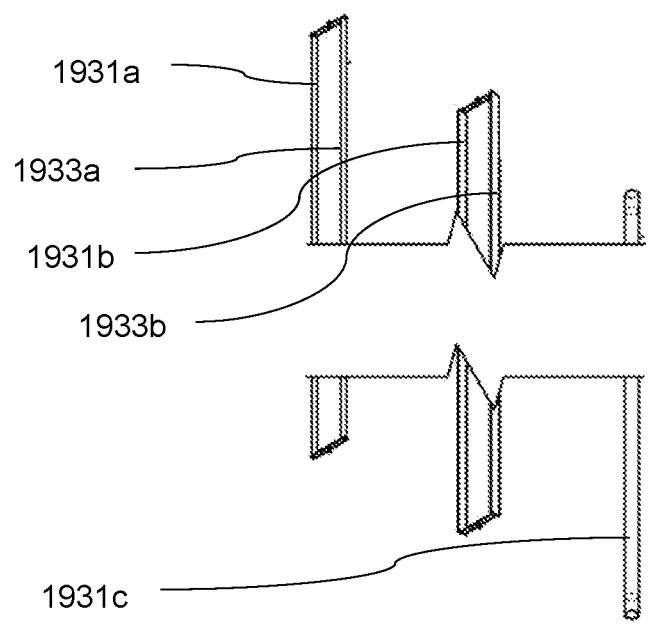
FIG. 19 is a side view of three alternative waveguide configurations.

FIG. 19 shows three alternative waveguides which may also be used within a tank: 2-Port Double Rod Wave Guide Probe comprising two rod electrodes 1931a, 1933a; 2-Port Double Plate Wave Guide Probe comprising two plate electrodes 1931b, 1933b; and a 2-Port Rod Probe 1931c. For the rod probe, the stilling well itself may serve as the second electrode. The idea is the same as in the coaxial line. Also, a tank's/vessel's side wall can be utilized as a second electrode, when a probe is inserted into the tank/vessel next to it.

Figure 20:
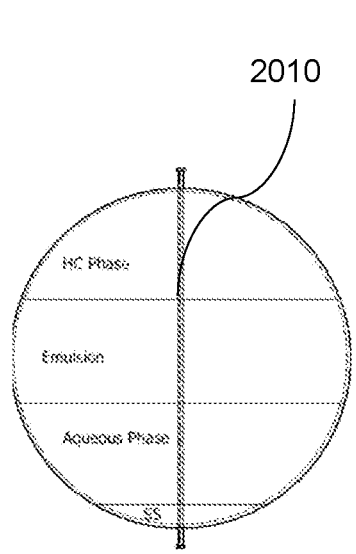
FIG. 20 is a side view of a tank with an embodiment of the present apparatus configured to determine the spatial distribution of strata within the tank.
Figure 20:
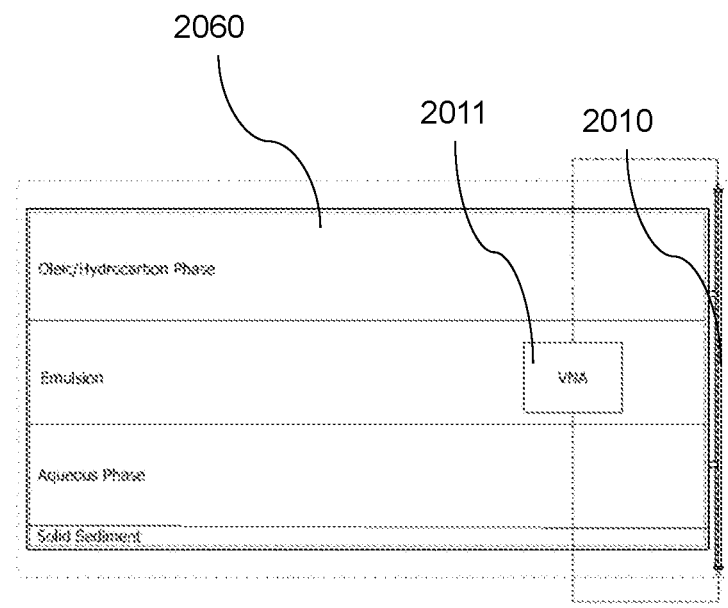

FIG. 20 shows the placement of the 2-Port VNA System 2011 in a tank/vessel 2060. In this case, the sample assembly 2010 is located within a stilling well attachment. A stilling well is a smaller chamber that is installed in conjunction with the tank that is used to isolate a portion of a system's flow. The stilling well may be inside or outside the tank (in fluid communication with the tank). Because the stilling well is in fluid communication with the tank, the fluid in the still well rises and falls with the tank, but it will not be subject to the turbulence that may be present in the tank. It will be appreciated that VNA controller may be located outside the tank.

In this case, the tank contains a solid sediment at the bottom, with an aqueous phase above the solid sediment. A hydrocarbon layer is located towards the top. Between the aqueous phase and a hydrocarbon layer, an emulsion phase has formed. Determining the vertical extent of these layers may allow the user to selectively extract particular materials by appropriately positioning a drain and/or allow the user to determine if settling of the contents has completed (e.g. after agitation, transport or the addition of new material).

Figure 21:
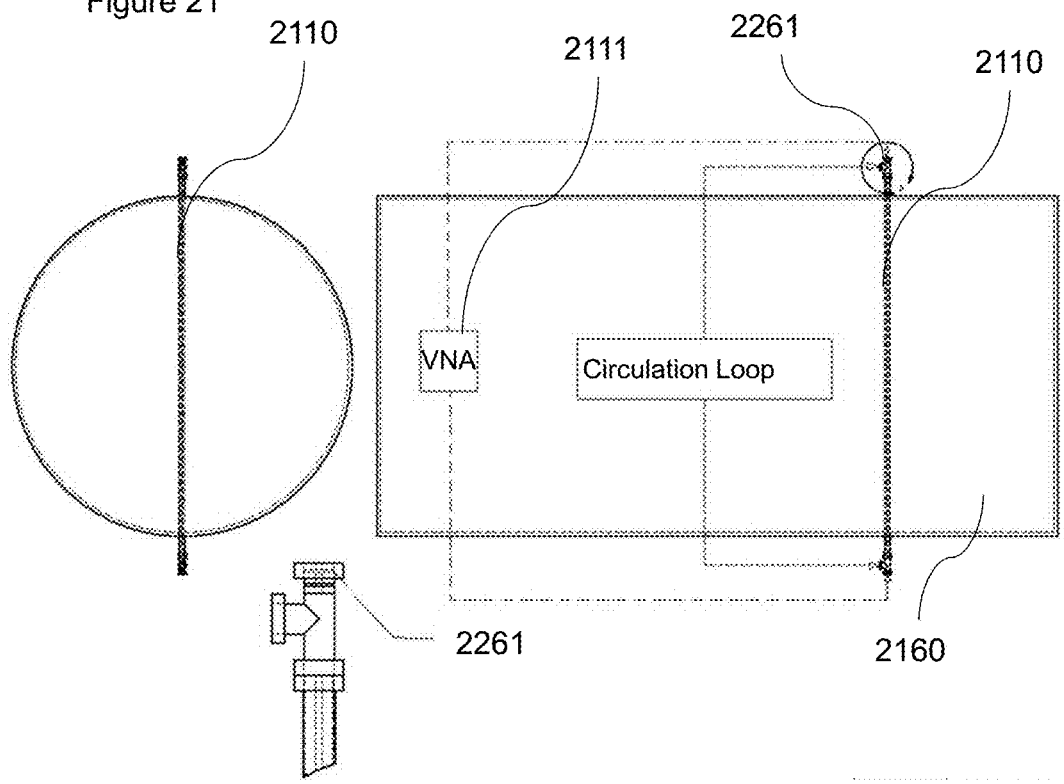
FIG. 21 is a side view of a tank with a further embodiment of the present apparatus configured to determine the spatial distribution of strata within the tank.

FIG. 21 shows the placement of the 2-Port VNA System 2111 in a further tank/vessel. In this case, the sample assembly 2010 is located within the tank. In this case, the system comprises a circulation system 2261. The circulation system, which may comprise a pump and a channel, is configured to pump solvent (e.g. toluene, xylene) to flush the probe (e.g. once in a few years) to avoid buildup that highly viscous oil and bitumen could be produced after being in contact with the probe for extended periods of time.

Figure 22:
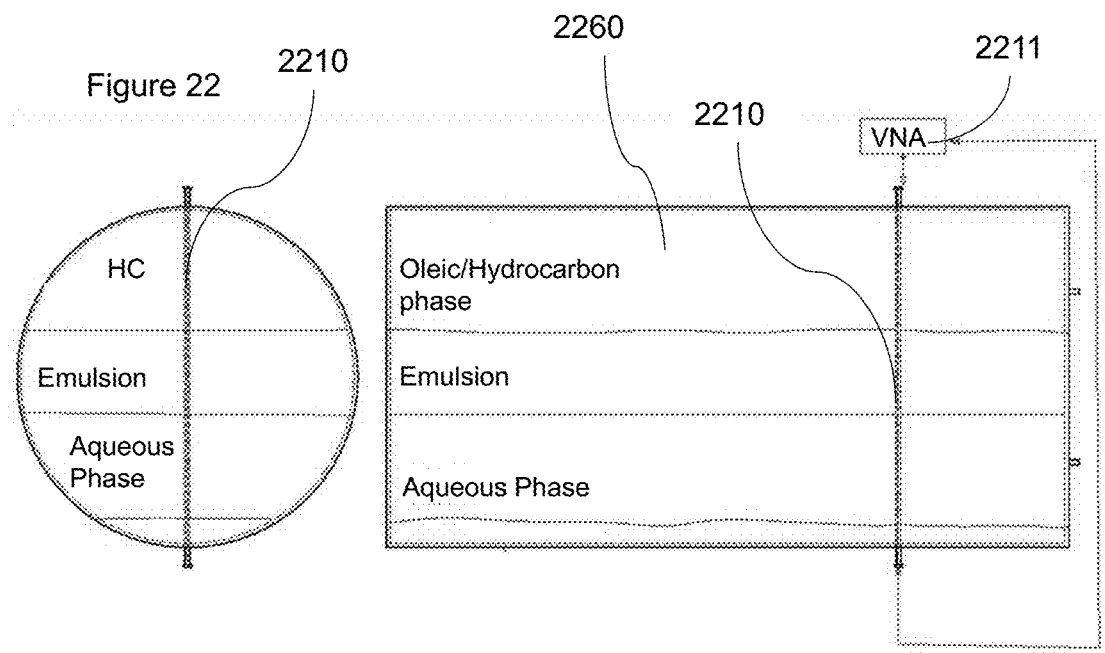
FIG. 22 is a side view of a tank with a further embodiment of the present apparatus configured to determine the spatial distribution of strata within the tank.

FIG. 22 shows the placement of a 2-Port VNA System in a tank/vessel (through double flange double port configuration). Two-port measurements may be significantly more accurate due because the signal can travel both ways and not be terminated at one end (Shorted at the bottom or have an Open end). Possible ambiguities in emulsion rag layer can be better resolved using information from both ports. The volume and the content of the build up at the bottom of a tank/vessel can be estimated and analyzed online utilizing the bottom port signal. Another advantage of this system is that it can be used to on-line monitor the emulsion slugs of increased thickness (at least 20 cm). The system can also resolve saturation profiles along the tank/vessel within the emulsion rag layer.

Thanks to the multiple frequency data, complex dielectric frequency responses (relative dielectric constant and electric conductivity) can also be retrieved by analyzing reflecting and transmission from the material interfaces (see the additional experimental data file attached for more detail).

In this case, the tank contains a solid sediment at the bottom, with an aqueous phase above the solid sediment. A hydrocarbon layer is located towards the top. Between the aqueous phase and a hydrocarbon layer, an emulsion phase has formed.

Figure 23:
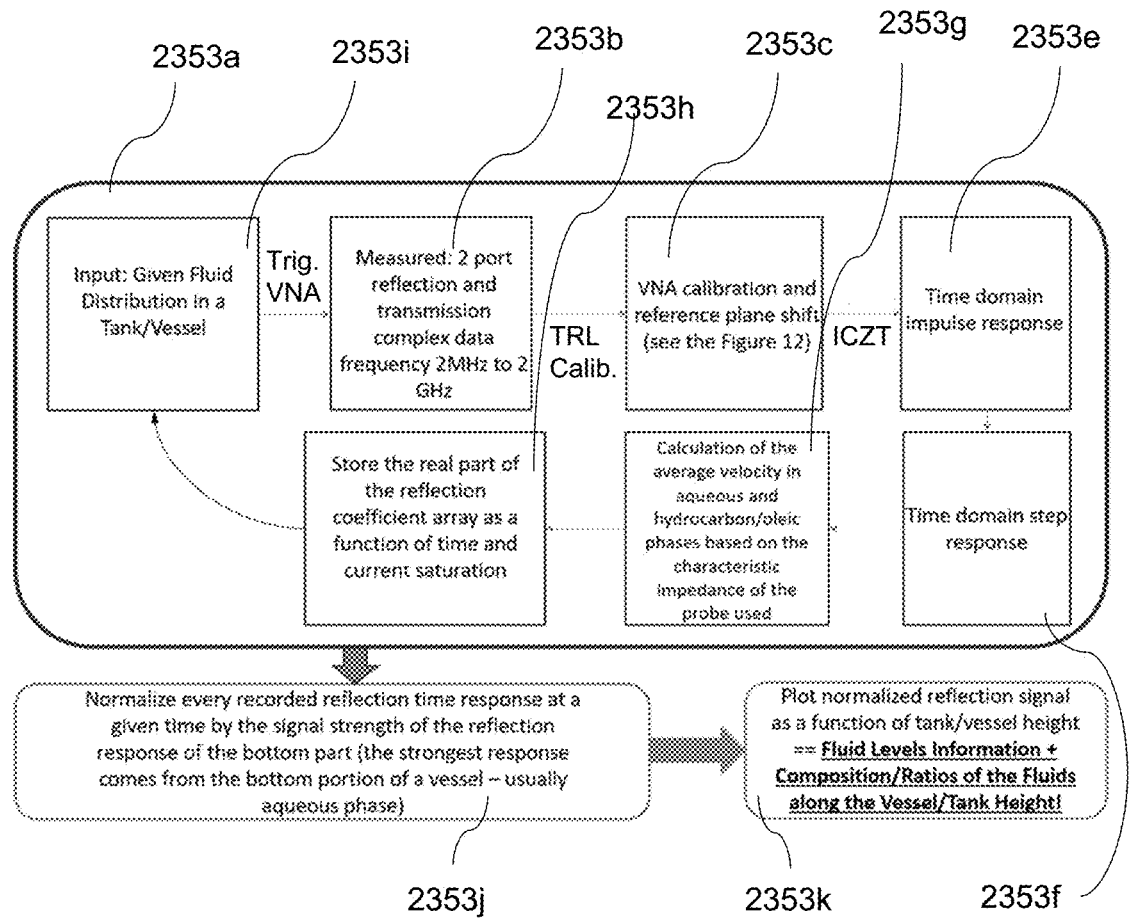
FIG. 23 is a flow diagram of the algorithm to recover time-dependent fluid level profiles from the raw frequency dependent measured complex reflection ($S_{11}$) and transmission ($S_{21}$) coefficients.

FIG. 23 shows how this system can be used to monitor a tank level information in real time. For example, this method may be used in conjunction with the systems shown in FIGS. 20-22.

For example, the system can perform a series of measurement cycles 2353a to determine the response over time (e.g. as the tank is filled, emptied, or is settling).

Each measurement cycle comprises measuring the raw frequency response by the VNA 2353b (which includes the response of the sample and components of the sample assembly).

The raw data is then processed 2353c in order to isolate the response of the sample alone.

In this case, the time domain impulse response 2353e of the sample is calculated in the time domain using an ICZT.

Then the time-domain step response 2353f is determined by integrating the impulse response over time.

This is then converted to a spatial response 2353g using the speed of the EM waves within the sample. In this case, the calculation of the average velocity in the aqueous and hydrocarbon/oleic phases is passed on the characteristic impedance of the probe used.

This array is then saved 2353h and the cycled restarted 2353i.

In order to determine the various layers within the tank, the array is normalised 2353j by dividing the measured response by the signal strength of the reflection response at the bottom portion of the vessel (or that corresponding to the aqueous phase).

From this, the normalized signal is plotted 2353k as a function of tank height. Changes in this function are indicative of different levels within the tank.

Figure 24A:
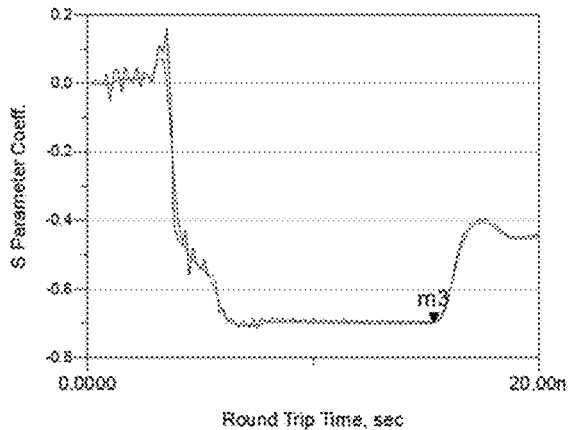
FIGS. 24a and 24b are graphs of reflection data in the temporal and the corresponding frequency domains.
Figure 24B:
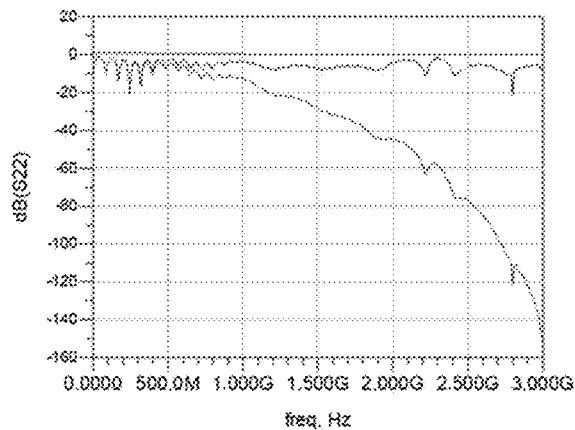

FIGS. 24a and 24b show the windowed response of the measured reflection coefficient in frequency (right) and time (left) domains. In the frequency domain the higher frequency terms are reduced in amplitude by attenuating the higher frequency components. This corresponds to the smoother curve in the time domain as shown in FIG. 24a.

Figure 25:
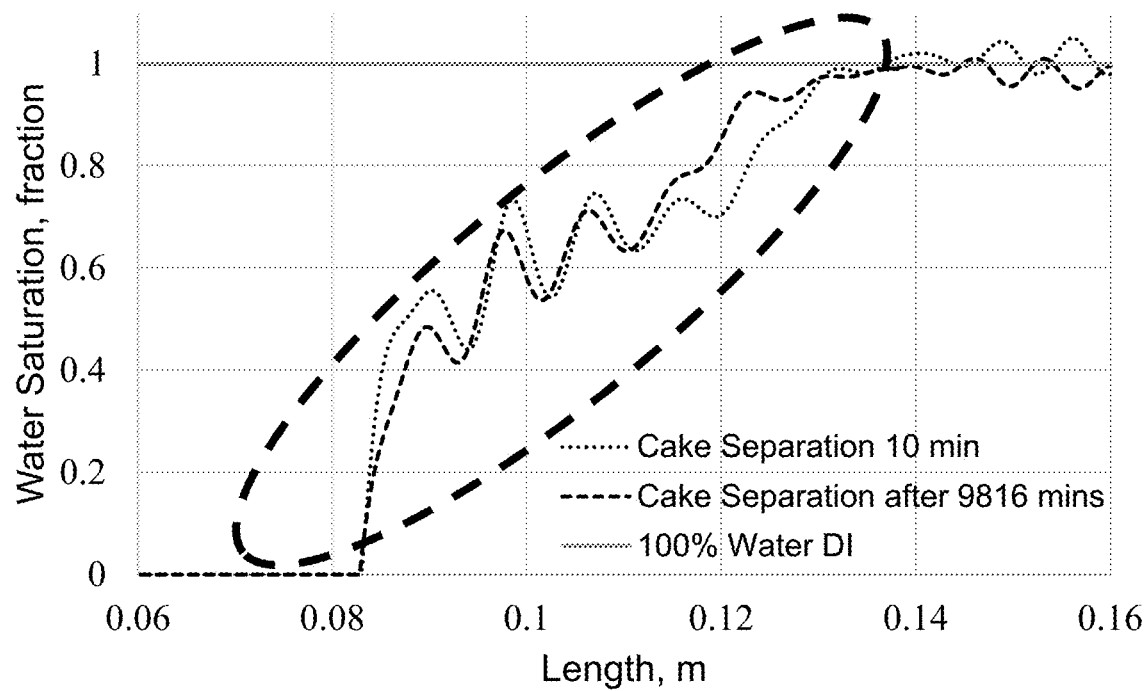
FIG. 25 is a graph showing the levels within a tank determined by the present technology.

FIG. 25 shows an example of a tank comprising water and oil. As shown in FIG. 25, the oil generally floats to the top forming a pure oil layer down to around 0.08 m, and the water generally sinks to the bottom and forms a pure water layer up to around a 0.13 m from the top. Between the two there is an emulsion layer which is formed from a mixture of oil and water. This emulsion layer is quite stable because the water saturation function has not significantly changed after 9816 minutes (almost 7 days).

Emulsion Rag Layer Experimental Results and their Analysis

Figure 26:
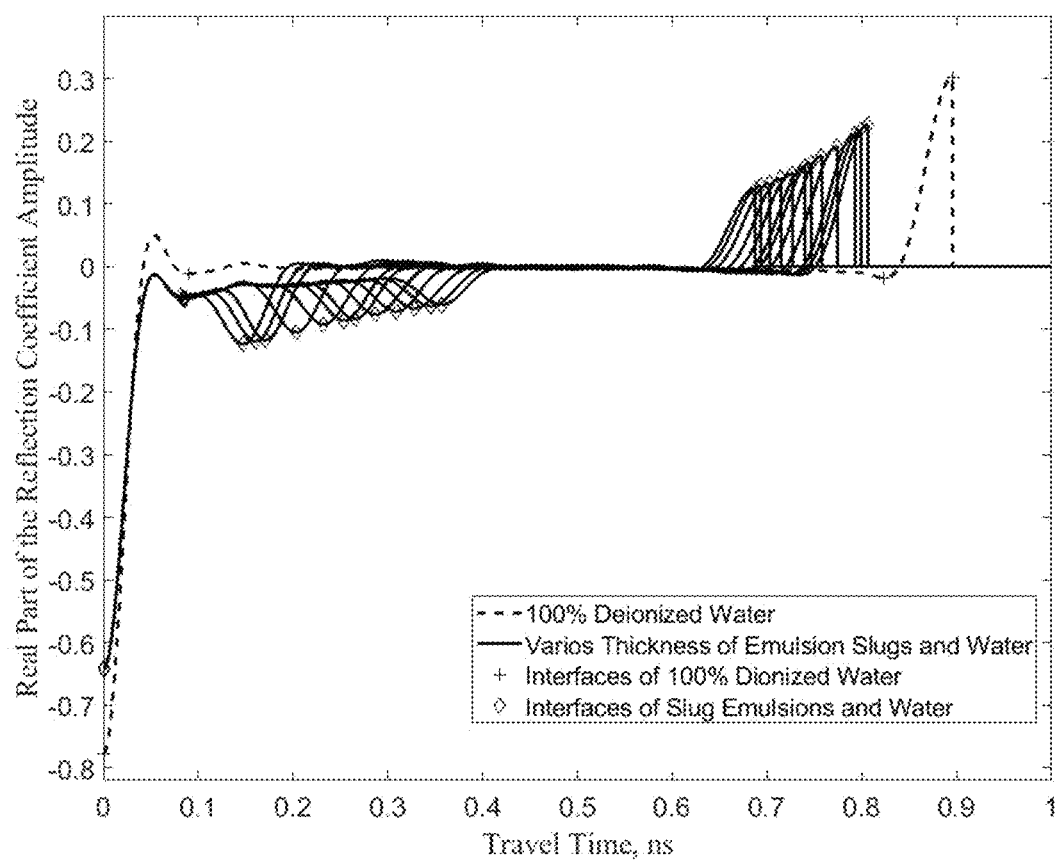
FIG. 26 is a graph showing emulsion rag layer experiment impulse signal in time domain.

FIG. 26 shows an emulsion rag layer experiment-impulse signal in time domain: oil in water 50/50 wt. % emulsion was prepared to displace deionized water from the coaxial sample holder and the signals was recorded as more emulsion is injected.

Figure 27:
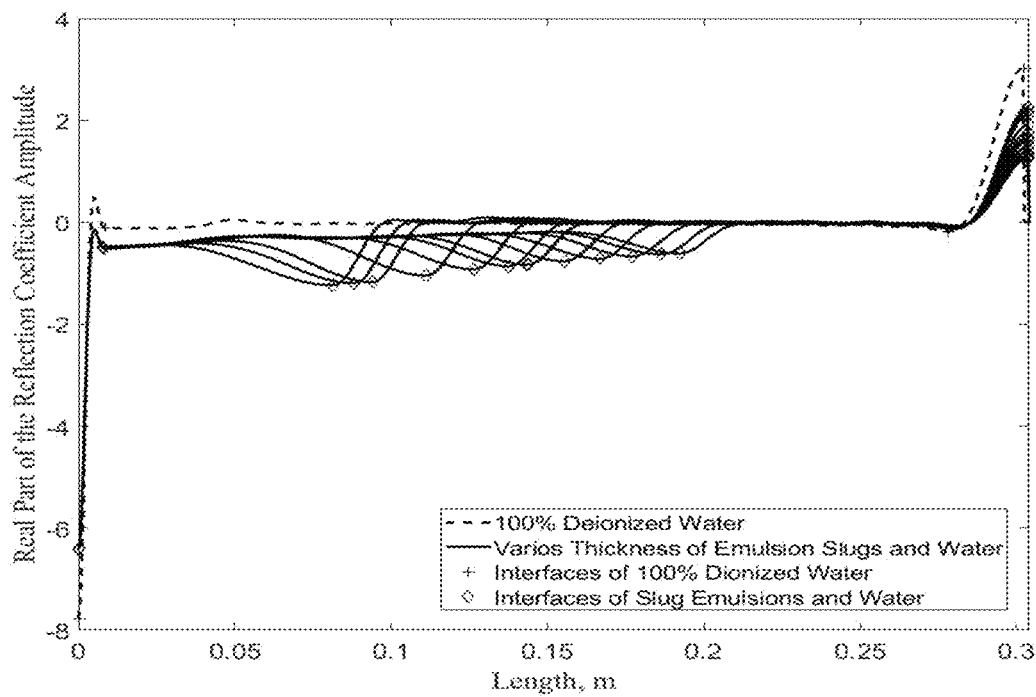
FIG. 27 is a graph showing the emulsion rag layer experiment impulse signal in space domain.

Here the processes are the same as in the case with the thinner emulsion rag layer experiment. This experiment demonstrates that our technique is capable of detecting emulsion layers as thick as 0.2 m. This is can be seen in FIG. 27. The main difference in this algorithm is that we have first automatically picked (using MATLAB's callback function "findpeaks" in combination with the low-filtering procedure via Kaiser window) the interfaces (peaks in the signal in time domain) of PEEK reflection plug/emulsion, emulsion/water and water/PEEK transmission plug (in the signal above it is from the left to the right).

These time boundaries of the fluid-fluid interfaces were used to reconstruct the signal from time domain to the space domain using the same formula for the wave length as is mentioned above. This formula is:

$$v = \lambda f = c_m = c_o/n = c_o/\sqrt{\epsilon_r}$$

The main difference here is that the relative dielectric constant $\epsilon_r$ of water was used to find the velocity of the signal moving through the water phase first. Then, having calculated the length of the remaining water slug in the sample holder using the formula above and from knowing that the dielectric constant of water is 80, the length of the emulsion slug's length (substruction from the total length of the sample holder, that is 0.3 m) is calculated. From knowing the length of the emulsion slug and the time it takes for the signal to pass through, the velocity of the signal in the emulsion phase is calulculated. Finally, knowing the velocity in both phases, the time argument of every point of the signal in time domain is multiplied by their corresponding velocity to obtain this signal in space (see FIG. 27). The peaks here represent locations, where the emulsion begins and ends as well as the beginning and the end of the sample holder. This signal is then integrated with respect to time. The resulting signal is normalized by its maximum of value (integrated signal) at every injection step to obtain the water saturation profile along the length of the sample holder (see FIG. 28).

FIG. 27 shows the emulsion rag layer experiment—impulse signal in space domain: oil in water 50/50 w.t. % emulsion was prepared to displace deionized water from the coaxial sample holder and the signals was recorded as more emulsion is injected.

Figure 28:
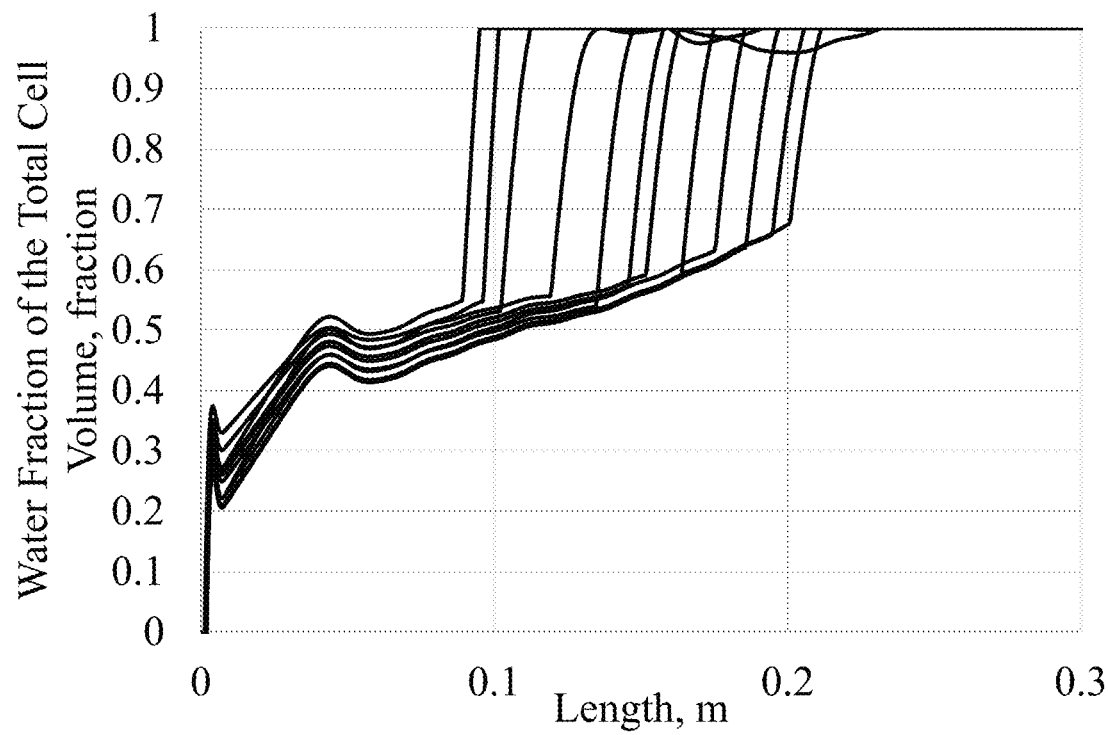
FIG. 28 is a graph showing the water saturation profile along the sample holder's length

FIG. 28 shows the water saturation profile along the sample holder's length (an example of the spatial distribution of the materials within the sample). The vertical portion moves to the right as the emulsion displaces the pure deionized water.

Figure 29:
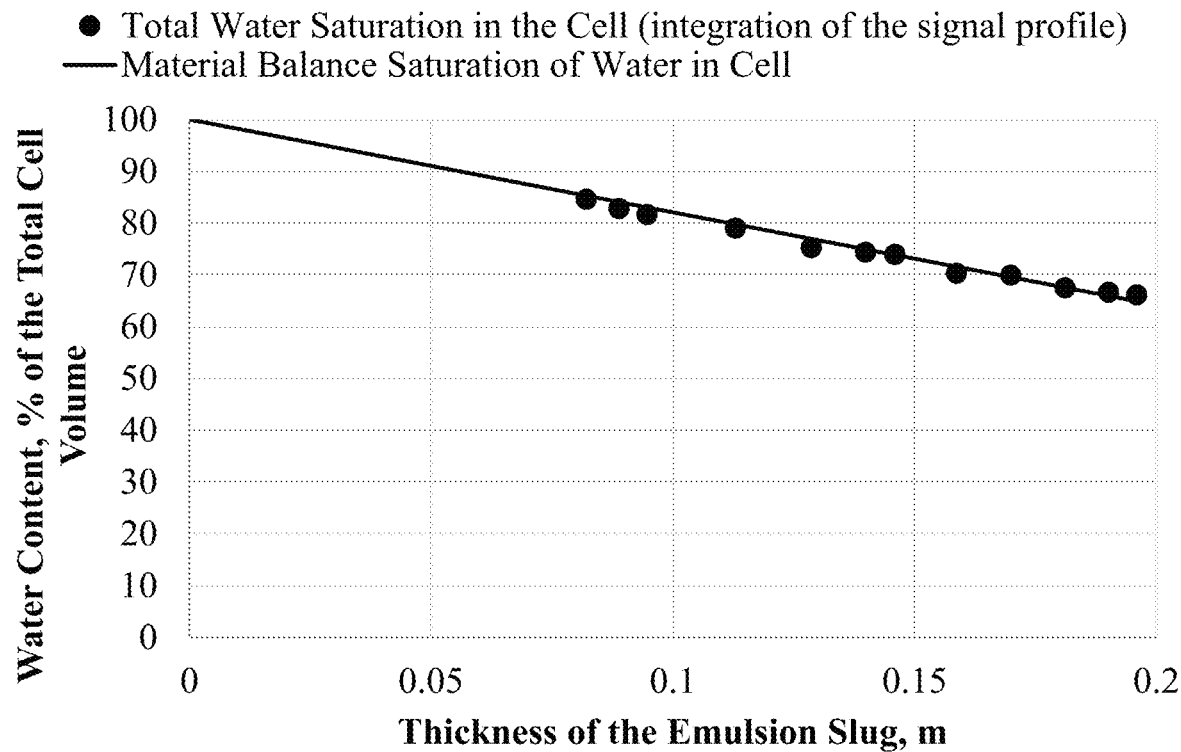
FIG. 29 is a graph showing is a comparison between the integrals of the sensed deionized water saturation profiles and the total water saturation calculated from the material balance.

FIG. 29 is a comparison between the integrals of the sensed deionized water saturation profiles (areas under every curve in FIG. 28) and the total water saturation calculated from the material balance.

Sensing Frequency-Dependent Dielectric Constant and Conductivity Responses

FIGS. 30-34 relate to an experiment in which the sample holder is filled with the nanosolution (no rubber sleeve was used). Reflection and transmission of the signal at every frequency was measured and converted to the dielectric constant and the conductivity frequency responses (see FIG. 32, FIG. 33). The nanosolution was prepared by agitating the barium titanate ($BaTiO_3$) and magnetite ($Fe_3O_4$) particles in deionized water at 0.1, 0.5 and 1 w.t. % using sonication process. The algorithm used to convert the recorded transmission and reflection coefficients is shown below.

Figure 30:
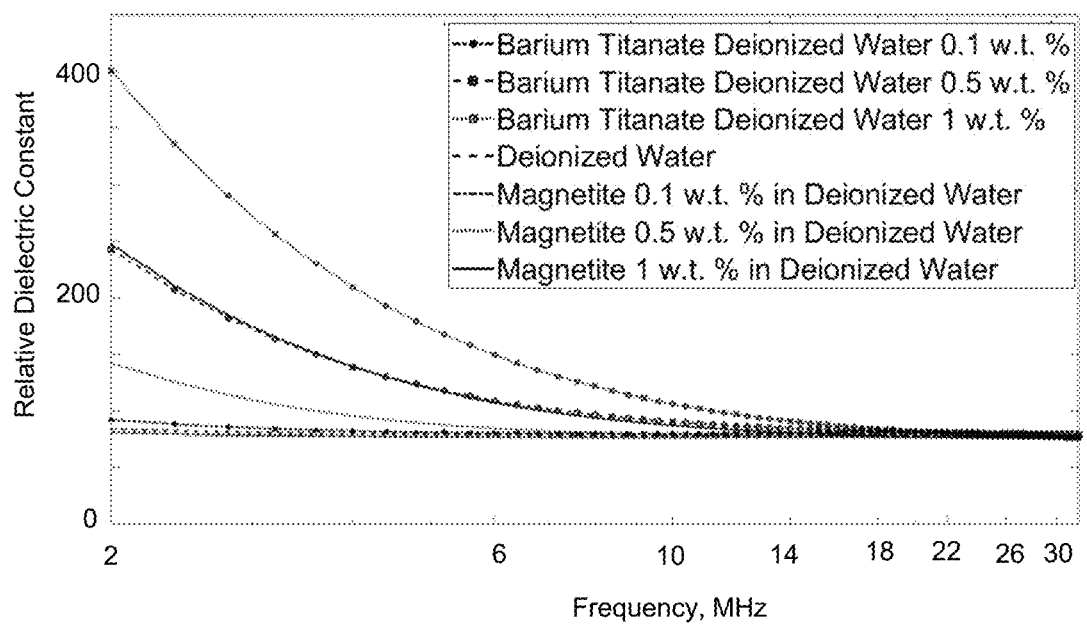
FIG. 30 is a graph showing the relative dielectric constant frequency response of the nano dispersions and the deionized water.

FIG. 30 shows the relative dielectric constant frequency response of the nano dispersions and the deionized water.

Figure 31:
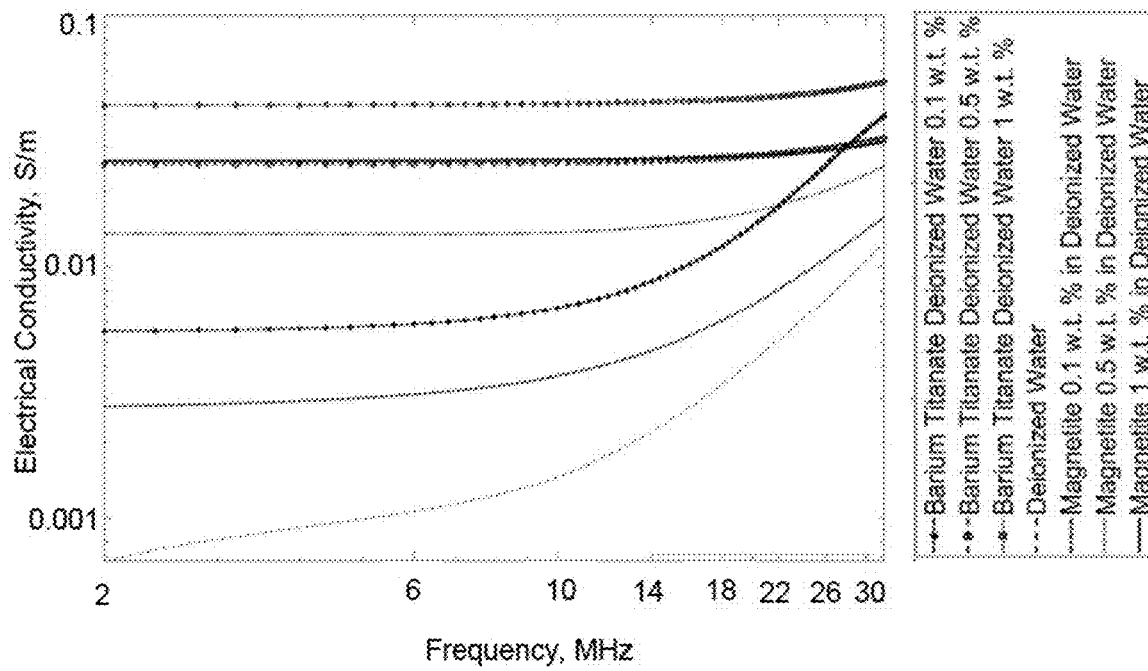
FIG. 31 is a graph showing the electric conductivity frequency response of the nano dispersions and the deionized water.

FIG. 31 shows the electric conductivity frequency response of the nano dispersions and the deionized water.

Figure 32:
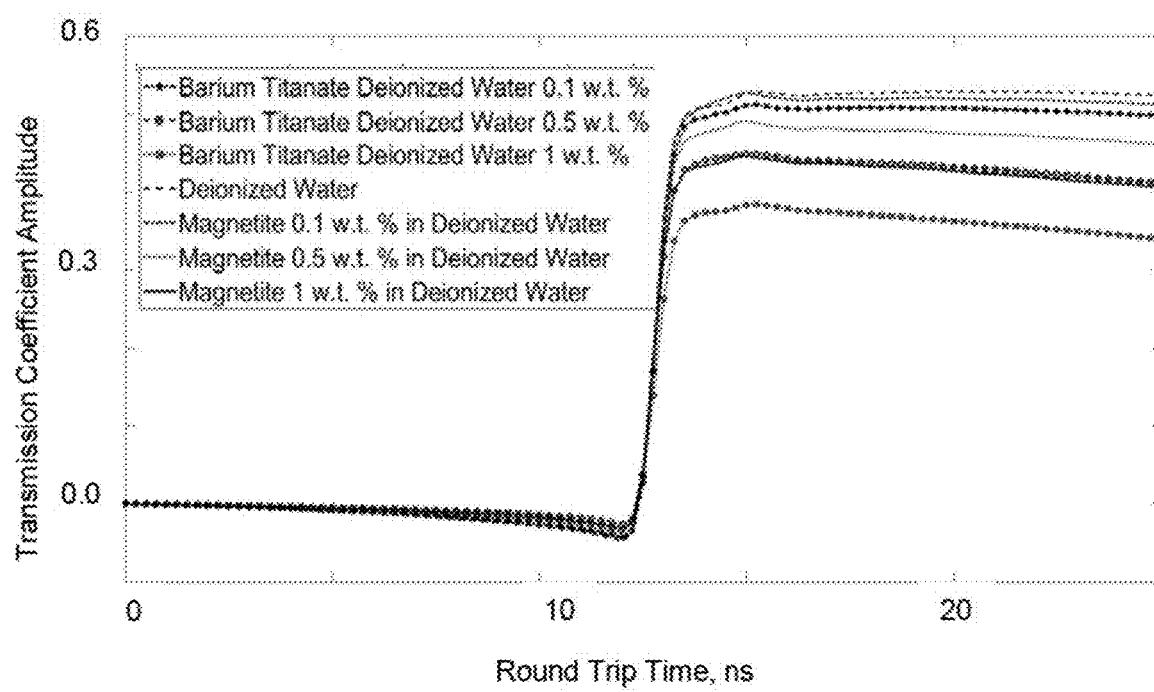
FIG. 32 is a graph showing the time domain step response (integrated with respect to time impulse response) of the transmission coefficient for the nano dispersions and the deionized water.

FIG. 32 shows the time domain step response (integrated with respect to time impulse response) of the transmission coefficient for the nano dispersions and the deionized water.

Figure 33:
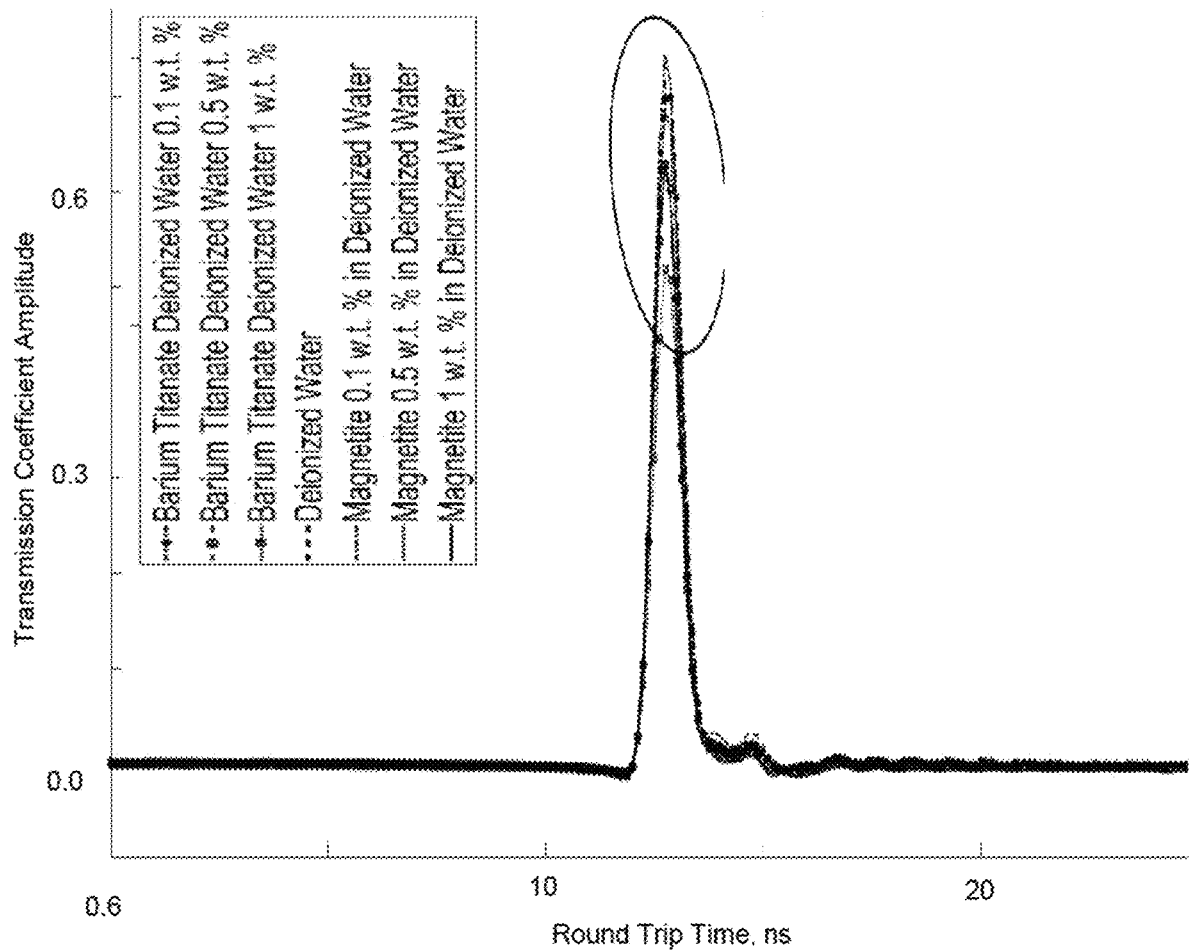
FIG. 33 is a graph showing the time domain impulse response of the transmission coefficient for the nano dispersions and the deionized water.
Figure 33:
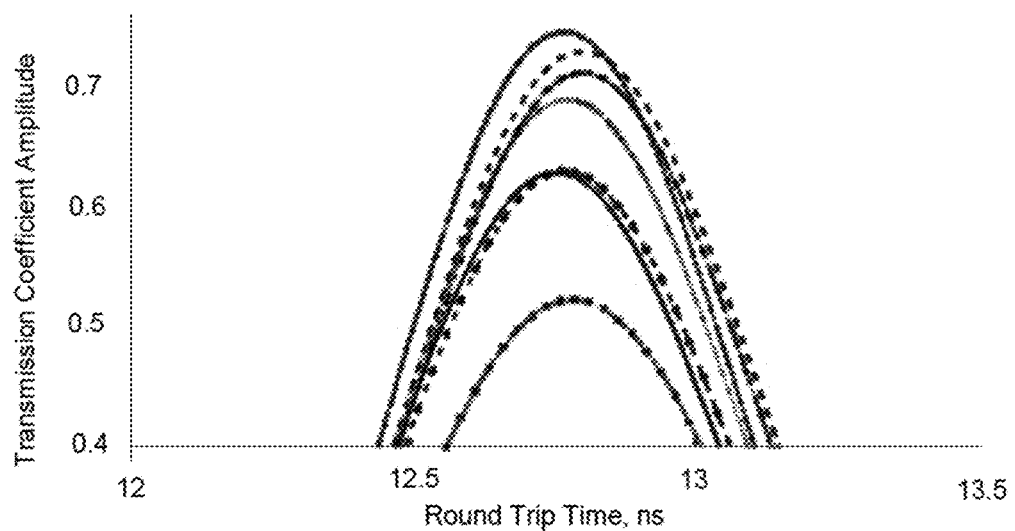

FIG. 33 is the time domain impulse response of the transmission coefficient for the nano dispersions and the deionized water.

Figure 34:
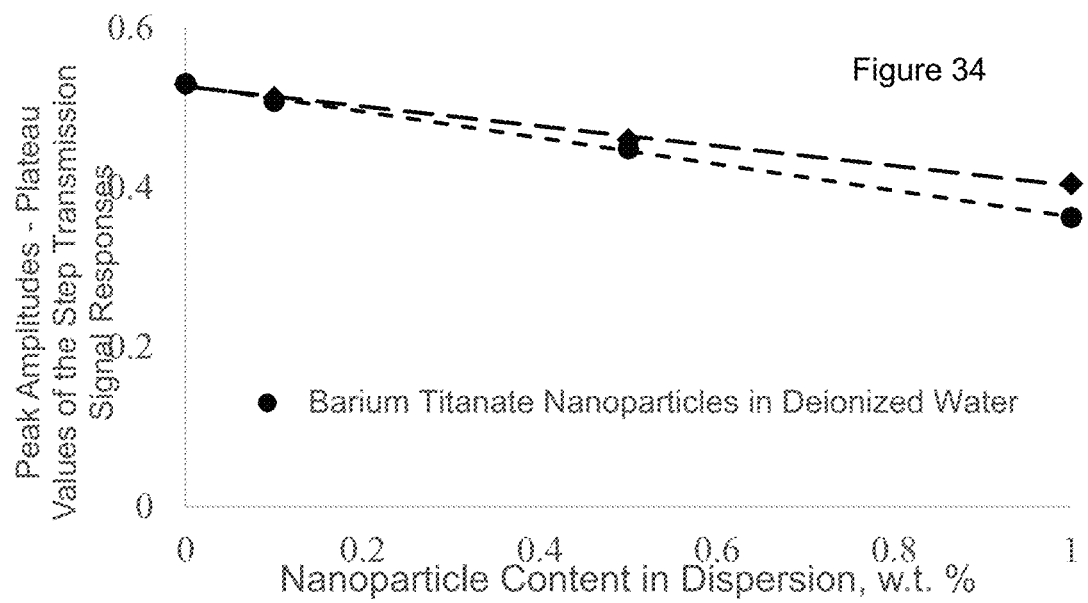
FIG. 34 is a graph showing the calibration curve to determine intermediate values of concentrations of the $BaTiO_3$ and $Fe_3O_4$ nano dispersions in deionized water.

FIG. 34 is the calibration curve to determine intermediate values of concentrations of the $BaTiO_3$ and $Fe_3O_4$ nano dispersions in deionized water.

FIG. 32 shows variation of the signal amplitude as a function of the nano particle concentration of a given solution. The relationship is confirmed to be linear as shown in FIG. 34.

One of the potential applications of this analysis of the frequency dielectric constant and electric conductivity as well as the raw signal (e.g. transmission step response) can be on-line monitoring of tailings settling problem. Another application can be in the analysis of the concentrations of the tag agents (nano particles of high dielectric permittivity constant and conductivity contrast) in the back flow during multistage fracking process. By knowing how much of the nanoparticles (tag agent's) was trapped in the fractures, the size and distribution of the fractures may be determined.

Currently, they routinely analyze the concentrations of tagging agents, however this process takes days, if not weeks. Since this technology provided with the real-time measurements, the fracking industry and its operators can be benefited from the insights it will bring them to increase the efficiency of fracking.

Determining Frequency-Dependent Dielectric Responses and Conductivities

Figure 35A:
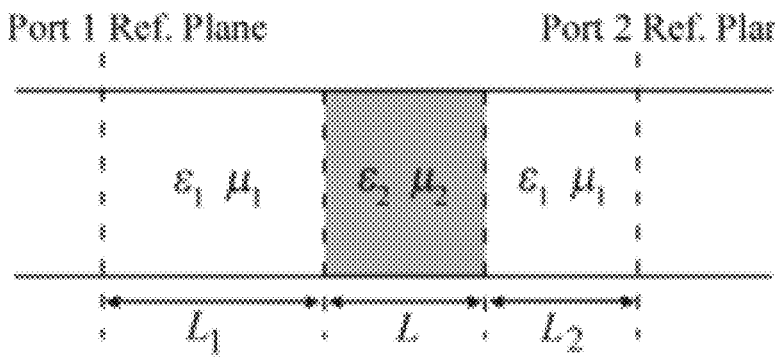
FIG. 35a is a schematic showing the model of the transmission line filled with PEEK plugs on both sides with the oil sand sample in the middle.

FIG. 35a shows the model of the transmission line filled with PEEK plugs on both sides with the oil sand sample in the middle.

The Nicolson-Ross-Weir algorithm was designed to convert measured S-parameters to the complex EM parameters such as dielectric permittivity, conductivity and magnetic permeability. The magnetic permeability of the solutions was assumed to be unity at all frequencies. In FIG. 10 above a simplified model of the transmission line fixture is presented. The PEEK plugs are shown on the left and right sides and the sample (e.g. oil sand, saturated core etc.) is in the center. $L_1$, $L_2$ and L are their respective lengths.

Figure 35B:
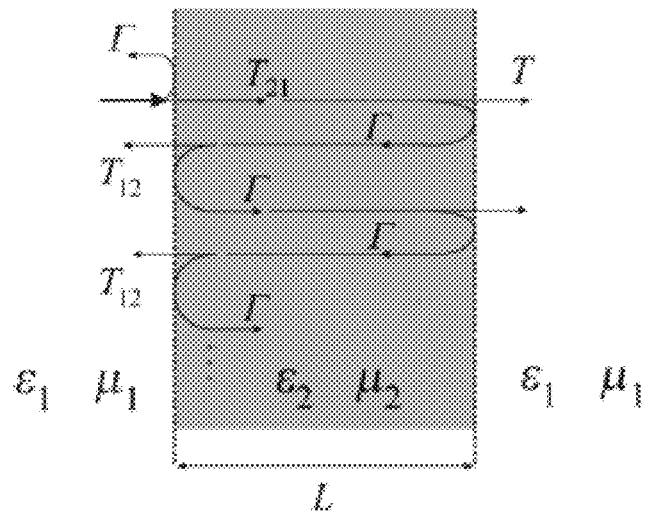
FIG. 35b is a schematic showing the model of multiple reflection between two interfaces.

The propagation factor, P, of the TEM wave travelling through the material of length L (see FIG. 35a) is:

$$P = e^{-\gamma_2 L} \quad (1)$$

where $$\gamma_2 = \frac{i\omega}{v_2} = \frac{i\omega n_z}{c_0} = \frac{i\omega \sqrt{\mu_{r2}\epsilon_{r2}}}{c_0} \quad (2)$$

is propagation coefficient of the oil sand sample (or any other material under test such as a suspension, emulsion etc.). The P factor relates to the wave's phase shift that happens as the wave travels along the sample's length, L. FIG. 35b is the model of multiple reflection between two interfaces. The total reflection coefficient could be found as:

$$\Gamma_{tot} = \Gamma + T_{21}T_{12}\Gamma P^2 + T_{21}T_{12}\Gamma^3 P^4 + \ldots = \frac{\Gamma(1-P^2)}{1-\Gamma^2 P^2} \quad (3)$$

where $$\Gamma = \frac{1 - \sqrt{\frac{\epsilon_2 \mu_1}{\epsilon_1 \mu_2}}}{1 + \sqrt{\frac{\epsilon_2 \mu_1}{\epsilon_1 \mu_2}}} \quad (4)$$

and $$T_{12} = 1 + \Gamma = \frac{2}{1 + \sqrt{\frac{\epsilon_1 \mu_2}{\epsilon_2 \mu_1}}} = \sqrt{\frac{\epsilon_2 \mu_1}{\epsilon_1 \mu_2}} T_{21} \quad (5)$$

$T_{12}$ and $T_{21}$ are the magnitudes of the through-travelling wave.

The total transmission coefficient could be derived in the similar fashion as:

$$T_{tot} = \frac{P(1-\Gamma^2)}{1-\Gamma^2 P^2} \quad (6)$$

Let us define relative permeability as $$\epsilon_r = \frac{\epsilon}{\epsilon_0}$$

and relative magnetic permeablitly as $$\mu_r = \frac{\mu}{\mu_0},$$

where $$\mu_0 = 1.2566 * 10^{-6} \frac{H}{m}$$

is the magnetic permeability of the free space and $$\epsilon_0 = 8.85 * 10^{-12} \frac{F}{m}$$

is the dielectric permittivity of the free space. The complex refractive coefficient at the interface PEEK/Sample could be calculated as:

$$n = \sqrt{\frac{\mu_{r2}\epsilon_{r2}}{\mu_{r1}\epsilon_{r1}}} \quad (7)$$

Based on the multiple reflection model, the S-parameters could be expressed in terms of $\Gamma$ and P as shown below:

$$S_{11} = e^{-2\gamma_1 L_1}\Gamma_{tot} = e^{-2\gamma_1 L_1}\frac{\Gamma(1-P^2)}{1-\Gamma^2 P^2} \quad (8)$$

$$S_{22} = e^{-2\gamma_1 L_2}\Gamma_{tot} = e^{-2\gamma_1 L_2}\frac{\Gamma(1-P^2)}{1-\Gamma^2 P^2} \quad (9)$$

And due to the reciprocity of the S-parameter matrix we have:

$$S_{21} = S_{12} = e^{-2\gamma_1(L_1+L_2)}T_{tot} = e^{-2\gamma_1(L_1+L_2)}\frac{P(1-\Gamma^2)}{1-\Gamma^2 P^2} \quad (11)$$

where the wave propagation coefficient through the PEEK is:

$$\gamma_1 = i\omega\sqrt{\mu_1\epsilon_1} \quad (12)$$

When the entire length of the fixture $L_1+L_2+L$ is filled with PEEK we have $\Gamma=0$ and:

$$S_{21}^0 = \exp(-\gamma_1(L_1+L_2+L)) = \exp(-\gamma_1 L_{peek}) \quad (13)$$

Let us also define the so-called cascade network properties A and B in terms of $\Gamma$ and P as follows:

$$A = \frac{S_{11}S_{22}}{S_{21}S_{12}} = \frac{\Gamma^2}{(1-\Gamma^2)^2}\frac{(1-P^2)^2}{P^2} \quad (14)$$

$$B = \exp(2\gamma_1(L_{peek}-L))(S_{21}S_{12} - S_{11}S_{22}) = \frac{P^2 - \Gamma^2}{1-\Gamma^2 P^2} \quad (15)$$

Solving equation (14) for $P^2$ we have:

$$P^2 = \frac{B+\Gamma^2}{1+B\Gamma^2} \quad (16)$$

And substituting back into (15), we obtain:

$$A = \frac{\Gamma^2(1-B)^2}{(B+\Gamma^2)(1+B\Gamma^2)} \quad (17)$$

The last equation can be solved for $\Gamma^2$ to obtain:

$$\Gamma^2 = \frac{-A(1+B^2)+(1-B)^2}{2AB} \pm \frac{\sqrt{-4A^2B^2 + [A(1+B^2)-(1-B)^2]^2}}{2AB} \quad (18)$$

Where the sign in this equation is chosen so that $|\Gamma|\leq 1$.

There exists a simpler way to arrive to the P expression in which we have to define another quantity, R, through the scattering parameters as:

$$R = \frac{S_{21}}{S_{21}^0} = \frac{e^{\gamma_1 L}P(1-\Gamma^2)}{1-P^2\Gamma^2} \quad (19)$$

The above equation could be solved for P. After substitution of $P^2$ from (16) into (19) we have:

$$P = R\frac{1+\Gamma^2}{1+B\Gamma^2}e^{-\gamma_1 L} \quad (20)$$

The refractive coefficient could also be described as:

$$n = \sqrt{\frac{\epsilon_{r2}\mu_{r2}}{\epsilon_{r1}\mu_{r1}}} = \frac{1}{\gamma_1 L}\ln\left(\frac{1}{P}\right) \quad (21)$$

The logarithmic function (21) is multivalued since the logarithm of a complex number results in an infinite number of discrete values. The physical solution must be selected from these values. One way to do it is to check if a chosen solution gives correct values for another measurable quantity or not. It also must be noted that this quantity must not depend on $L_1$ and $L_2$. This quantity is called the group delay. It is a measure of a pulse signal transit through a transmission line. The transit time of a wave packet is given by:

$$\tau_g = \frac{x}{v_g} \quad (22)$$

Where x is the transit length and $v_g$ is the group velocity of the wave pulse. In our case $$\tau_g^0 = \frac{L_{peek}}{c\sqrt{\epsilon_{r1}}} \quad (23)$$

and $$\tau_g = \frac{L_{peek}-L}{c\sqrt{\epsilon_{r1}}} + \frac{L d}{df}\left(\frac{fn}{c}\right) \quad (24)$$

where $\tau_t^o$ is the group delay through the PEEK plugs, and $\tau_g$ is the group delay through the line with an inserted sample of the length L. By comparing the calculated group delay with the measured group delay, $$|\tau_g^{measured} - \tau_g^{calculated}| = 0 \quad (25)$$

the correct value of the refractive index is determined. These last two equations are used to derive complex dielectric permittivity and permeability of the sample.

$$\epsilon_{r2} = \frac{\epsilon_{r1}}{\mu_{r1}} * \frac{1-\Gamma}{1+\Gamma} \quad (26)$$

$$\mu_{r2} = \frac{\epsilon_{r1} n^2}{\epsilon_{r2}} \quad (27)$$

The sign of $\Gamma$ used in here is determined from consideration that equations for $S_{11}$ and $S_{21}$ have to hold after substitution of $\Gamma$ with the correct sign into them.

Conductivity could be found using the relation between conduction and imaginary part of the dielectric permittivity as $$\sigma = \epsilon_2'' \omega = \epsilon_o \epsilon_{r2}'' \omega \quad (28)$$

Foam Detection

This section relates to experiments which demonstrate the applicability of the apparatus and method to characterising foams. Foams are ubiquitous in many industries including food, chemical and petroleum and others. One application is to measure levels of foams and the spatial distribution of its quality in real time. This could be used to measure foam characteristics in the flow back fluid that may comprise liquids (e.g. including water, hydrocarbons and/or surfactant) and gases (e.g. air and/or injected gas).

This technology may be used in a foam acid treatment, where it is important to analyze online how stable the flow-back foam is over time at various thermobaric conditions. This knowledge will give an insight on how well the foam composition performs in real-time. The method may comprise adjusting conditions (e.g. gas-to-liquid ratio or choose a different surfactant) to adjust or change the nature of the foam produced.

It will be appreciated that for acid applications, the apparatus should be configured to resist corrosion. The cell may be formed of some highly corrosive resistive metal (e.g. Hastelloy) which is resistant to severe environments, including as acidic environments.

Acid-based foam may be injected in oil carbonate reservoir to increase its permeability. This is designed to induce a reaction between the injected foam and the carbonates that the reservoir matrix is made of, so that the $CO_2$ is released and could enter foam structure. Also, the injected foam undergoes thermobaric changes throughout all the steps of injection till the back flow. It is important to monitor the produced foam quality and its levels (foam/liquid cut) online while flowing back to adjust some parameters of the foam injections (e.g. the injection pressure and the foam composition).

In general, the apparatus and methods may be used with any kind of foams where there is a contrast in dielectric properties, i.e. conductivity and/or permittivity between gas phase and liquid phase. Therefore, the liquid phase might be oil, acid+oil, water, water+surfactant and many others. In the food industry the potential applications could be in fermentation tanks, where the foaming is always observed. This could help better control the process of fermentation.

Figure 36A:
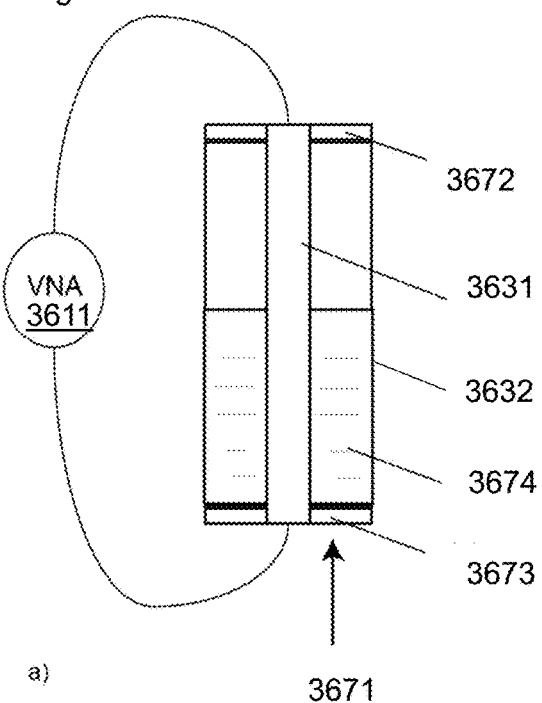
FIG. 36a is a cross section of an embodiment of the apparatus in a vertical configuration containing liquid.
Figure 36B:
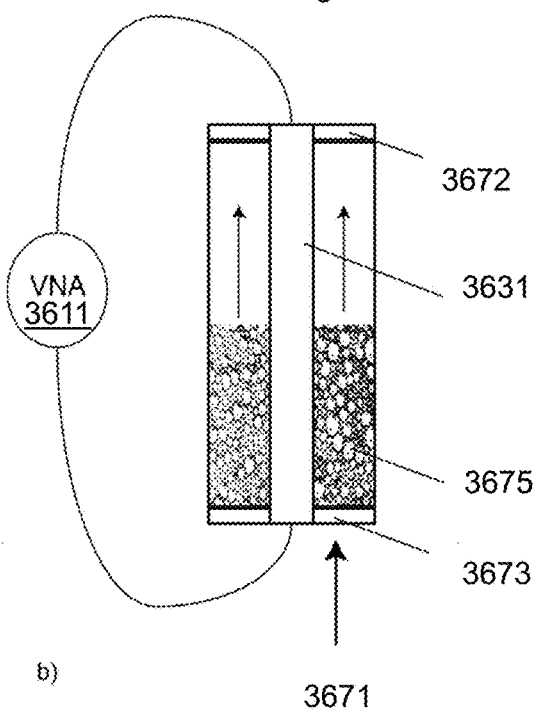
FIG. 36b is a cross section of the embodiment of FIG. 36a in a vertical configuration containing foam.

In particular, this section relates to:
  the foam generation procedure inside of the transmission line device (same device as described above) while measuring reflection and transmission electromagnetic sweep coefficients in frequency domain;
  time domain responses of the amplitudes of the reflection and transmission coefficients measured during the air injection phase through the initial water head and the settling period of the produced foam;
  space domain response of the reflection coefficient amplitude measured during the air injection phase through the initial water head and the settling period of the produced foam;
  foam and water levels at several measured time stamps The apparatus 3600 is shown in FIGS. 36a and 36b. The apparatus 3600 for determining the spatial distribution of materials, comprises:
  a source of electromagnetic waves 3611 across a range of frequencies, wherein the source is configured to emit electromagnetic waves into a sample along an axis;
  a detector configured to detect electromagnetic waves across the range of frequencies emitted by the source, wherein the detector is positioned to receive electromagnetic waves after the electromagnetic waves have interacted with the sample by at least one of: reflection and transmission, and wherein the detector is configured to detect a frequency response of the received electromagnetic waves; and
  a controller configured to process the frequency response of the received electromagnetic waves to determine an axial spatial distribution of material within the sample.

Air/water foam is generated inside of the measuring cell by barbotaging (passing) compressed air through the water head. FIG. 36a is the apparatus before the foam is generated, and FIG. 36b is after. In this case the sample container comprises a conducting channel 3632 which holds the sample, and a longitudinal electrode 3631 which together act as a waveguide. For this experiment, the conducting channel and electrode are arranged vertically. Compressed air 3671 is pumped into a mesh-covered inlet 3673 at the bottom which rises up through the water 3674 contained in the container to create a foam 3675. The air which escapes from the top can exit the container through an outlet 3672 at the top.

In this experiment, foam generation is achieved by passing compressed air from the bottom to the top of the cell. The top of the cell is open to the atmosphere, while the bottom is filled with an aqueous-based sodium dodecylbenzenesulfonate surfactant (SDBS). The electromagnetic sweeps are triggered by vector network analyzer (VNA) to record magnitude and phase responses of the reflection and transmission coefficients from both end of the cell (i.e. 2 ports of the VNA). Real part of the reflection coefficient measured from the top of the cell (facing the foam head) is used to obtain foam profile as well as water and foam levels.

Figure 37:
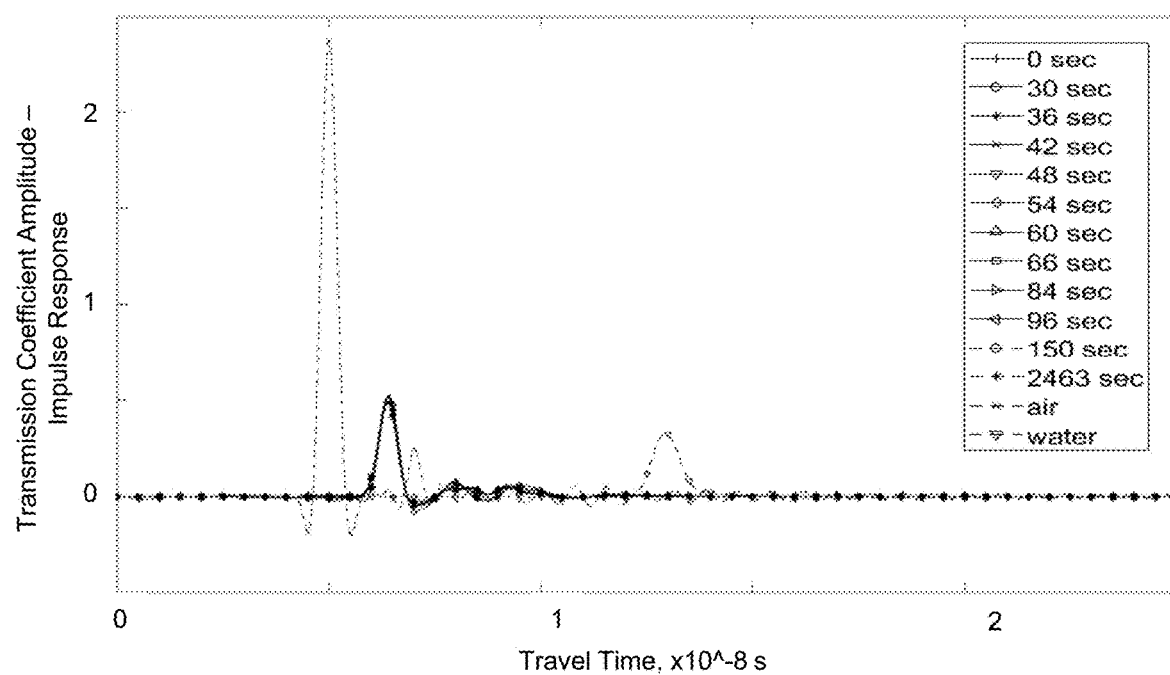
FIG. 37 is a graph of the impulse response of the transmission coefficient vs round trip time measured at different foam life periods.

FIG. 37 shows the impulse response of the transmission coefficient vs round trip time measured at different foam life periods. Also shown is the impulse response of the transmission coefficient vs round trip time for the cell filled with air (dashed lines with Xs) and filled with water (dashed lines with triangles). As before, a peak indicates an interface. Because the speed of the signal is slowed by the water, the water peak is detected at a much later time than for air. Foam, being composed of air and water slows the signal more than air but less than water.

Figure 38:
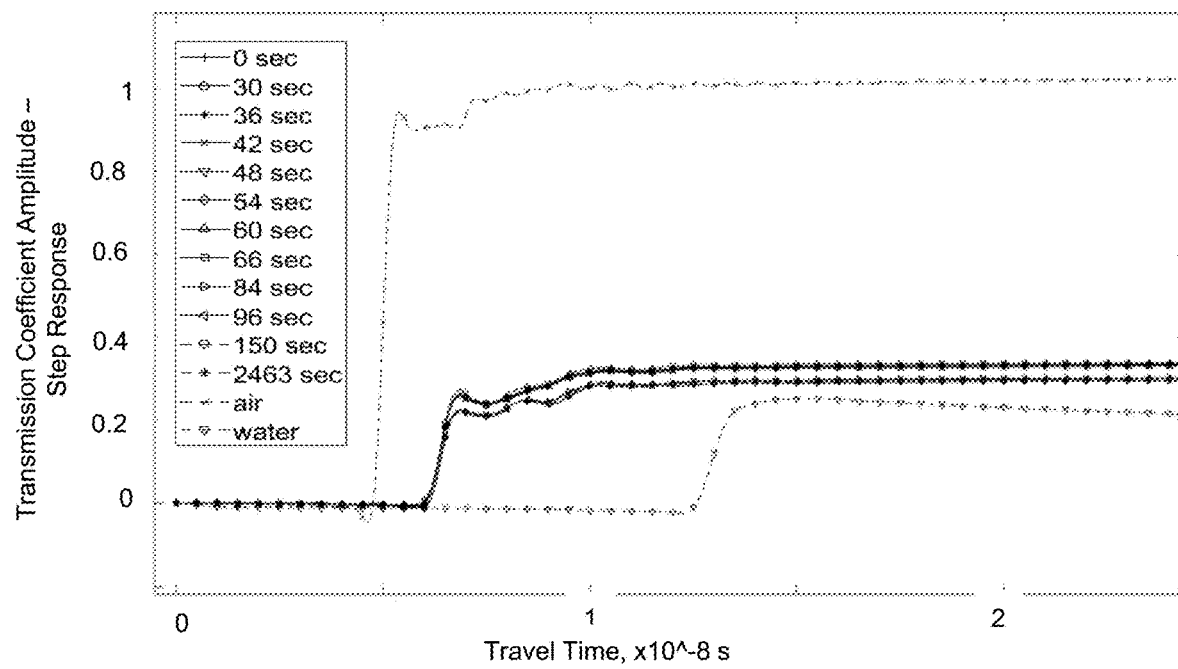
FIG. 38 is a graph of the step response of the transmission coefficient vs round trip time measured at different foam life periods.

FIG. 38 shows the step response of the transmission coefficient vs round trip time measured at different foam life periods. Also shown is the step response of the transmission coefficient vs round trip time for the cell filled with air (dashed lines with Xs) and filled with water (dashed lines with triangles). As before, a step indicates an interface.

Figure 39:
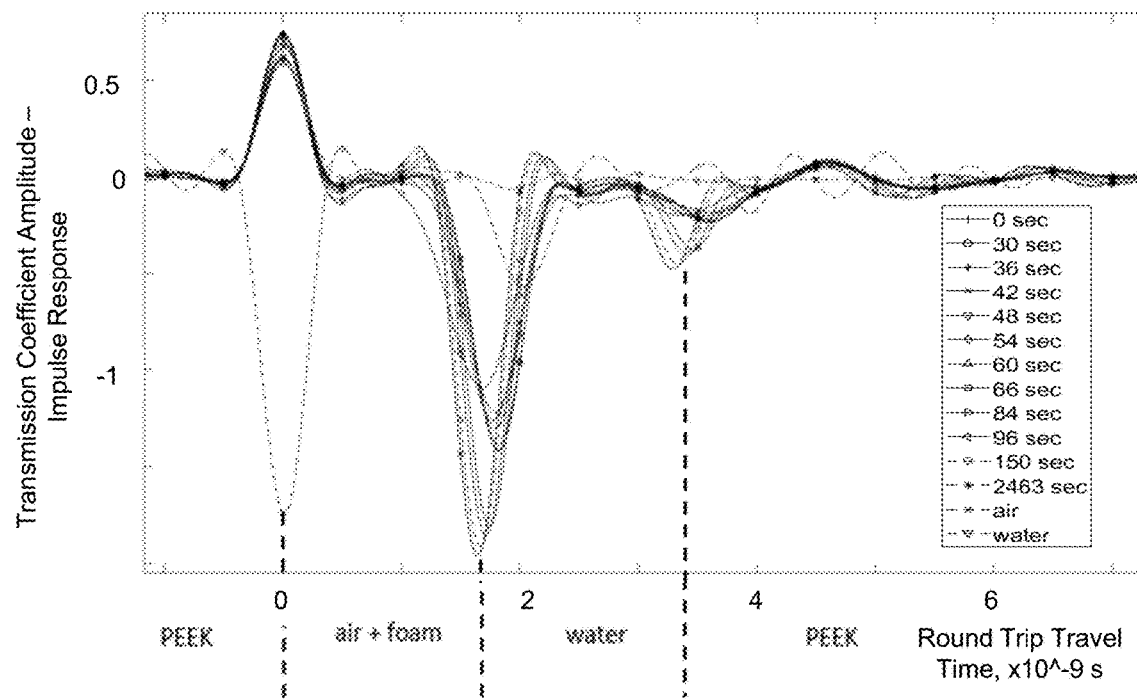
FIG. 39 is a graph of the impulse response of the reflection coefficient vs round trip time measured at different foam life periods.

FIG. 39 shows the impulse response of the reflection coefficient vs round trip time measured at different foam life periods. Also shown is the impulse response of the reflection coefficient vs round trip time for the cell filled with air (dashed lines with Xs) and filled with water (dashed lines with triangles). Here, the reflection peaks allow us to identify the interfaces between the initial PEEK portion, the air and foam layer, the water layer and the second PEEK portion.

Figure 40A:
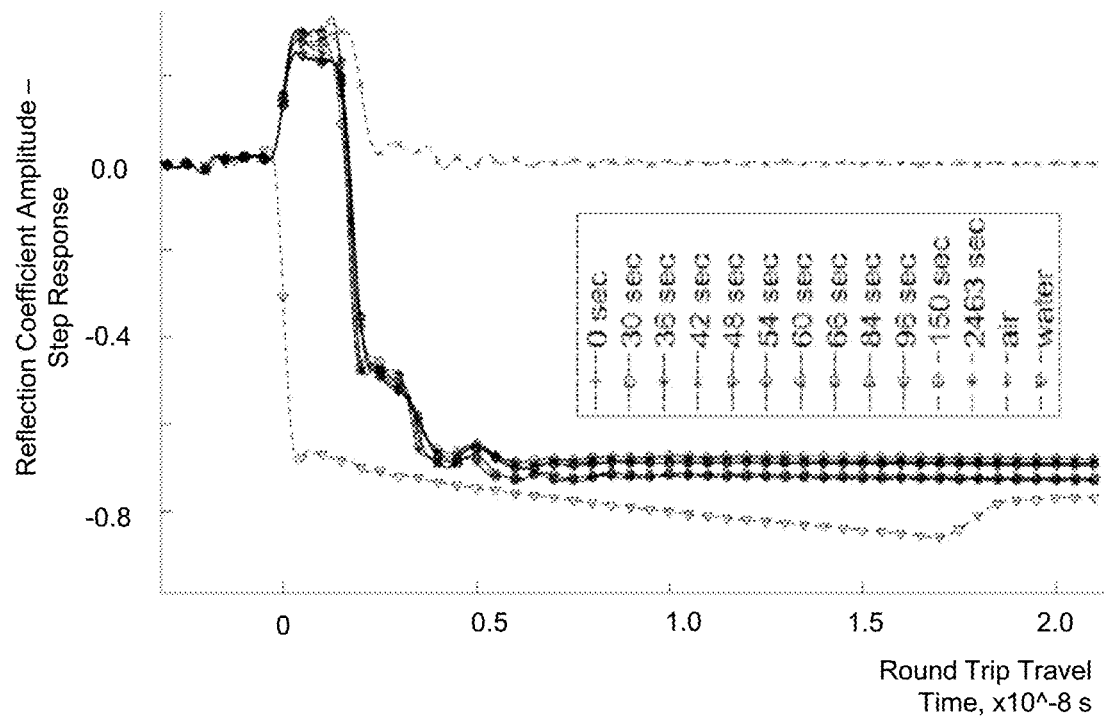
FIG. 40a is a graph of the step response of the reflection coefficient vs round trip time measured at different foam life periods.

FIG. 40a shows the step response of the reflection coefficient vs round trip time measured at different foam life periods. Also shown is the step response of the reflection coefficient vs round trip time for the cell filled with air (dashed lines with Xs) and filled with water (dashed lines with triangles).

Figure 40B:
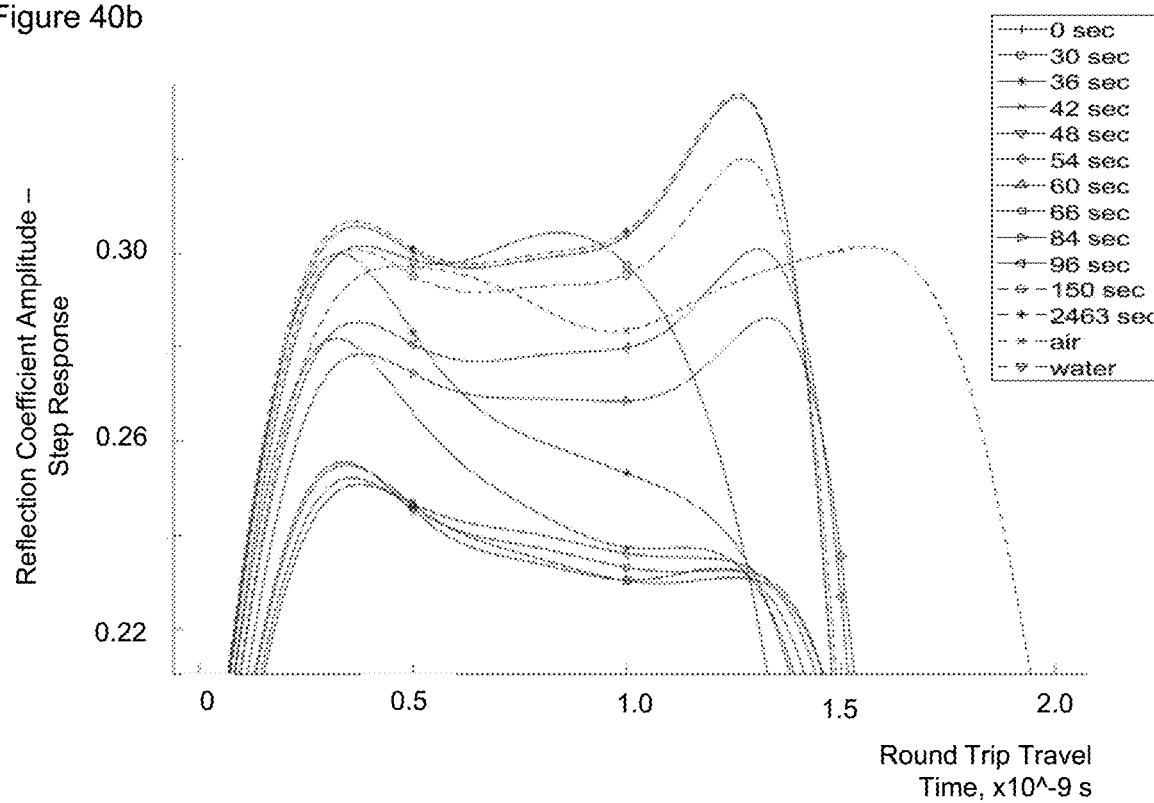

FIG. 40b is a closeup of the step response shown in FIG. 40a of the reflection coefficient vs round trip time measured at different foam life periods. This close up focuses on the foam layer.

Figure 40C:
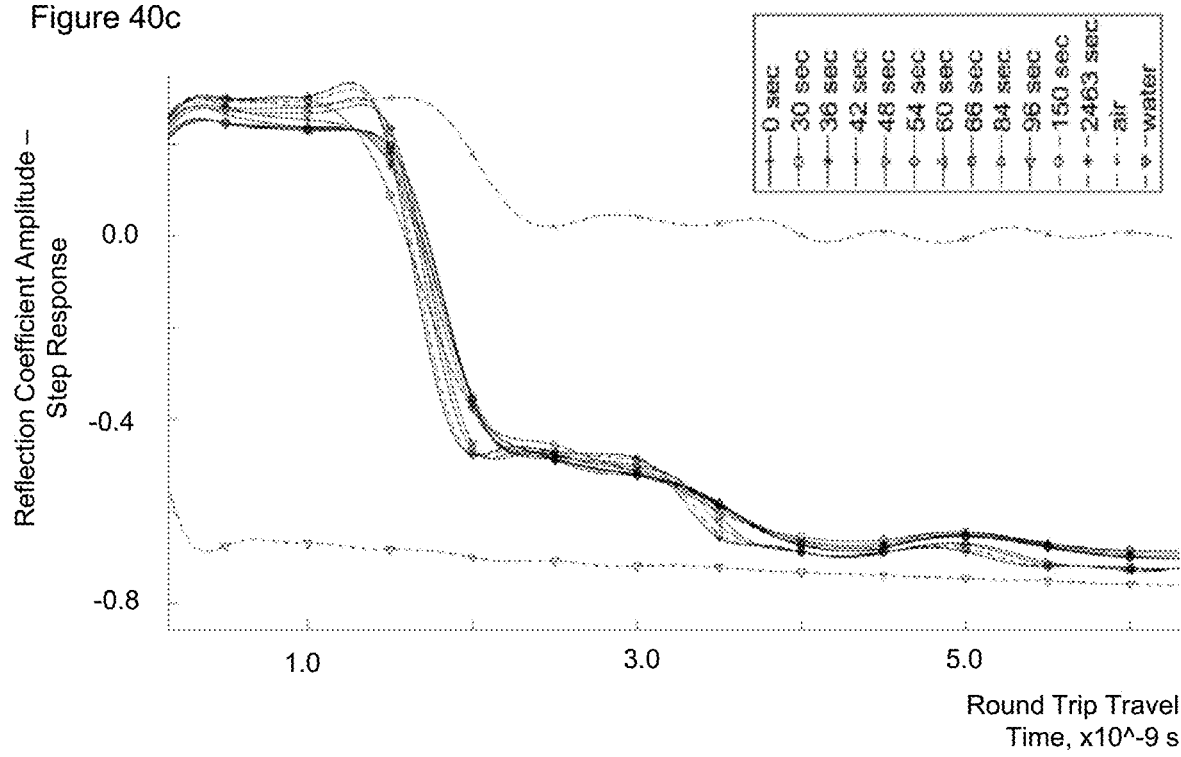

FIG. 40c is a closeup of the step response shown in FIG. 40a of the reflection coefficient vs round trip time measured at different foam life periods. This close up encompasses the foam layer and the water layer.

Figure 40D:
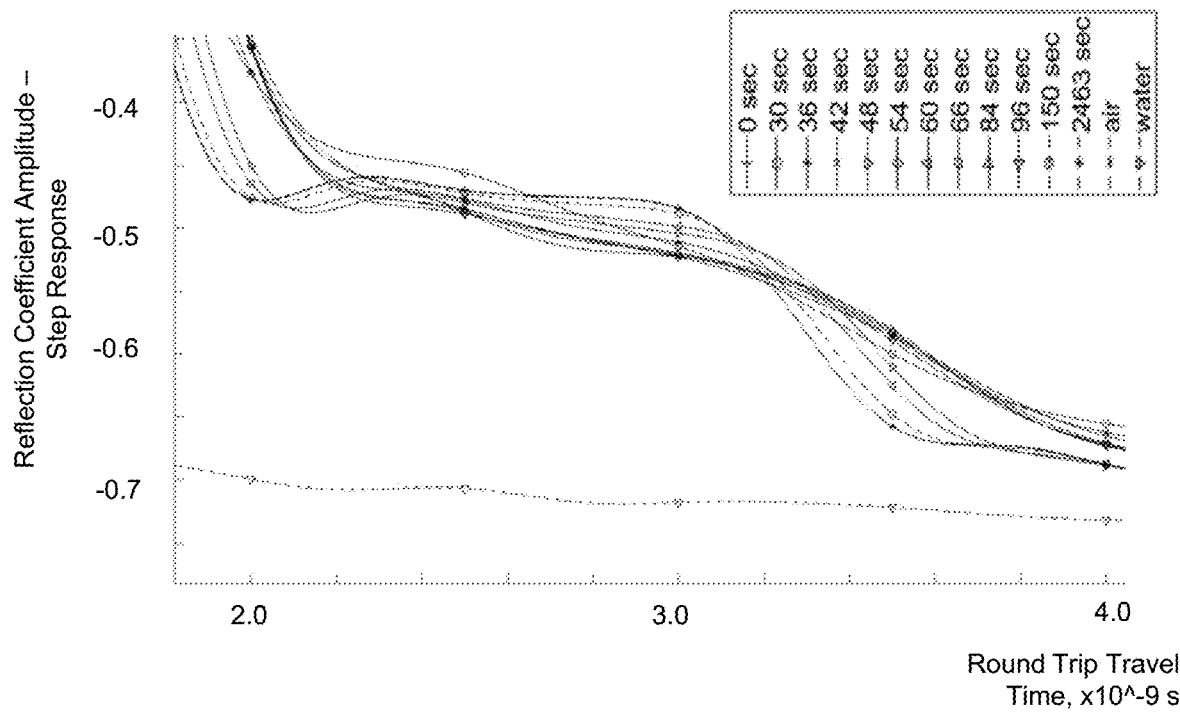

FIG. 40d is a closeup of the step response shown in FIG. 40a of the reflection coefficient vs round trip time measured at different foam life periods. This close up focuses on the water layer.

As before, the time to space conversion of the reflection time domain step response is carried out based on the knowledge of the total length of the cell (L=0.3 m) and the electromagnetic wave propagation velocity in air ($V_{air}=V_{speed\ of\ light}=3*10^8$ m/s) and water ($V_{water}=V_{speed\ of\ light}/\sqrt{\in_w}$), where $\in_w=80$. In the current experiment the wave propagation velocity is assumed to be equal to the propagation velocity of the air. This is a valid assumption because the amplitude of the measured timed domain response of the reflection coefficient of the air-filled transmission line lays close to that of the foam's responses (see FIG. 40b). The interfaces in time domain are detected by using the automated routine of finding local maxima in the module of the amplitude of the impulse time domain response (see FIG. 40a). The times that correspond to the local maxima and average velocities in water and foam phases are used to convert time domain response of the reflection coefficient to space (length along the measuring cell). This is done by multiplying halved abscissa values (times) of every time domain reflection coefficient response by the corresponding velocity in that region. The abscissa values are halved because the electromagnetic signal needs to cover double distance through the cell to arrive back to the emitter/receiver.

Figure 41:
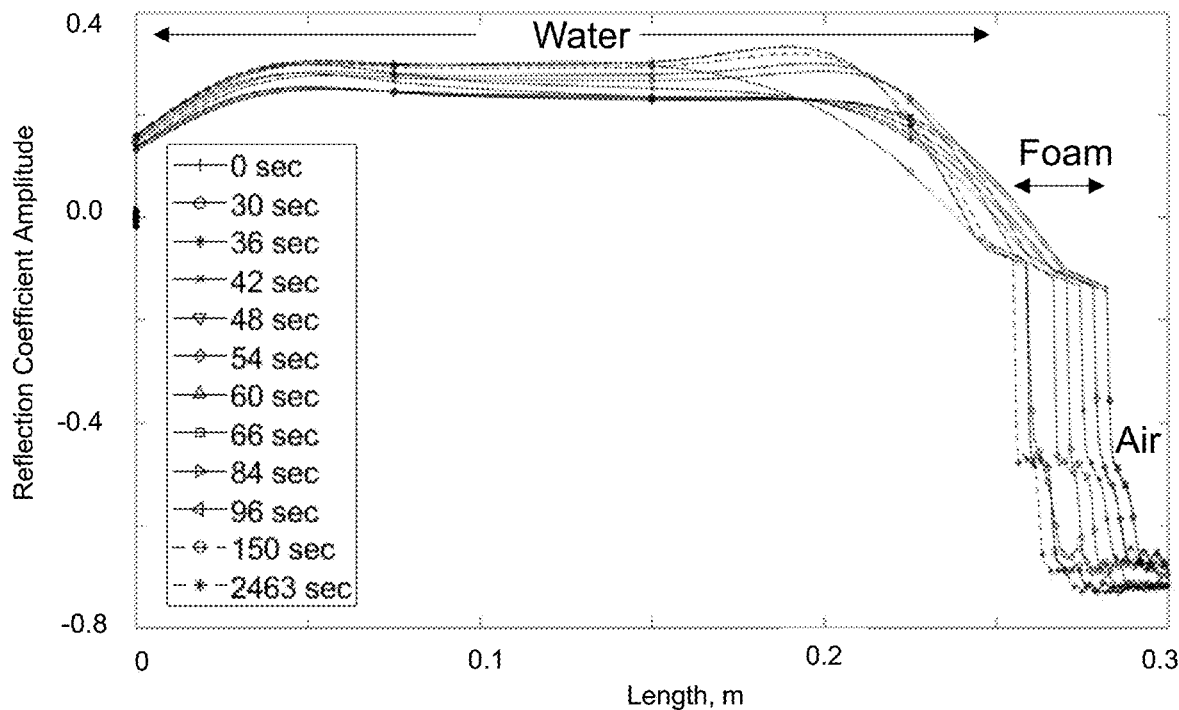
FIG. 41 is a graph of the amplitude response of the reflection coefficient along the length of the cell for the foam at different life periods.

The resulting amplitude profiles for the foam and water in the cell at several times are shown in FIG. 41. Water is shown on the left-hand side of the graph (corresponding to the bottom) where the amplitude of the reflection coefficient is at largest (the plateau on the left). This is followed by the foam front which is that transition region between the water head on the left and the air front on the very right (the plateau on the right-hand side of the FIG. 41).

Figure 42A:
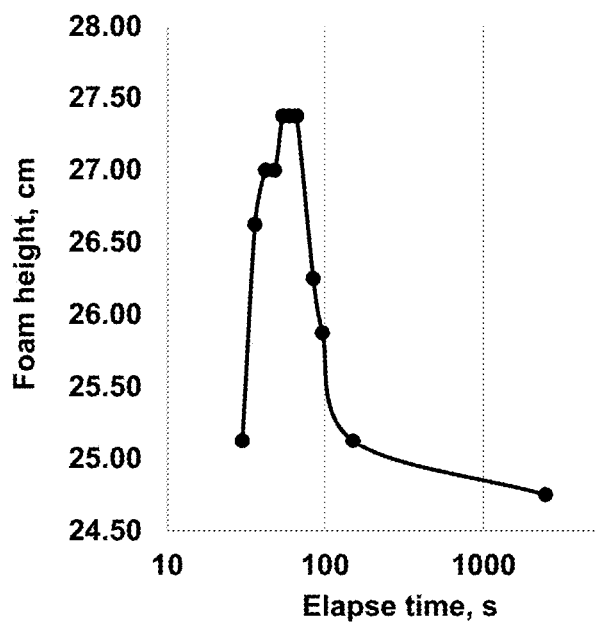
FIGS. 42a and 42b are graphs of the foam height and of the water height as a function of time.
Figure 42B:
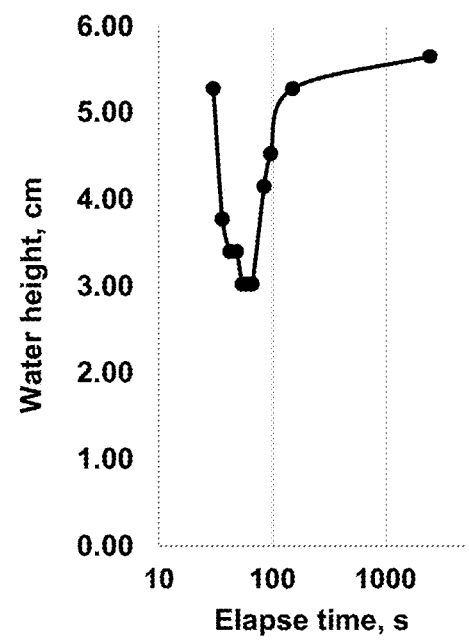

Foam and water heights are shown in FIG. 42a and FIG. 42b. The data in both figures starts at 30 seconds, which is time zero for the experiment. This is when the injection of air began. The exponential foam inflation is observed up to 54 seconds. That is followed by the sustained foam level for 12 seconds and the exponential deflation. The mirror-like behavior is observed for the water height (see FIG. 42b).

The graphs demonstrate how the foam first was created by the gas injection from the bottom orifice of the cell for about 60 seconds. After which the compressor was halted, and the foam was let to settle down. The inflation and deflation processes were both observed by using the electromagnetic device.

This experiment shows how the form can be monitored over time with an embodiment of the apparatus.

Although the present invention has been described and illustrated with respect to preferred embodiments and preferred uses thereof, it is not to be so limited since modifications and changes can be made therein which are within the full, intended scope of the invention as understood by those skilled in the art.

The invention claimed is:

1. An apparatus for determining the spatial distribution of materials, the apparatus comprising:
    an elongate tubular conducting channel, and a central elongate conducting electrode aligned within the channel such that the channel and the electrode comprises a waveguide for transverse electromagnetic (TEM) modes;
    a source of electromagnetic waves across a range of frequencies, wherein the source is configured to emit electromagnetic waves into a sample along an axis;
    a detector configured to detect the electromagnetic waves across the range of frequencies emitted by the source, wherein the detector is positioned to receive electromagnetic waves after the electromagnetic waves have interacted with the sample by at least one of: reflection and transmission, and wherein the detector is configured to detect a frequency response of the received electromagnetic waves; and
    a controller configured to process the frequency response of the received electromagnetic waves to determine an axial spatial distribution of materials within the sample.

2. The apparatus of claim 1, wherein the source and detector form part of a vector network analyzer.

3. The apparatus of claim 1, wherein the detector is configured to receive electromagnetic waves which have interacted with the sample at least 10 cm away from the source.

4. The apparatus of claim 1, wherein the detector comprises a reflection sensor and a transmission sensor.

5. The apparatus of claim 1, wherein the range of frequencies spans frequencies between 2 Mhz and 6 GHz.

6. The apparatus of claim 1, wherein a ratio of the highest frequency to the lowest frequency in the range of frequencies is greater than 1000.

7. The apparatus of claim 1, wherein the apparatus comprises a waveguide comprising two aligned conductors configured to support Transverse Electro-Magnetic (TEM) modes within the waveguide.

8. The apparatus of claim 1, wherein the controller is configured to:
    determine a time-dependent amplitude of the received electromagnetic waves from the measured frequency response;
    based on the time-dependent amplitude of the received electromagnetic waves to determine an axial speed of the electromagnetic waves as a function of axial distance from the source; and
    determine an axial spatial distribution of materials within the sample based on the determined axial speed.

9. The apparatus of claim 1, wherein the apparatus comprises plugs for closing the ends of the channel, the plugs having ports to allow liquid to be exchanged with the channel.

10. The apparatus according to claim 1, wherein the apparatus comprises one or more of:

a resilient sheath within the channel, and a pump configured to introduce fluid between the sheath and the channel to apply a lateral pressure on the sample within the sheath; and blocks for closing the ends of the channel, the blocks being moveable to apply an axial pressure on the sample.

11. The apparatus of claim 1, wherein the channel is impermeable and forms a container for the sample.

12. The apparatus of claim 1, wherein the channel is porous and is configured to allow fluid communication through the channel.

13. A tank comprising:

an elongate tubular conducting channel, and a central elongate conducting electrode aligned within the channel such that the channel and the electrode comprises a waveguide for transverse electromagnetic (TEM) modes;

a source of electromagnetic waves across a range of frequencies, wherein the source is configured to emit electromagnetic waves into a sample along an axis;

a detector configured to detect the electromagnetic waves across the range of frequencies emitted by the source, wherein the detector is positioned to receive electromagnetic waves after the electromagnetic waves have interacted with the sample by at least one of:

reflection and transmission, and wherein the detector is configured to detect a frequency response of the received electromagnetic waves; and a controller configured to process the frequency response of the received electromagnetic waves to determine an axial spatial distribution of materials within the sample; and, wherein the apparatus is arranged such to determine a spatial distribution of materials within the tank along a vertical axis.

14. A method of determining the spatial distribution of materials, the method comprising:

emitting electromagnetic waves across a range of frequencies into a sample along an axis;

pumping fluid comprising nanoparticles through the sample;

detecting electromagnetic waves across the range of frequencies emitted by a source, wherein the detected electromagnetic waves have interacted with the sample by at least one of:

reflection and transmission, and wherein a detector is configured to detect a frequency response of the detected electromagnetic waves; and processing the frequency response of the detected electromagnetic waves to determine an axial spatial distribution of materials within the sample.

15. The method according to claim 14, wherein the sample comprises a liquid permeable solid matrix, and wherein the method comprises:

fully saturating the matrix with a first fluid and recording a first-fluid frequency response of the received electromagnetic waves;

introducing a second fluid into the matrix and recording an intermediate frequency response of the received electromagnetic waves;

determining the axial spatial saturation of the second fluid within the matrix based on a comparison between the first-fluid frequency response and the intermediate frequency response.

16. The method according to claim 14, wherein the method comprises pumping fluid through the sample.

17. The method according to claim 14, wherein the method comprises pumping saline fluid through the sample and determining salinity concentration profiles.

18. The method according to claim 14, wherein the sample comprises foam.

* * * * *